(12) United States Patent
Khalid et al.

(10) Patent No.: US 12,395,951 B2
(45) Date of Patent: Aug. 19, 2025

(54) METHODS AND APPARATUS FOR FREQUENCY, PHASE AND TIME OF DAY SYNCHRONIZATION IN WIRELESS SYSTEMS

(71) Applicant: Charter Communications Operating, LLC, St. Louis, MO (US)

(72) Inventors: Saran Khalid, Denver, CO (US); Perwaiz Akhtar, Aurora, CO (US); MohammedYusuf Shaikh, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 510 days.

(21) Appl. No.: 17/729,353

(22) Filed: Apr. 26, 2022

(65) Prior Publication Data

US 2023/0345393 A1 Oct. 26, 2023

(51) Int. Cl.
*H04W 56/00* (2009.01)
*H04W 8/00* (2009.01)
*H04W 76/14* (2018.01)
*H04W 88/06* (2009.01)

(52) U.S. Cl.
CPC ....... *H04W 56/0015* (2013.01); *H04W 8/005* (2013.01); *H04W 76/14* (2018.02); *H04W 88/06* (2013.01)

(58) Field of Classification Search
None
See application file for complete search history.

(56) References Cited

U.S. PATENT DOCUMENTS

| 2002/0009168 A1* | 1/2002 | Dick | H04W 56/0075 |
| | | | 375/E1.005 |
| 2006/0280226 A1* | 12/2006 | Krasner | H04B 7/2668 |
| | | | 375/130 |
| 2021/0200494 A1* | 7/2021 | Zhu | H04M 1/72469 |
| 2024/0114330 A1* | 4/2024 | Xu | H04W 8/005 |

OTHER PUBLICATIONS

ETSI TS 129 345, V14.2.0 Universal Mobile Telecommunications System (UMTS); LTE; Inter-Proximity Services (Prose) function signalling aspects; Stage 3 (3GPP TS 29.345 version 14.2.0 Release 14), Jul. 2017, 68 pages.
A. Roessler, J. Schlienz, S. Merkel, and M. Kottkamp, LTE-Advanced (3GPP Rel. 12) Technology Introduction White Paper, Jun. 2014, 60 pages, 1MA252_2E, Rohde & Schwarz.

* cited by examiner

*Primary Examiner* — Scott M Sciacca
(74) *Attorney, Agent, or Firm* — Straub & Straub; Stephen T. Straub; Michael P. Straub

(57) ABSTRACT

The present invention relates to methods and apparatus for achieving frequency, phase and time of day synchronization in wireless systems. An exemplary method of operating a first wireless base station in a first network in accordance with an embodiment of the present invention comprises the steps of: (i) receiving, at the first wireless base station, a first message; (ii) in response to receiving the first message entering, by the first wireless base station, into a first mode of operation; and (iii) while operating in the first mode of operation, obtaining, by the first wireless base station, synchronization information from a first user equipment device using over the air device to device communications, the synchronization information including time synchronization information.

20 Claims, 21 Drawing Sheets

FIGURE 6

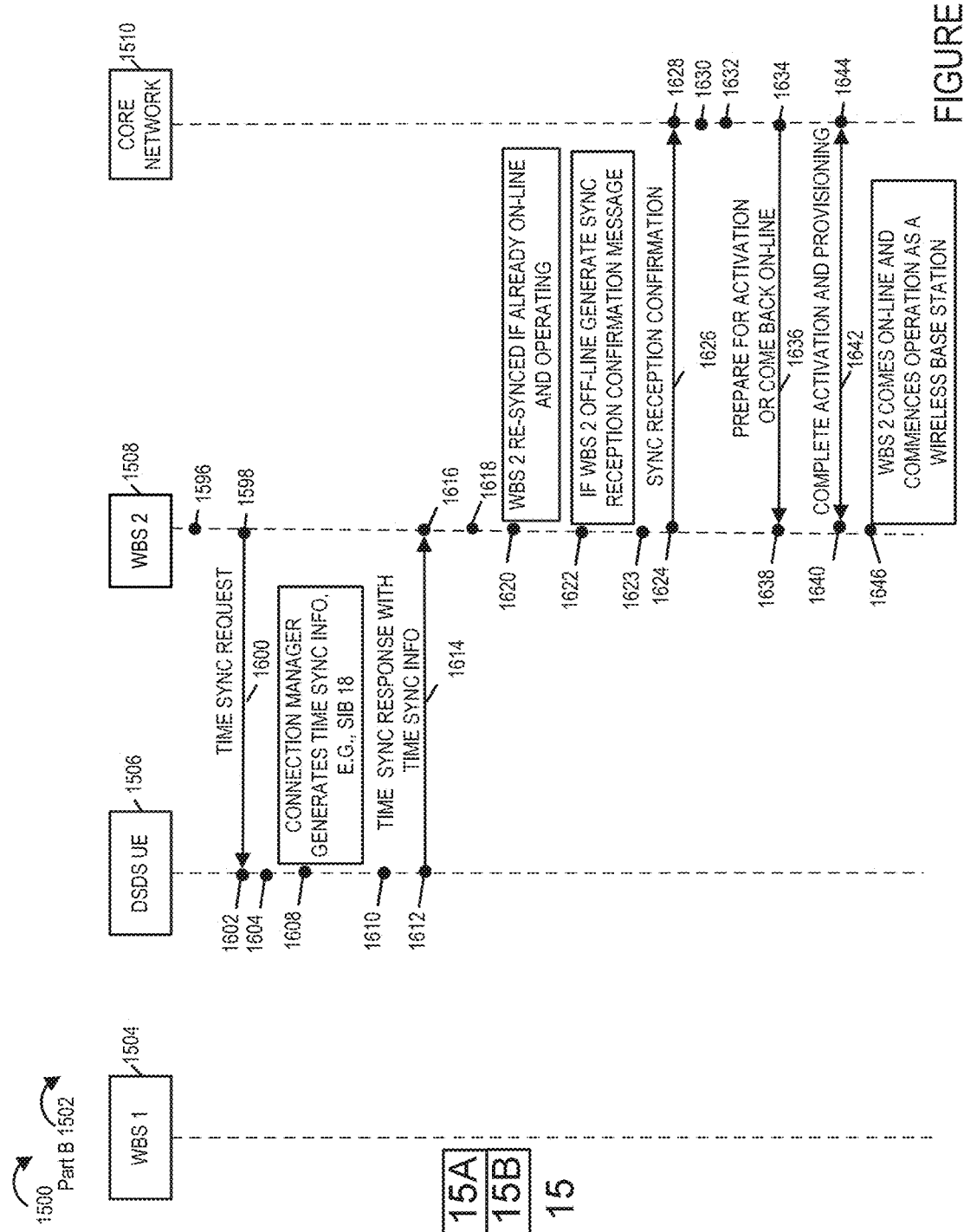

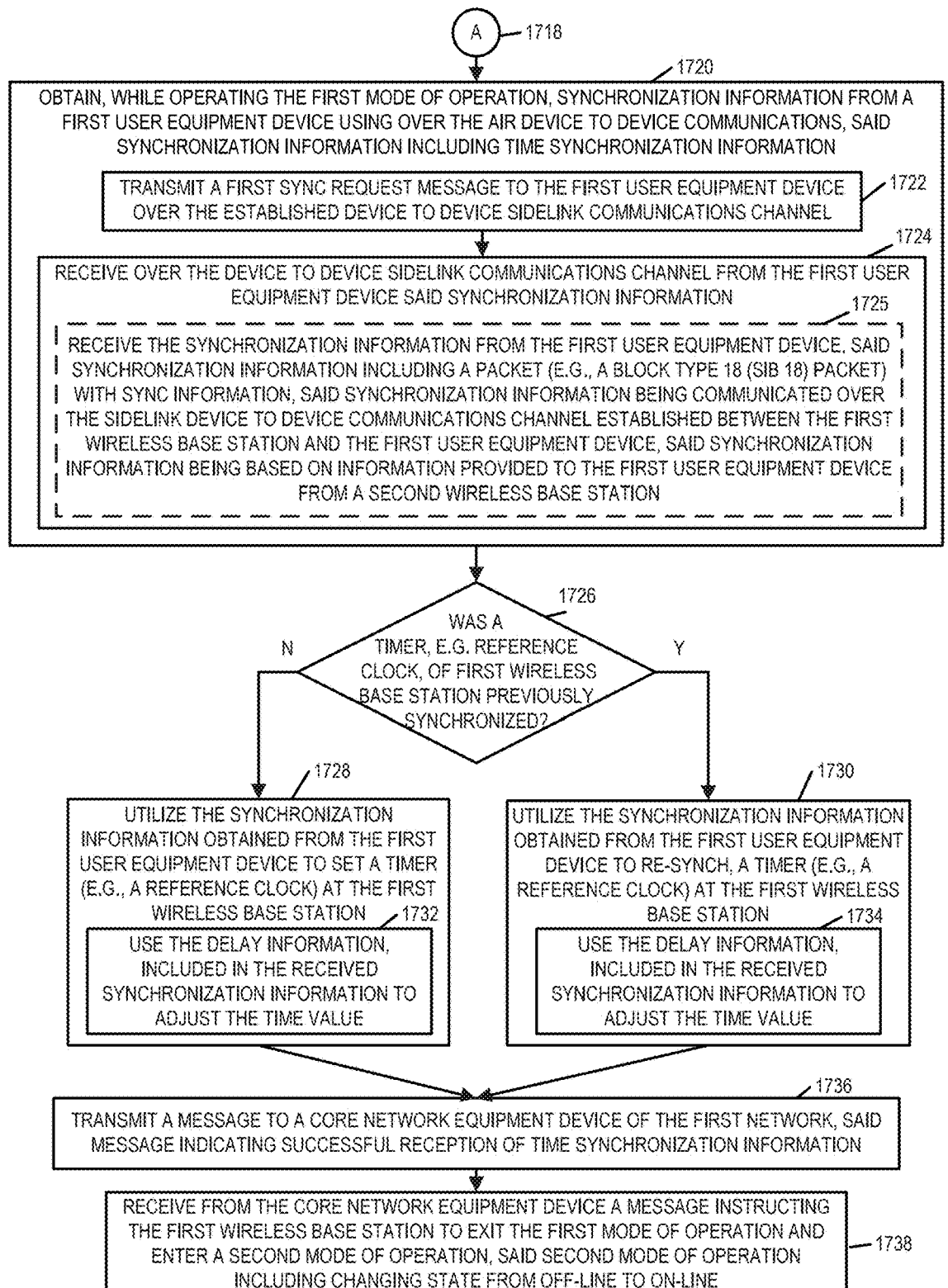

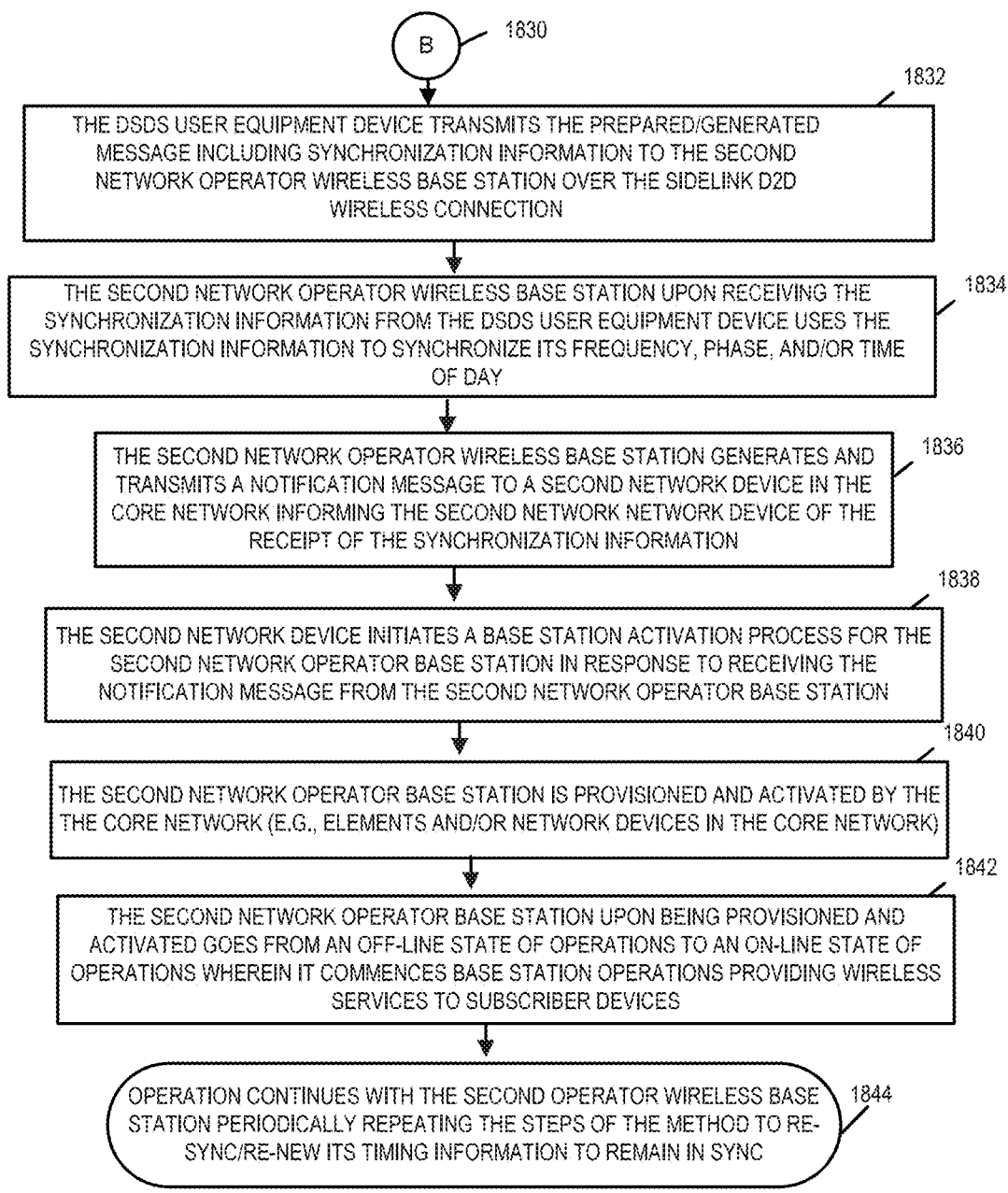

METHODS AND APPARATUS FOR FREQUENCY, PHASE AND TIME OF DAY SYNCHRONIZATION IN WIRELESS SYSTEMS

FIELD OF INVENTION

The present invention relates to methods and apparatus for achieving frequency, phase and time of day synchronization in wireless systems. The present invention further relates to methods and apparatus for providing and/or distributing synchronization information (e.g., frequency, phase, and time of day synchronization information) to devices, e.g., wireless base stations, in wireless networks.

BACKGROUND OF THE INVENTION

Wireless radios, e.g., Citizen Broadband Radio Service Time Division—Long Term Evolution New Radio (CBRS TD-LTE/NR) radios, need Global Positioning System (GPS) signals or Clock Sync such as IEEE 1588 (Precision Time Protocol) for Frequency, Phase and Time of Day (ToD) to operate. Without this synchronization the wireless base stations, e.g., CBSDs, and mobile devices, e.g., mobile phones, will not operate properly. For example, Time division duplex (TDD) refers to duplex communication links where uplink is separated from downlink by the allocation of different time slots in the same frequency band. Wireless communications system that uses TDD based communications protocols to communicate between base stations and user equipment devices require devices, e.g., base stations and user equipment devices, synchronized with a good, e.g., accurate, source of timing so that each device can determine where a time slot start and ends. If the timing between devices is not properly synchronized to within system tolerances, the devices which are out of synchronization will not be able to properly function as they will not be able to distinguish the beginning and ending of time slots.

This time synch is usually obtained from a GPS system in outdoor environments via wireless GPS signals. However, the wireless GPS signals are usually not strong enough inside of buildings/basements or even near high rise buildings to be consistently and reliably detected and/or received.

Traditionally, indoor, base stations such as CBRS TD-LTE radios are synchronized using a GrandMaster and a boundary clock approach as shown in system 100 of FIG. 1. In system 100 of FIG. 1, the boundary clock is the time sync server 138 which receives its timing information from the GSP grandmaster clock. The indoor base stations, e.g., Citizen Broadband Radio Service Devices (CBSDs) in a CBRS network, are configured with a clock time sync server's 138 Internet Protocol address to obtain Synchronization information. The time sync server 138 receives the Global Positioning System with timing information from GPS receiver 140 via communications link 142.

The wireless base stations of system 100 are indoor CBSDs located in building 102 with CBSD A1 116, . . . , CBSD AN 118 being located on the Pt floor of building 102; CBSD B1 120, . . . , CBSD BN 122 being located on the 2nd floor of building 102; CBSD C1 124, . . . , CBSD CN 126 being located on the third floor of building 102; CBSD D1 128, . . . , CBSD DN 130 being located on the fourth floor of building 102; and CBSD E1 132 to CBSD EN 134 being located on the fifth floor of building 102.

Dashed line 160 shows the demarcation of the first floor of the building from the second floor of the building 102. Dashed line 162 shows the demarcation of the second floor of the building from the third floor of the building 102. Dashed line 164 shows the demarcation of the third floor of the building from the fourth floor of the building 102. Dashed line 166 shows the demarcation of the fourth floor of the building from the fifth floor of the building 102. Building structures (e.g., ceilings, structural supports, flooring) separates the different floors of the building. The system includes a Main Distribution Frame (MDF) 104 and a plurality of Intermediate Distribution Frames (IDFs) (IDF 1 106, IDF 2 108, IDF 3 110, IDF 4 112, IDF 5 114. Each of the intermediate distribution frames (IDFs) includes a rack of network equipment for managing and interconnecting the telecommunications cables between CBSDs and the main distribution frame (MDF).

In system 100, cable 146 connects the CBSDs on the first floor of building 102 to each other and the IDF 1 106. IDF 1 106 is located on the first floor of building 102 and routes the cable 144 to the MDF 104 also located on the first floor. Cable 148 connects the CBSDs on the second floor of building 102 to each other and the IDF 2 108. IDF 2 108 is located on the second floor of building 102 and routes the cable 144 down the wall to the MDF 104 on the first floor. Cable 150 connects the CBSDs on the third floor of building 102 to each other and the IDF 3 110. IDF 3 110 is located on the third floor of building 102 and routes the cable 144 down the wall to the MDF 104 on the first floor. Cable 152 connects the CBSDs on the fourth floor of building 102 to each other and the IDF 4 112. IDF 4 112 is located on the fourth floor of building 102 and routes the cable 144 down the wall to the MDF 104 on the first floor. Cable 152 connects the CBSDs on the fourth floor of building 102 to each other and the IDF 5 114. IDF 5 114 is located on the fourth floor of building 102 and routes the cable 144 down the wall to the MDF 104 on the first floor.

The MDF 104 is a cable rack of equipment that interconnects and manages the wiring and/or cabling between itself and IDFs 106, 108, 110, 112, 114. While the IDFs, which connect internal building wiring and/or cabling to the MDF, the MDF 104 connects private or public lines coming into building 102 with the internal network of the building. In system 100, the MDF 104 is connected to Ethernet switch 135 via cable 145. The CBSDs are configured with the time sync server 138 Internet Protocol address and connect to the time sync server via an IDF, the MDF 104 and the Ethernet switch 135 which is connected to the time sync server 138.

This traditional approach requires expensive hardware for synchronizing the devices of system especially the indoor base stations.

From the foregoing, it should be understood that there is a need for new and/or improved methods and apparatus for achieving frequency, phase and time of day synchronization among devices in wireless networks and/or systems especially those utilizing wireless time division communications protocols. From the foregoing, it should be further understood that there is a need for new and/or improved methods and apparatus for wireless base stations, e.g., CBSDs in LTE TD CBRS networks, to provide, distribute, and/or obtain synchronization information (e.g., Frequency, Phase and/or Time of Day (ToD) information). Furthermore, there is a need for new and/or improved methods and apparatus for providing synchronization information when access to GPS signals is not available. Furthermore, there is a need for new and/or improved methods and apparatus for providing synchronization information utilizing less equipment and/or at less expense. Furthermore, there is a need for a technological solution to the problem of how a wireless base station (e.g., an indoor wireless small cell and/or micro cell base station) can obtain synchronization information (e.g., Frequency, Phase and/or Time of Day (ToD) information) without utilizing a local time synch server and/or when a time sync server goes off-line. There is a further need for new and/or improved methods and apparatus for reducing the equipment and therein the cost of providing frequency, phase and timing synchronization information to devices, e.g., indoor wireless base stations, in Hybrid Mobile Network Operator (HMNO) systems.

SUMMARY OF THE INVENTION

The present invention provides new and/or improved methods and apparatus for achieving timing synchronization, e.g., frequency, phase and/or time of day synchronization, among devices in wireless networks. Various embodiments of the present invention provide new and/or improved methods and apparatus for distributing timing synchronization information to devices, e.g., wireless base station, in system utilizing wireless time division communications protocols. Various embodiments of the present inventions provide new and/or improved methods and apparatus for wireless base stations, e.g., CBSDs in LTE TD CBRS networks, to provide, distribute, and/or obtain synchronization information (e.g., Frequency, Phase and/or Time of Day (ToD) information). Various embodiments of the present invention provide new and/or improved methods and apparatus for providing synchronization information when access to timing synchronization signals such as GPS signals is not available or is unreliable, e.g., when the path delay from a time source is unpredictable such that it cannot be reliably used for synchronization purposes. Various embodiments of the present invention also provide new and/or improved methods and apparatus for providing synchronization information utilizing less equipment and/or at less expense than traditional methods. Various embodiments of the present invention provide a technological solution to the problem of how a wireless base station (e.g., an indoor wireless small cell and/or micro cell base station) can obtain synchronization information (e.g., Frequency, Phase and/or Time of Day (ToD) information) without utilizing a local time synch server and/or when a time sync server goes off-line. Various embodiments of the present invention also provide new and/or improved methods and apparatus for reducing the equipment and therein the cost of providing frequency, phase and timing synchronization information to devices, e.g., indoor wireless base stations, in Hybrid Mobile Network Operator (HMNO) systems. Various embodiments of the present invention solve one or more of the problems discussed above.

In one exemplary embodiment of the present invention, a first wireless base station of a first network requests and obtains synchronization information, e.g., timing synchronization information, from a Dual SIM Dual Subscriber user equipment device via a device to device sidelink communications channel established between the first wireless base station and the Dual SIM Dual Subscriber user equipment device. The synchronization information provided to the first wireless base station by the Dual SIM Dual Subscriber user equipment device is based on synchronization obtained from a second wireless base station which is part of a second network to which the Dual SIM Dual Subscriber user equipment device has access but to which the first wireless base station does not have access. The Dual SIM Dual Subscriber user equipment device having the capability to communicate with both the first wireless base station in the first network and the second wireless base station in the second network via its dual subscriptions and dual SIMs. The first wireless base station uses the received synchronization information to sync or re-sync its reference clock or timer.

An exemplary method of in accordance with one embodiment of the present invention includes operating a first wireless base station in a first network to perform the following steps and/or operations: receiving, at the first wireless base station, a first message; in response to receiving the first message entering, by the first wireless base station, into a first mode of operation; and while operating in said first mode of operation, obtaining, by the first wireless base station, synchronization information from a first user equipment device using over the air device to device communications, said synchronization information including time synchronization information.

In some embodiments, the first wireless base station operates as a subscriber device in connection with the device to device communications with the first user equipment device.

In some embodiments, the first wireless base station is a subscriber with regard to a service which provides synchronization information via device to device sidelink communications with timing synchronized user equipment devices.

In some embodiments, the first wireless base station emulates a user equipment device when obtaining said synchronization information from the first user equipment device using over the air device to device communications.

In some embodiments, the step of obtaining, by the first wireless base station, synchronization information from a first user equipment device using over the air device to device communications includes: receiving, by the first wireless base station, the synchronization information from the first user equipment device, said synchronization information including a block type 18 (SIB 18) packet with sync information, said synchronization information being communicated over a sidelink device to device communications channel established between the first wireless base station and the first user equipment device, said synchronization information being based on information provided to the first user equipment from a second wireless base station.

In some embodiments, the first network is a hybrid mobile network, the first message is a first control message from a first network equipment device which is part of the hybrid mobile network, and the first message is received by the first wireless base station over a landline. In some such embodiments, the hybrid mobile network includes a Citizens Broadband Radio Service Time Division—Long Term Evolution (CBRS TD-LTE) network with wireless communications devices utilizing CBRS TD-LTE New Radio radios; wherein said first wireless communications devices include the first wireless base station and the first user equipment device. In some embodiments, the first wireless base station is an indoor Hybrid Mobile Network Operator (HMNO) small cell Citizens Broadband Radio Service Device (CBSD).

In various embodiments, the first user equipment device is a Dual Subscriber user equipment device having credentials for two different mobile subscription services (e.g., authentication credentials for a first service provider's mobile network and authentication for a second service provider's mobile network).

In some embodiments, the first user equipment device is a Dual Subscriber Identity Module (SIM) Dual Subscriber user equipment device.

In some embodiments, the first user equipment device is a Dual Subscriber Identity Module (SIM) Dual Standby user equipment device.

In some embodiments, the first user equipment device is a Dual Subscriber Identity Module (SIM) Dual Active user equipment device.

In some embodiments, the first wireless base station is coupled to a HMNO core network via a cable modem; and wherein the first wireless base station receives the first message from a network equipment device in the HMNO core network via the cable modem.

In some embodiments, the synchronization information further includes frequency and phase information.

In some embodiments, synchronization information is frequency, phase and time of day information required for operating as a wireless base station.

In some embodiments, the synchronization information is a clock sync or time sync signal (e.g., clock signal such as IEEE 1588 for frequency, phase and time of day).

In some embodiments, the synchronization information is a clock sync or time sync signal derived from information included a Network Time Protocol (NTP) message received from a NTP server via a second wireless base station, said first user equipment device receiving said synchronization information from said second wireless base station, said second wireless base station being operated by a different service provider than said first wireless base station, and wherein said first wireless base station and said second wireless base station are operating using different spectrum bands.

In some embodiments, the first user equipment device is a Dual Subscriber Identity Module (SIM) Dual Standby or a Dual Subscriber Identity Module (SIM) Dual Active user equipment device, which includes a first SIM corresponding to the service provider of the first network and a second SIM corresponding to said different service provider. In some such embodiments, the first SIM includes a first authentication key corresponding to a first subscription with the first service provider; and wherein the second SIM includes a second authentication key corresponding to a second subscription with second service provider.

In some embodiments, the first message is a first control message which includes an instruction for the first wireless base station to enter the first mode of operation; and while operating in said first mode of operation the first wireless base station commences wirelessly transmitting device to device discovery request messages, said device to device discovery request messages including a first device to device discovery request message. In some such embodiments, the device to device discovery request messages are device to device Proximity Service discovery request beacon messages announcing to monitoring Proximity Service devices that the first wireless base station is seeking to establish a device to device wireless connection.

In some embodiments, the first message is a first control message which includes an instruction for the first wireless base station to enter a discovery mode of operation, said first mode of operation being a discovery mode of operation.

In some embodiments, the first message is a first control message which includes an instruction for the first wireless base station to enter a device to device mode of operation, said first mode of operation being a device to device mode of operation.

In some embodiments, the first user equipment device is a mobile device with Dual Subscriber Identity Module (SIM) Dual Subscriber (DSDS) functionality; and wherein said synchronization information is based on synchronization information obtained by the first user equipment device from a second wireless base station, said second wireless base station not being part of the first network.

In various embodiments, the second wireless base station is part of a second wireless network, said first network and said second network being operated by different service providers, said first network being operated by a first service provider and said second network being operated by a second service provider. In some embodiments, the first wireless base station and said second wireless base station utilize different spectrum bands for communicating with subscriber devices; and, the first user equipment device includes a first SIM card with subscriber credentials for the first network and a second SIM card with subscriber credentials for the second network.

In some embodiments, the first user equipment device is a subscriber of the first service provider and a subscriber of the second service provider.

In some embodiments, the first wireless base station operates in a first spectrum band; wherein the second wireless base station operates in a second spectrum band; and wherein said first and second spectrum bands are different.

In some embodiments, the first spectrum band is general authorized access (GAA) spectrum and the second spectrum band is priority access license (PAL) spectrum.

In some embodiments the method further includes the steps of: receiving, by the first wireless base station from the first user equipment device, a discovery request response message in response to the first device to device discovery request message; and establishing a sidelink device to device communications channel with the first user equipment device.

In some embodiments, the step of establishing a sidelink device to device communications channel with the first user equipment device includes obtaining sidelink resource information from a core network for establishing the sidelink device to device communications channel between the first wireless base station and the first user equipment device. In some such embodiments, the resource information includes information specifying spectrum granted or allocated for the sidelink device to device communications channel to be established.

In some embodiments, the sidelink resource information is obtained by the first wireless base station. In some such embodiments, the step of establishing a sidelink device to device communications channel with the first user equipment device includes transmitting the sidelink resource information to the first user equipment device.

In some embodiments, the core network is part of the first network. In various embodiments, the sidelink resource information specifies spectrum authorized for use by subscribers of the first network or available for use by subscribers of the first network.

In some embodiments, the core network is not part of the first network but is a part of a second network. In some embodiments, the first user equipment device obtains the sidelink resource information via a second wireless base station and shares the sidelink resource information with the first wireless base station.

In some embodiments, the device to device discovery request messages are device to device Proximity Service discovery request beacon messages announcing to monitoring Proximity Service devices that the first wireless base station is seeking to establish a device to device wireless connection; and the discovery request response message is Proximity Service discovery response request message.

In various embodiments, the step of obtaining, by the first wireless base station, synchronization information from a first user equipment device using over the air device to device communications, said synchronization information including time synchronization information includes: (i) transmitting a first sync request message to the first user equipment device over the established device to device sidelink communications channel; and (ii) receiving over the device to device sidelink communications channel from the first user equipment device said synchronization information.

In some embodiments, the synchronization information received from the first user equipment device is based on synchronization information received by the first user equipment device from a second wireless base station, said second wireless base station not being part of the first network.

In some embodiments, the method further includes the step of utilizing, by the first wireless base station, the synchronization information obtained from the first user equipment device to set a timer at the first wireless base station.

In some embodiments, the synchronization information includes a time value and delay information. In some such embodiments, the step of utilizing, by the first wireless base station, the synchronization information obtained from the first user equipment device to set a timer (e.g., reference clock) at the first wireless base station includes using the delay information to adjust the time value.

In some embodiments, the time value is a time stamp value and the delay value is a path transmission delay value.

In some embodiments, the method further comprises the steps of: transmitting, by the first wireless base station, a message to a core network equipment device of the first network, said message indicating successful reception of time synchronization information; and receiving from the core network equipment device a message instructing the first wireless base station to exit the first mode of operation and enter a second mode of operation, said second mode of operation including changing state from off-line to on-line; and wherein when the first wireless base station is in an off-line state of operation it does not operate as a wireless base station and when the first wireless base station is in an on-line state of operation it performs wireless base station operations and provides wireless base station services to user equipment devices.

In some embodiments, the method further includes the step of re-synching, by the first wireless base station, a timer (e.g., a reference clock) at the first wireless base station using the synchronization information obtained from the first user equipment device.

Another exemplary method in accordance with an embodiment of the present invention is directed to the operation of a dual Subscriber Identity Module (SIM) user equipment device. The method of operating the dual SIM user equipment device including the steps of: receiving, at the dual SIM user equipment device from a first wireless base station, a request message requesting synchronization information, said synchronization information including timing synchronization information; in response to receiving the request for synchronization information from the first wireless base station, generating by the dual SIM user equipment device a synchronization message including the requested synchronization information based on synchronization information obtained by the dual SIM user equipment device from a second wireless base station; and transmitting the synchronization message to the first wireless base station.

In some embodiments the method further includes the steps of: prior to receiving the request message requesting synchronization information from the first wireless base station, receiving, by the dual SIM user equipment device a device to device (D2D) discovery request message from the first wireless base station; and in response to receiving the D2D discovery request message, establishing a device to device (D2D) sidelink communication channel with first wireless base station; and wherein the synchronization message is transmitted to the first wireless base station over the established D2D sidelink communications channel.

In some embodiments, the method further includes the step of: prior to generating the synchronization message, requesting synchronization information from a second wireless base station, said first wireless base station and said second wireless base station belonging to different wireless networks, said dual SIM user equipment device including a first SIM card and a second SIM card, said dual SIM user equipment device being able to communicate with the first wireless base station using information contained on the first SIM card, said dual SIM user equipment device being able to communicate with the second wireless base station using information contained on the second SIM card.

In some such embodiments, the D2D discovery request message is a Proximity Service discovery request message; and the D2D sidelink communications channel is established using Proximity Services.

In some embodiments, the first wireless base station utilizes a time division duplex wireless protocol to communicate with user equipment devices.

In some embodiments, establishing a device to device (D2D) sidelink communication channel with first wireless base station includes receiving information from the first wireless base station indicating the resources (e.g., spectrum) to be used for the D2D sidelink communications channel.

In some embodiments, the first wireless base station is an indoor wireless base station (e.g., small cell CBSD); and the second wireless base station is an eNodeB.

The present invention is also applicable to apparatus and system embodiments wherein one or more devices implement the steps of the method embodiments. In some apparatus embodiments each of the wireless base station, user equipment devices, network equipment devices and each of the other apparatus/devices/nodes of the system include one or more processors and/or hardware circuitry, input/output interfaces including receivers and transmitters, and a memory. The memory including instructions when executed by one or more of the processors control the apparatus/device/node of the system to operate to perform the steps and/or functions of various method embodiments of the invention.

The present invention is also applicable to and includes apparatus and systems such as for example, apparatus and systems that implement the steps and/or functions of the method embodiments. For example, a communication system in accordance with one embodiment of the present invention includes: a first wireless base station comprising: first receiver (network interface receiver); and a processor configured to operate the first wireless base station to: receive, via the first receiver, a first message; enter into a first mode of operation in response to the received first message; and obtain, while operating in the first mode of operation, synchronization information from a first user equipment device using over the air device to device communications, said synchronization information including time synchronization information.

In another exemplary system embodiment includes a dual Subscriber Identity Module (SIM) user equipment device comprising: a memory, and a first processor, said processor controlling the dual SIM user equipment device to perform the following operations: receive, at the dual SIM user equipment device from a first wireless base station, a request message requesting synchronization information, said synchronization information including timing synchronization information; in response to receiving the request for synchronization information from the first wireless base station, generate by the dual SIM user equipment device a synchronization message including the requested synchronization information based on synchronization information obtained by the dual SIM user equipment device from a second wireless base station; and transmit the synchronization message to the first wireless base station.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 6 illustrates details of an exemplary network equipment device, e.g., mobile management entity, base station discovery device, Proximity Service Function element/node, in accordance with one embodiment of the present invention.

FIG. 15 comprises FIG. 15A and FIG. 15B.

FIG. 15B is the second part of a signaling diagram which illustrates the steps and signaling of an exemplary method in accordance with an embodiment of the present invention.

FIG. 17B is a second part of a flowchart of an exemplary method of operating a first wireless base station in accordance with an exemplary embodiment.

FIG. 17 comprises the combination of FIG. 17A and FIG. 17B.

FIG. 18 illustrates the combination of FIG. 18A, FIG. 18B and FIG. 18C.

FIG. 18C illustrates the steps of the third part of an exemplary method in accordance with an embodiment of the present

DETAILED DESCRIPTION

Citizens Broadband Radio Service (CBRS) is a tiered solution with the top tier dedicated for fixed satellite, wireless internet service providers as well as navy radar. The second tier consists of PAL (Priority Access Licensees) and the last tier consists of General Authorized Access (GAA).

Figure 1:
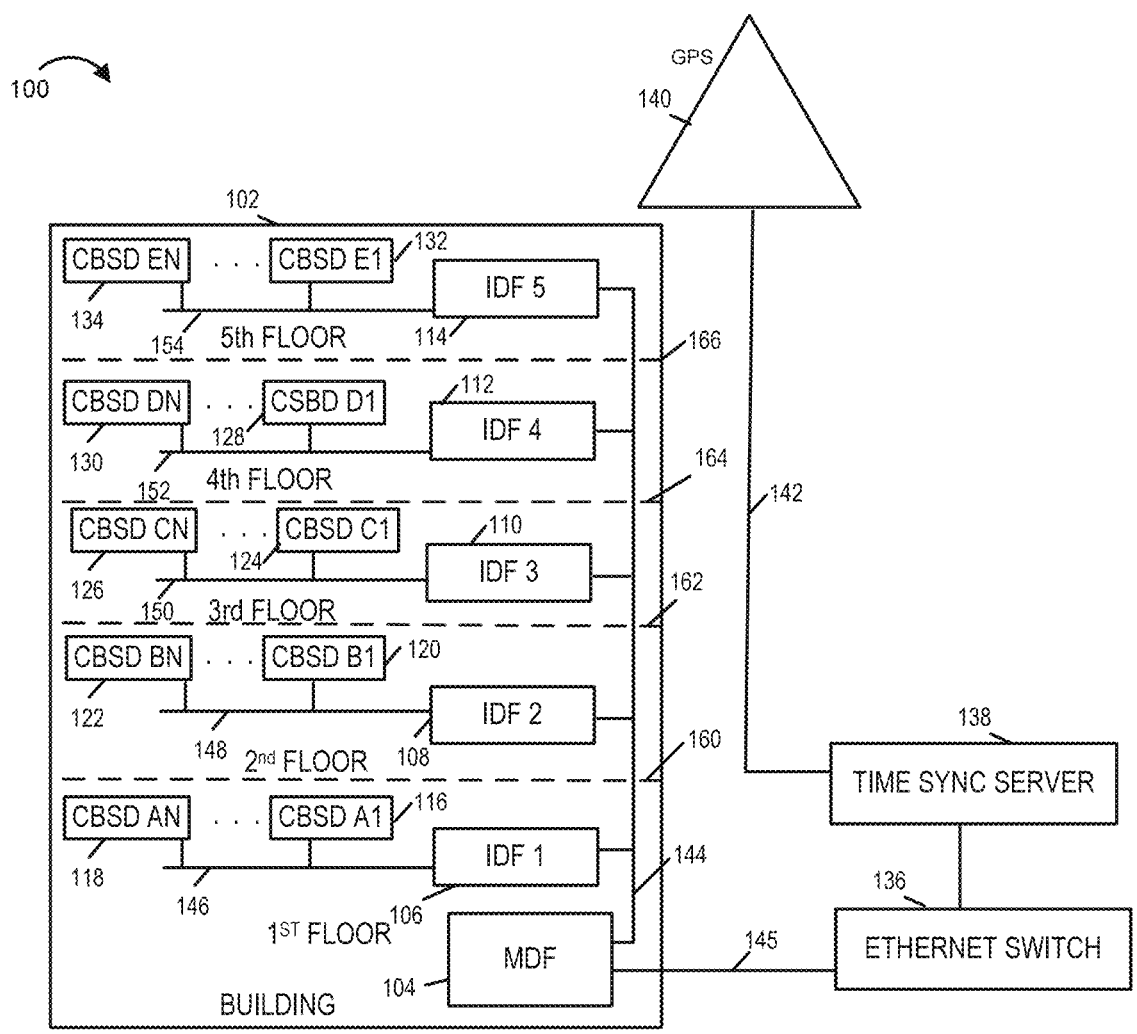
FIG. 1 illustrates a traditional system for providing time sync information to indoor wireless base stations in a wireless system.

FIG. 1 as discussed above illustrates a system that utilizes a traditional approach to obtaining and distributing timing information using a time sync server which obtains it timing information via a GPS system.

Figure 2:
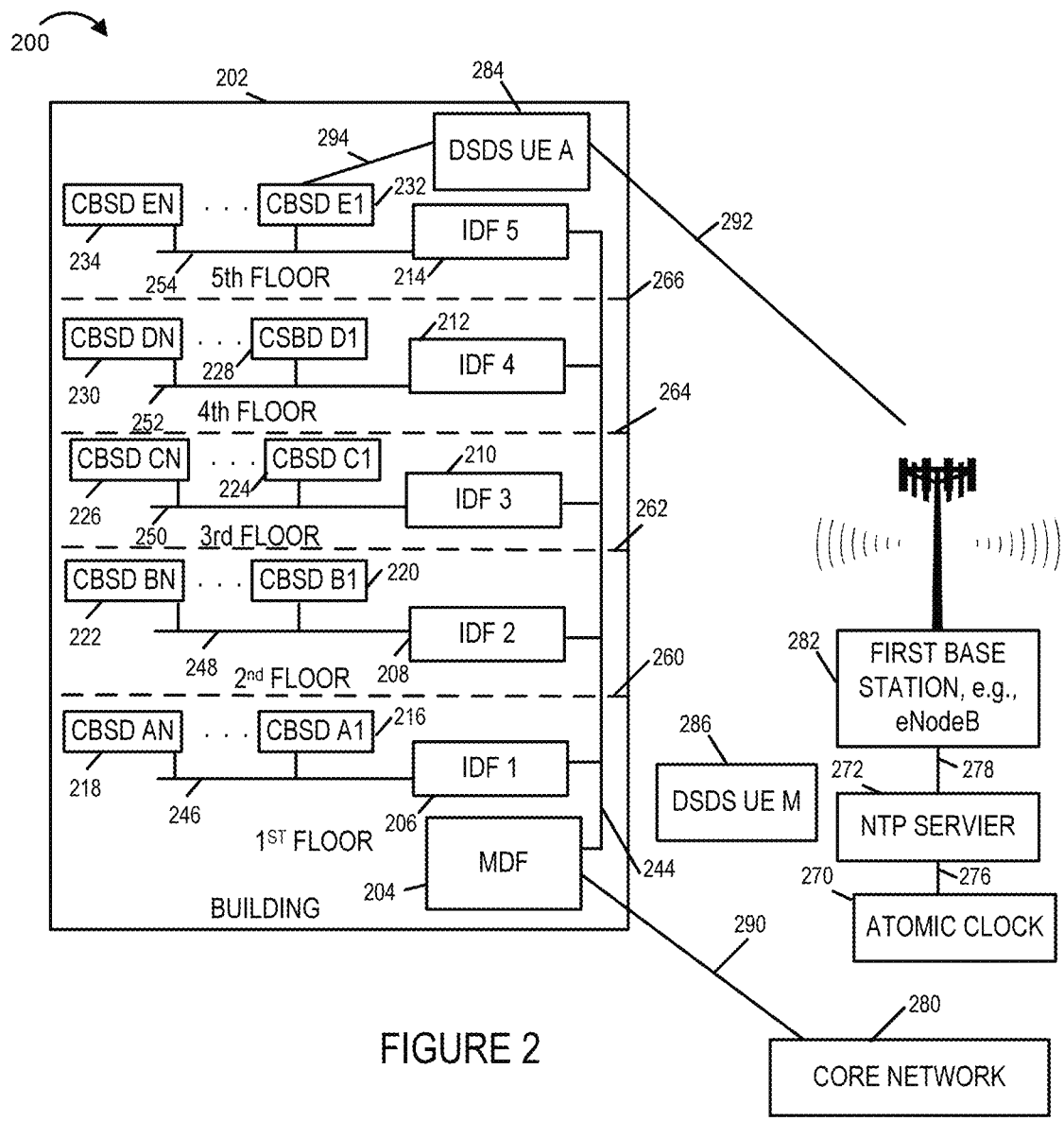
FIG. 2 illustrates an exemplary system in accordance with an embodiment of the present invention without a time sync server.
Figure 13:
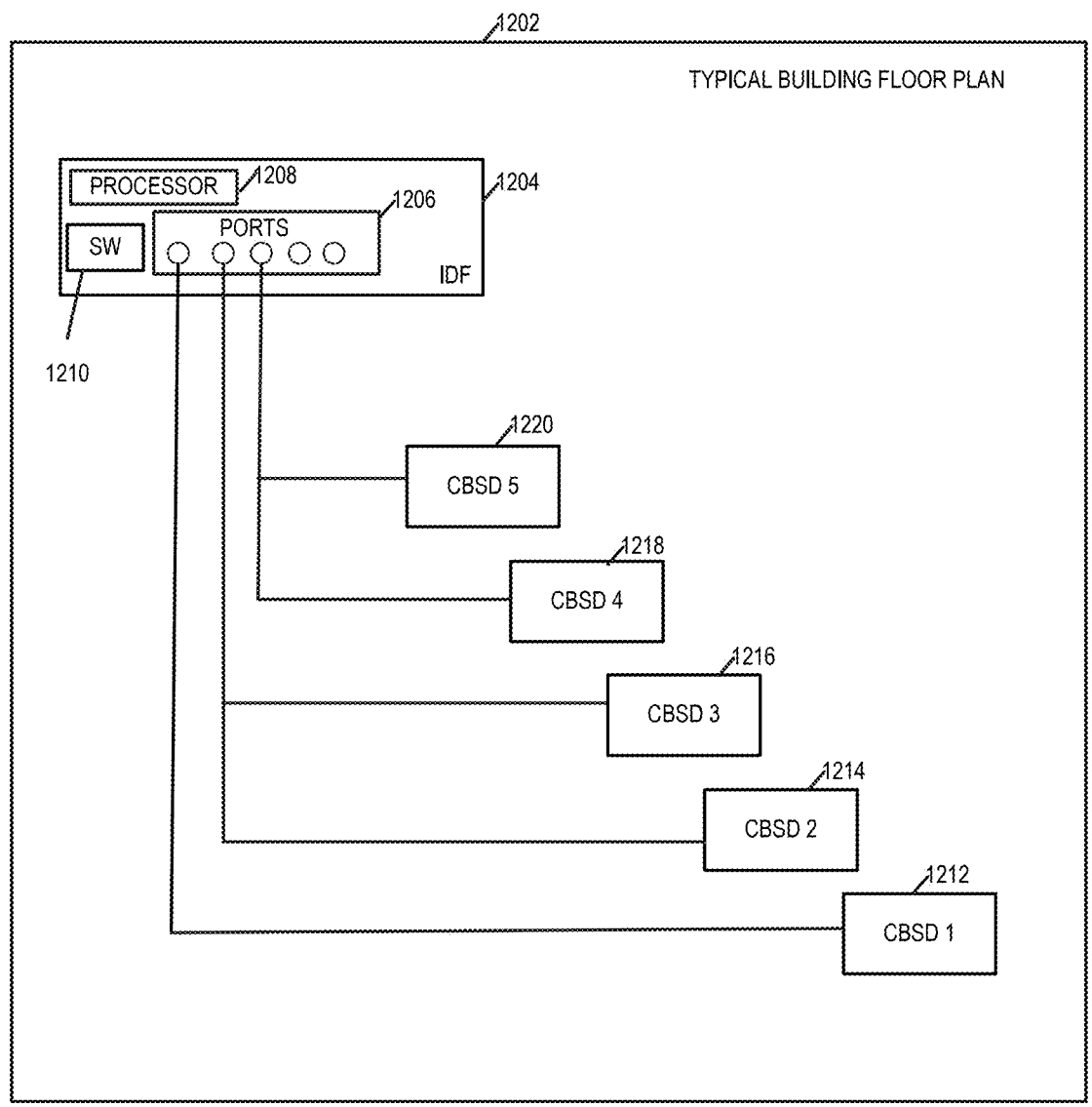
FIG. 13 illustrates an exemplary building floor plan with a plurality of wireless base stations in accordance with an embodiment of the present invention.

FIG. 2 illustrates an exemplary system 200 in accordance with an embodiment of the present invention. FIG. 13 illustrates an exemplary typical building floor plan 1202 with a plurality of wireless base stations that may be, and in some embodiments is, used for example in building 202 of FIG. 2. The building floor plan includes an Intermediate Distribution Frame (IDF) 1204 which includes a processor 1208, software instructions in memory 1210 which when executed by the processor 1208 control the operation of the IDF 1204, communications ports 1206, and cables connecting the IDF 1204 to plurality of wireless base stations implemented as CBSDs (CBSD 1 1212, CBSD 2 1214, CBSD 3 1216, CBSD 4 1218, CBSD 5 1220). The fifth floor of the building 202 may be implemented using the floor plan 1202. In such a case, CBSD 1 1212, CBSD 2 1214, CBSD 3 1216, CBSD 4 1218, and CBSD 5 1220 are CBSD E1 232, . . . , CBSD EN 234, where N=5 and IDF 1204 is IDF 5 214.

In system 200 of FIG. 2, the timing synchronization information is obtained by an indoor base station via a dual SIM dual subscriber user equipment device. The dual SIM dual subscriber user equipment device obtains the timing synchronization information from a wireless base station which is part of a different wireless network than the indoor wireless base. The indoor base stations, e.g., Citizen Broadband Radio Service Devices (CBSDs) in a CBRS network, are configured with a Proximity Service application that allows them to operate as subscriber devices and establish device to device communications channels with other user equipment devices within range of their radios. The indoor wireless base stations of system 200 are CBSDs located in building 202 with CBSD A1 216, . . . , CBSD AN 218 being located on the 1$^{st}$ floor of building 202 (N being an integer greater than 1); CBSD B1 220, . . . , CBSD BN 222 being located on the 2nd floor of building 202 (N being an integer greater than 1); CBSD C1 224, . . . , CBSD CN 226 being located on the third floor of building 202 (N being an integer greater than 1); CBSD D1 228, . . . , CBSD DN 230 being located on the fourth floor of building 202 (N being an integer greater than 1); and CBSD E1 232 to CBSD EN 234 being located on the fifth floor of building 202 (N being an integer greater than 1). Dashed line 260 shows the demarcation of the first floor of the building from the second floor of the building 202. Dashed line 262 shows the demarcation of the second floor of the building from the third floor of the building 202. Dashed line 264 shows the demarcation of the third floor of the building from the fourth floor of the building 202. Dashed line 266 shows the demarcation of the fourth floor of the building from the fifth floor of the building 202. Building structures (e.g., ceilings, structural supports, flooring) separates the different floors of the building. The system includes a Main Distribution Frame (MDF) 204 and a plurality of Intermediate Distribution Frames (IDFs) (IDF 1 206, IDF 2 208, IDF 3 210, IDF 4 212, IDF 5 214. Each of the intermediate distribution frames (IDFs) includes a rack of network equipment for managing and interconnecting the telecommunications cables between CBSDs and the main distribution frame (MDF). In system 200, cable 246 connects the CBSDs on the first floor of building 202 to each other and the IDF 1 206. IDF 1 206 is located on the first floor of building 202 and routes the cable 244 to the MDF 204 also located on the first floor. Cable 248 connects the CBSDs on the second floor of building 202 to each other and the IDF 2 208. IDF 2 208 is located on the second floor of building 202 and routes the cable 244 down the wall to the MDF 204 on the first floor. Cable 250 connects the CBSDs on the third floor of building 202 to each other and the IDF 3 210. IDF 3 210 is located on the third floor of building 202 and routes the cable 244 down the wall to the MDF 204 on the first floor. Cable 252 connects the CBSDs on the fourth floor of building 202 to each other and the IDF 4 212. IDF 4 212 is located on the fourth floor of building 202 and routes the cable 244 down the wall to the MDF 204 on the first floor. Cable 252 connects the CBSDs on the fourth floor of building 202 to each other and the IDF 5 214. IDF 5 214 is located on the fourth floor of building 202 and routes the cable 244 down the wall to the MDF 204 on the first floor. The MDF 204 is a cable rack of equipment that interconnects and manages the wiring and/or cabling between itself and IDFs 206, 208, 210, 212, 214. While the IDFs, which connect internal building wiring and/or cabling to the MDF, the MDF 204 connects private or public lines coming into building 202 with the internal network of the building. In system 200, the MDF 204 is connected to a core network 280 via cable 290. The system also includes an atomic clock 270, an NTP server 272, a first wireless base station 282, e.g., eNodeB, and a plurality of dual SIM dual subscriber (DSDS) user equipment devices (DSDS UE A 284, . . . , DSDS UE M 286, M being an integer greater than 1). In some embodiments, first wireless base station 282 is operated by a first service provider and the CBSDs in the building 202 are operated by a second service provider and require two separate subscriptions. The plurality of DSDS UEs are subscribers to both the first service provider and the second service provider and include a first subscription to the first service provider's services allowing access to the services offered by the first base station and a second subscription to the second service provider's services offered by the CBSDs in the building 202. Each DSDS user equipment device has a first SIM card having credentials to access the first service provider's network including the first base station 282 and a second SIM card having credentials to access the second service provider's network including the CBSDs in the building 202. Communications link 276 couples/connects the atomic clock 270 to the Network Time Protocol (NTP) server 272. The communications link 278 couples/connects the NTP server 272 to the first base station 282. Communications links 292 and 294 are wireless communications link. Communications link 294 connects/couples CBSD E1 232 to DSDS UE A 284. Communications link 292 couples/connections DSDS UE A 284 to first base station 282. How communications link 292 and 294 are established is discussed below.

The NTP server 276 receives time information from the atomic clock 270. The NTP server 276 distributes timing information to the first base station 282 via NTP protocol messages. The CBSDs in the building 202 do not have a landline connection to a reliable clock source unlike in system 100. Instead, the CBSDs obtain there synchronization from the first wireless base station 282 via the DSDS user equipment devices which have dual subscriptions and can communicate with both the CBSDs in the building 202 and the first wireless base station 282. For example, CBSD E1 232 acquires timing synchronization in the following manner. The CBSD E1 232 broadcasts over the air device to device (D2D) discovery request messages, e.g., a Proximity Service discovery request, to user equipment devices within range of its radio transmission. The DSDS user equipment device A 284 receives one of the broadcast discovery request messages and determines to accept the D2D discovery request. In response to the discovery request message, the DSDS UE A 284 send a discovery response message to the CBSD E1 232. The DSDS UE A 284 is also receiving wireless signals from first base station 282 because it is within it cell coverage range. After the CBSD E1 232 receives the DSDS UE A 284 response message, a device to device sidelink communications channel is established between DSDS UE A 284 and CBSD E1 using resources, e.g., spectrum in time and frequency resource blocks, allocated/assigned for the device to device sidelink communications channel for example by the core network 280 or the first base station 282. Typically, the core network 280 assigns the resources so that the second service operator's spectrum is used and compatibility of radios and resources, e.g., spectrum, is assured. Once, the D2D sidelink communications channel is established, the CBSD E1 232 receives timing synchronization information from the DSDS UE A 284 over the D2D sidelink communications channel. In some embodiments, the DSDS UE A 284 sends the timing synchronization information in response to a request sent by the CBSD E1 232. The timing synchronization is based on timing synchronization information the DSDS UE A 284 has received from the first base station 282. In some embodiments, the DSDS UE A 284 will request that its timing synchronization information be updated prior to providing the requested timing synchronization to the CBSD E1 232 so that it fresh. In some embodiments, once the CBSD E1 232 has obtained timing synchronization information from the DSDS UE A 284 it can in turn distribute it to other CBSDs in the building to which it is connected. In this example, the CBSDs in the building do not receive the signals transmitted by the first base station due to the structure of the building and/or spectrum utilized for the signals and/or the radios used by the CBSDs and/or wireless protocols which the CBSDs are configured to use. However, the DSDS UE A 284 does receive signals from the first base station. While the invention has been described at a high level with respect to the CBSD E1 232 and DSDS UE A 284 these devices are only exemplary. For example, the CBSD A1 216 on the first floor of building 202 can use the same procedure with respect to DSDS UE M 286 when DSDS UE M 286 is within the wireless transmission range of CBSD A1 216 (even if outside the building 202) and DSDS UE M 286 is able to obtain timing synchronization information from the first base station 282.

The exemplary system 200 illustrates how timing synchronization information may be, and in some embodiments are distributed in a wireless system, e.g., a time division duplex system.

Figure 3:
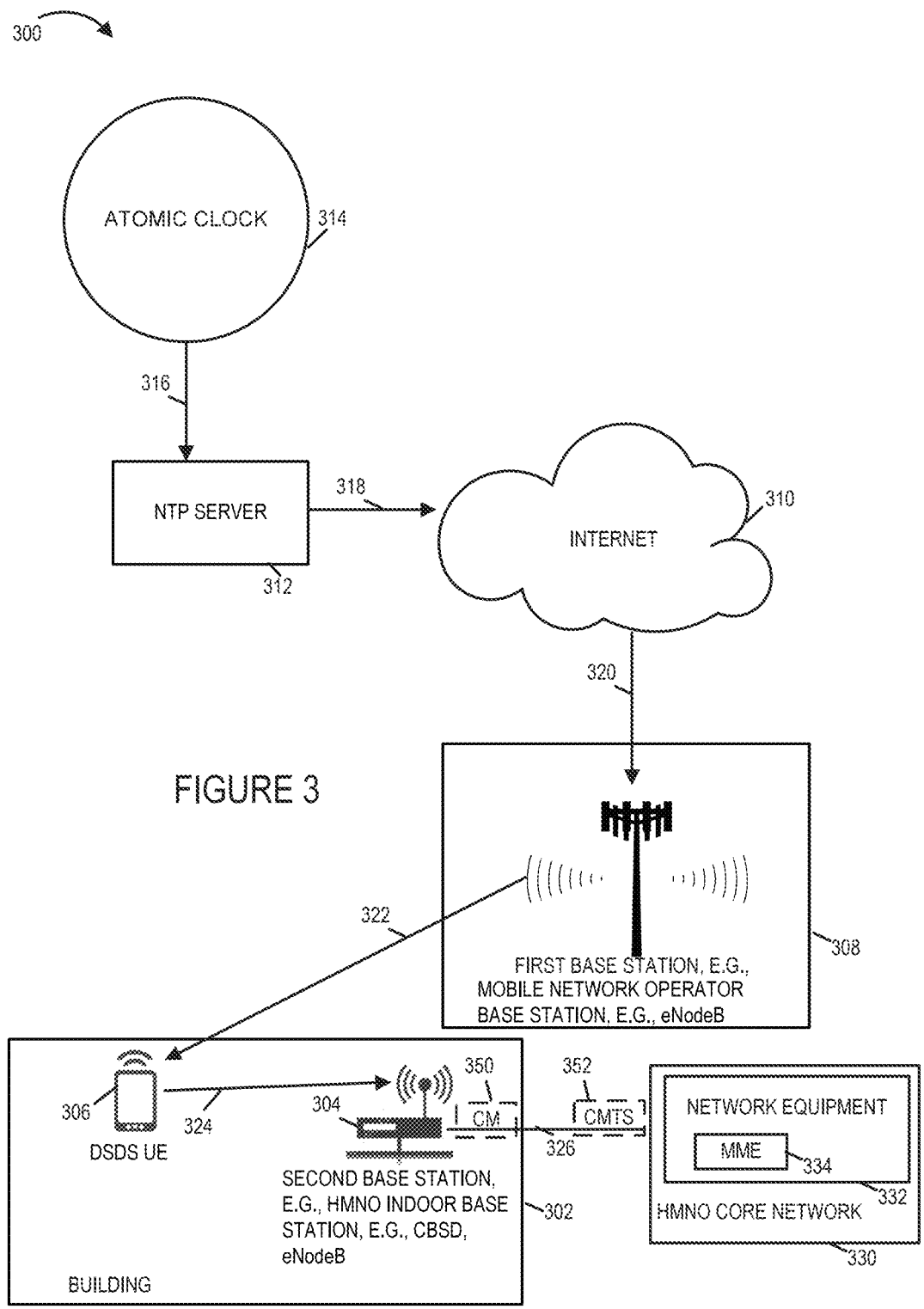
FIG. 3 illustrates an exemplary system in accordance with the present invention.

FIG. 3 illustrates another exemplary system 300 in accordance with an embodiment of the present invention. System 300 of FIG. 3 provides further details of the invention with a focus on the interactions between an exemplary first base station, second base station, and a Dual SIM Dual Subscriber user equipment device.

The system includes an atomic clock 314, a Network Time Protocol (NTP) Server 312 coupled to the Internet 310, a first wireless base station 308, a Dual Subscriber Identity Module Dual Subscriber (DSDS) user equipment device 306, a second wireless base station 304, and a core network 328. The first wireless base station 308 in the system 300 is a Mobile Network Operator (MNO) base station, e.g., eNodeB. The first wireless base station 308 and NTP server 312 are part of a first network operated by first service provider also sometimes referred to herein as the Mobile Network Operator (MNO). The second wireless base station 304 is a Hybrid Mobile Network Operator (HMNO) indoor base station, e.g., a Citizen Broadband Radio Service Device (CBSD) implemented as an eNodeB. The second wireless base station 304 is located in a building 302. The second wireless base station 304, in at least some embodiments, is not able to receive GPS signals reliably or at all, e.g., due to second wireless base station's location in the building 302. For example, the building structure may interfere with and/or block wireless GPS signals from being received by the second wireless base station 304. The core network 328 is a HMNO core network. The core network 330 and second base station 304 are part of a HMNO network operated by a second service provider also referred to herein as an HMNO operator. The core network 330 includes network equipment 332. The network equipment 332 includes a Mobile Management Entity 334. The first service provider and the second service provider are different service providers. That is the MNO operator and the HMNO are different operators, e.g., the Mobile Network Operator may be Verizon and the Hybrid Mobile Network Operator is Charter Communications.

The atomic clock 314 is coupled to the NTP server 312 via a communications link 316. The NTP server 312 is coupled to the Internet 310 via communications link 318. The Internet 310 is coupled to the first wireless base station 308 via communications link 320. The first wireless base station is coupled to the DSDE UE 306 via communications link 322. The DSDE UE 306 is coupled to the second wireless base station 302 via communications link 324. The second wireless base station 304 is coupled to the core network 330 via communications link 326. The communications links 322 and 324 are wireless communications link. The communications links 316, 318, 320, and 326 are landline links, e.g., wired or optical cable links. While the communications link in system 300 are bi-directional, the arrows on the links have been provided to illustrate how timing information travels from the atomic clock 314 to the NTP server 312 from the NTP server 312 to first base station 308 from the first base station 308 to the DSDS UE 306 and from the DSDS UE 306 to the second base station 304 as will be explained in detail below.

Generally, wireless operators distribute the clock signal for synchronization via an NTP server and the Internet. For example, with respect to system 300, the atomic clock 314 generates an atomic clock signal which is communicated over communications link 316 to an NTP server 312 of the mobile network operator or first service provider. The NTP server 312 distributes the atomic clock signal using the Network Time Protocol (NTP) over the Internet 310 to base stations of the first service provider or mobile network operator. These base stations include the first wireless base station 308. The clock signal is sent from the NTP server 312 via communications link 318, Internet 310, communications link 320 to the first wireless base station 308 where it is received. The first wireless base station 308 in turn distributes the clock signal to the DSDS UE 306 over communications link 322.

In theory, a given wireless device, e.g., CBRS device such as a wireless base station, can listen to another wireless network's signals, e.g., another CBRS network's signals and obtain synch information from those signals as the sync information is embedded in the Master Information Block (MIB) in the form of Primary Synchronization signal and secondary synchronization signal which is continuously broadcasted by wireless base stations, e.g., CBRS wireless base stations also known as Citizen Broadband Radio Service Device (CBSD). However, wireless base stations such as those located indoors do not always receive synchronization signals. When this is the case, if another in-network device is not available to provide synchronization information then the device will not be able to sync and will go out of service. This is specifically true for indoor wireless base station, e.g., CBRS network devices, that are unable to listen to another CBRS network device. Higher frequency spectrum is used for CBRS networks so the propagation of wireless signals is not as good as wireless networks using spectrum which lower frequency spectrum.

However, if an operator's mobile wireless network is a Hybrid Mobile Network with Hybrid Mobile Network Operation (HMNO) which requires Dual SIM Dual subscription (DSDS) mobile devices, e.g., phones, that are equipped with connection managers to coordinate offload, then the DSDS capability/functionality can be used to provide synch (i.e., synchronization information) to network devices that need time synch. System 300 illustrates a second wireless base station 304, which is a HMNO indoor wireless base station, which obtains synchronization information, e.g., frequency, phase and Time of Day Synchronization, from the first service provider first base station 308 via DSDS UE 306. The first wireless base station 308 has been provided synchronization information from the NTP 312 of the first service provider. The DSDS UE 306 is a Dual SIM Dual subscription mobile device, e.g., a smartphone, that is equipped with a connection manager to coordinate offloading of traffic between the second service provider's network and the first service provider's network. Since the DSDS UE 306 is synced from the first base station 308, the DSDS UE 306 can take on the role of a 3rd level stratum clock and provide synch or synchronization information (e.g., clock information including frequency, phase, time of day information) to base stations which require synchronization information such as second wireless base station 304. This technique is particularly useful for small cell base stations and/or micro-cell base stations which are out of service because they are unsynched or need to be re-synched to prevent the base station from going out of service. When a base station needs synchronization to operate or continue to operate properly, an internal program will automatically put the base station into a first mode of operation. In some embodiments, the first mode of operation is a Device-to-Device (D2D) mode of operation also sometimes referred to as a D2D discovery mode of operation. With respect to system 300, when the second base station 304 which may be, and in some embodiments is, a small cell or microcell wireless base station needs synchronization information, the second base station 304 enters the first mode of operation. In various embodiments, the second base station 304 enters the first mode of operation in response to a command or instruction received from the HMNO core network 330. For example in some embodiments, network equipment 332 upon monitoring the second base station and determining that the second base station 304 requires synch, e.g., because: (i) it is out of synch and out of service, or (ii) it needs to be re-synched to prevent it from going out of synch which can occur due to drift, the network equipment 332 generates and transmits a message including a command and/or instruction to the second base station 304 via communications link 326 indicating that the second base station is to enter the first mode of operation, e.g., a D2D mode of operation.

Once the second wireless base station 304 enters the D2D mode of operation, it generates and begins broadcasting, e.g., wirelessly transmitting, D2D discovery beacon messages looking for a device, e.g., a DSDS subscriber device, to respond. With respect to the D2D operation of the second wireless base station 304, the second wireless base station 304 operates as a subscriber device and broadcasts messages using the spectrum allocated for subscriber D2D communications as opposed to spectrum reserved or allocated for base station to user equipment device communications.

The DSDS UE 306 receives, detects and/or discovers at least one of the D2D broadcast discovery messages. In response to receiving, detecting, and/or discovering at least one of the D2D broadcast discovery messages from the second wireless base station 304, the DSDS UE 306 initiates a D2D discovery response with the wireless network (HMNO). The DSDS UE 306 generates a D2D discovery response message and transmits it to the second wireless base station 304.

The second wireless base station 304 receives the D2D discovery response message transmitted by the DSDS UE 306. In response to receiving the D2D discovery response message, the second wireless base station 304 generates a resource request messages for resources, e.g., spectrum, for communicating with the DSDS UE 306. The second wireless base station 304 transmits this resource request message to HMNO core network 330 via communications link 326. In various embodiments, the second wireless base station 304 transmits the resource request message to network equipment 332 located in the HMNO core network 330 which receives and processes the resource request. Network equipment, e.g., network equipment 332, in the HMNO core network 330 reserves the requested resources and generates a resource response message which includes resource information, e.g., identification of HMNO spectrum allocated or granted by the HMNO network for D2D communications between the second wireless base station 304 and the DSDS UE 306. The HMNO network core 330, e.g., the network equipment 332 located in the network core, transmit the resource response message to the second wireless base station 304.

The second wireless base station 304 upon receiving the resource response message, uses the resource information included in the resource message, e.g., identified spectrum, to establish a D2D communications channel with DSDS UE 306. In various embodiments, the resource request is a request for resources, e.g., spectrum grant, to establish a side link channel between the second wireless base station 304 and the DSDS UE 306 for D2D communications. In some such embodiments, the resource response message includes resource information, e.g., spectrum grant information, for establishing a side link channel between the second wireless base station 304 and the DSDS UE 306. The D2D communications channel established between the second wireless base station 304 and the DSDS UE 306 is a side link channel using the granted spectrum. The granted spectrum is spectrum that is available to or under control of and/or belongs to the HMNO network.

Upon the establishment of the D2D communications channel, e.g., side link channel, between the second wireless base station 304 and the DSDS UE 306, second wireless base station 304 uses the D2D communications channel to communicate, transmit and/or share information about itself with the DSDS UE 306, e.g., such as identification information (e.g., base station identification information and/or Cell Global Identification (CGI)). The second wireless base station 304 will also use the D2D communications channel to request that the DSDS UE 306 provide synchronization information, e.g., timing synchronization information such as phase, frequency, and/or time of day synchronization information. The DSDS UE 306 in response to receiving the shared information about the second wireless base station 304 and/or the request for synchronization information will generate a message including the requested synchronization information, e.g., timing synch information such as frequency, phase and time of day information, and communicate, transmit, and/or share the synchronization information with the second wireless base station 304 via the D2D communications channel, e.g., side link communications channel. The synchronization information communicated, transmitted, and/or shared with the second wireless base station 304 being based on synchronization information received from first wireless base station 308. The first wireless base station 308 having received synchronization information from the NTP server 312.

Upon receiving the synchronization information, the second wireless base station 304 will notify the HMNO core network 330, e.g., network equipment 332 in the HMNO core network 330, e.g., via a notification message, that it has received the synchronization information. The notification message will also include information identifying the second wireless base station 304 such as for example, a Cell Global Identifier. The Cell Global Identifier includes mobile country code, mobile network code, location area code, and cell identifier.

One or more network equipment devices in the HMNO core network 330 will in response to being notified that the second wireless base station 304 has received synchronization information will enable auto-configuration for the second wireless base station 304 and turn on or activate the second wireless base station 304. This is accomplished by updating network equipment 332 in the core network 330 regarding the status of the second wireless base station 304, e.g., from off-line to on-line with respect to operating as an active wireless base station such as not active wireless base station status to active base station status. Various network equipment devices are configured as part of the process of preparing the core network 330 to bring the second wireless base station 304 on-line. Once the HMNO core network 330 has been prepared for bringing the second wireless base station 304 on-line to become an active wireless base station, the network equipment 332 in core network 330 sends command(s) and/or instructions to the second wireless base station 304 commanding or instructing the second wireless base station 304 to enter a second mode of operation, in which the second wireless base station 304 comes on-line and commences operating as an active wireless base station (e.g., an active wireless base station mode of operation). In response to receiving the command(s) and/or instructions to enter the second mode of operation, the second wireless base station 304 enters a second mode of operation and begins operating as an active wireless base station, e.g., by going on-line. While operating as an active wireless base station, i.e., an on-line wireless base station, the second wireless base station provides wireless communications services by relaying information to and from user equipment devices connected to the second wireless base station.

The second wireless base station 304 implements, performs and/or goes through a synchronization cycle as part of or prior to beginning to operate as an active wireless base station, e.g., as part of or prior to going on-line as an active wireless base station. In various embodiments, the mobility management entity 334 in the HMNO core network 330 will receive the cell global ID and use it to identify the second wireless base station 304. The Cell Global ID is used by the HMNO core network 330, e.g., the MME 334 in the HMNO core network 330, to distinguish the second wireless base station 304 from other nodes, e.g., other nodes or base station in the MNO wireless network or the HMNO wireless network. Based on the CGI (Cell Global ID) the HMNO core network 330, e.g., MME 334 in the core network 330, will determine the network operator or service provider to which the second wireless base station 304 belongs, the location of the second wireless base station 304, location information of second wireless base station 304 in relation to the DSDS UE 306. The location of the second wireless base station 304 in relation to the DSDS UE 306 may be, and in some embodiments is, used to calculate timing delay information that can be used to adjust the synchronization information provided to the second wireless base station 304 by DSDS UE 306. In some embodiments, the HMNO 330, e.g., MME 334 sends the location information and/or timing delay information to the DSDS UE 306 as part of the resource information provided for the D2D sidelink communications channel.

When the timing synchronization from an HMNO NTP server is not available or not implemented, the second wireless base station 304 may utilize the timing information from an MNO base station obtained via a DSDS UE such as DSDS UE 306 for synchronization purposes as discussed above. However, when the synchronization or timing information is provided by the DSDS UE 306 a propagation and processing delay will be introduced which in at least some instances will need to be compensated to ensure that the accuracy of the synchronization information is within acceptable tolerances and/or thresholds. In various embodiments, the synchronization information provided by the DSDS UE 306 is supplemented with information to allow the second wireless base station 304 to compensate for one or more delays (e.g., propagation delays, processing delays) or other inaccuracies introduced into the synchronization information. For example, the synchronization information provided by the DSDS UE 306 may, and in some embodiments, does include information about the delay(s) introduced into the synchronization information such as for example, pathloss delay offset information and root delay information. This delay information when provided allows the second wireless base station 304 to adjust the receiving timing synchronization information to compensate for delays, e.g., propagation and/or processing delays, introduced into the timing information provided by the DSDS UE 306 to the second wireless base station 304. In some embodiments, this delay information is generated and/or determined by the DSDS UE 306 and/or provided to the DSDS UE 306 from elements for example the MME 334 in the core network 330.

The messages, commands, instructions and information communicated between the second wireless base station 304 and the HMNO core network 330 and HMNO elements/devices located therein are communicated over a landline, e.g., communications link 326. In various embodiments, these communications traverse a cable modem 350 to which the second wireless base station 304 is connected and/or coupled and a cable modem termination system 352 to which the HMNO core network 330 is coupled and/or connected. In some embodiments, the cable modem 350 is incorporated into the second wireless base station 304. The cable modem 350 is typically located within the same building, e.g., building 302, as the second wireless base station 304. The messages, commands, instructions and information sent from the second wireless base station 304 in such embodiments traverse the path of second wireless base station 304, cable modem 350, communications link 326, cable modem termination system 352, core network 330 while messages, commands, instructions and information sent from the HMNO core network 330 traverse the reverse path. It should be understood that any communications links between the cable modem 350 and second wireless base station 304 will also be traversed as well as any communications links between the cable modem termination system 352 and the HMNO core network 330.

In some embodiments, the DSDD 306 is located outside the building 302 in which the second wireless base station 304 is located. In such embodiments, the DSDS 306 is still able to receive the second wireless base station wireless transmissions because it is within the cell coverage of the second wireless base station.

In various embodiments, the first wireless base station 308 is connected to the NTP server 312 via a packet gateway of an Evolved Packet Core or Evolved Packet System which is the core network for the first wireless base station 308. That is it is the core network for the Mobile Network Operator. The core network for the first wireless base station 308 being different than the HMNO core network 330. In various embodiments, the core network for the Mobile Network Operator is coupled to the core network 330 via an Internet connection.

In various embodiments, the connection between the second wireless base station 304 and the HMNO core network 330 does not allow for the transmission of accurate sync timing information from the HMNO core network 330 to the second wireless base station 304. This is occurs for example when the delays in the transmission path cannot be reliably determined and compensated for.

In some embodiments, the first wireless base station 308 is operated by the HMNO operator but is a tower base station operating in a first spectrum band and the second wireless base station is operating in a second spectrum band, the first and second spectrum bands being different. The first spectrum band being at a frequency that allows better penetration through structures then the frequencies of the second spectrum band. The user equipment device 306 in such embodiments has dual radios and is able to connect to both the first and second wireless base stations, for example while in the building 302. The user equipment device 306 in such embodiments obtains the synchronization information from the first wireless base station 308 and provides it to the second wireless base station 302 as previously described.

In some embodiments, the HMNO core network 330 is connected to an NTP server and provides timing synchronization information to the second wireless base station 304 under certain conditions. However, when the synchronization is not available or the conditions do not exist, the second wireless base station 304 obtains the timing synchronization from the first wireless base station 308 via the DSDS UE 306 using the procedures previously described. FIG. 15 illustrates the details of an exemplary method of a wireless base station obtaining synchronization information from another wireless base station via user equipment device.

As discussed above, the present invention provides new and/or improved methods and apparatus for distributing synchronization information (e.g., frequency, phase and time of day information) in a wireless system. The present invention is also directed to implementing new and/or improved methods of a wireless base station obtaining timing synchronization information from wireless base station(s) in other wireless networks via dual subscriber mobile devices, e.g., dual subscriber smartphones which have dual subscriptions allowing the smartphone to connect to and obtain timing synchronization from a first wireless base station in a first network and provide the timing synchronization to a second wireless base station in a second network. Various features of the present invention relate to methods and apparatus for efficiently (e.g., with reduced cost) and effectively obtaining and distributing timing synchronization information in a wireless network without the need for a GPS receiver. Various features of the present invention relate to methods and apparatus for distributing timing synchronization information to small cell wireless base stations located inside buildings with radio coverage limited to within the building structure.

Figure 15A:
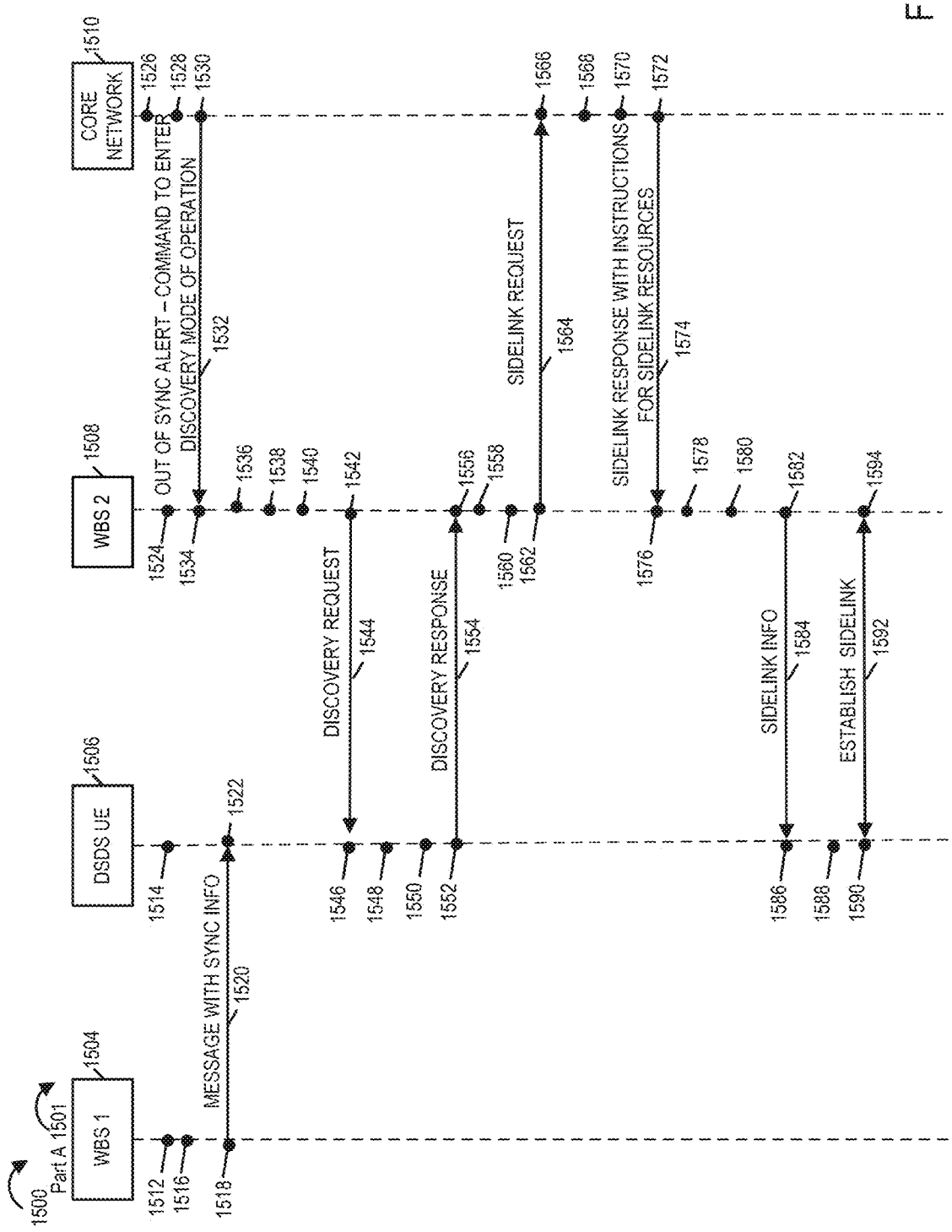
FIG. 15A is the first part of a signaling diagram which illustrates the steps and signaling of an exemplary method in accordance with an embodiment of the present invention.

FIG. 15 comprises FIG. 15A and FIG. 15B. FIG. 15A is the first part (Part A 1501) of a signaling diagram which illustrates the steps and signaling of an exemplary method 1500 in accordance with an embodiment of the present invention. FIG. 15B is the second part (Part B 1502) of a signaling diagram which illustrates the steps and signaling of an exemplary method 1500 in accordance with an embodiment of the present invention. While it will be readily understood that additional steps and signaling are performed in connection with communicating information, messages, and packets between devices, the method 1500 focuses on and discusses the steps and signaling for understanding the invention. Elements or steps with the same reference numbers used in different figures are the same or similar and those elements or steps will not be described in detail again. The signaling diagram/method 1500 is implemented by a system including a first wireless base station WBS 1 1504, a Dual SIM Dual subscriber user equipment device DSDS UE 1506, a second wireless base station WBS 2 1508 and a core network 1510.

The DSDS UE 1506 is a wireless device, e.g., a mobile device such as by way of example a mobile phone, smart phone, laptop, tablet, with a first SIM card with credentials to access a first mobile network operator's network and a second SIM card with credentials to access a second mobile network operator's network. The first mobile network operator's network being a first wireless network having a first set of spectrum available for use. The second mobile network operator's network being a Hybrid Mobile Network Operator (HMNO) network including a second wireless network which utilizes spectrum different than the first wireless network for wireless communications. In some embodiments, the first wireless base station 1504 is an eNodeB. In some embodiments, the second wireless network is a CBRS network. In some such embodiments, the second wireless base station is a CBSD. In some embodiments, the second wireless base station 1508 is an indoor wireless base station located in a building with no access or unreliable access to synchronization information. In some embodiments, the second wireless base station 1508 is a small cell or micro cell wireless base with a small cell size. In some such embodiments, the cell size is limited to interior of the building. In some embodiments, the second wireless network is a time division network. In some such embodiments, the second wireless network is a CBRS Time Division Long Term Evolution network utilizing 5G New Radio (NR) technology. In some embodiments, the second wireless base station 1508 is CBSD with Time Division-Long Term Evolution/New Radio radios which need GPS or clock sync signal information such as IEEE 1588 for Frequency, Phase and ToD (Time of Day) to be able to operate. In some embodiments, the second wireless network is a hybrid mobile network which offloads traffic from the first wireless network. In some such embodiments, the second network operator, which operates the HMNO network, is a Mobile Virtual Network Operator (MVNO) operator for which the first network operator, which operates the first wireless network and which provides network services, e.g., wireless network services, to the second wireless network operator. In some such embodiments, the first wireless network operator is a Mobile Network Operator or a carrier.

The DSDS UE 1506 includes a dual SIM card and is a subscriber of both the first network operator's services and the second network operator's services. This allows the DSDS UE 1506 to connect to and communicate with devices, e.g., wireless base stations and user equipment devices in both the first wireless network and the second wireless network. User equipment to user equipment device communications are D2D communications. The DSDS UE 1506 include a connection manager which manages communications with both the first network and second network, e.g., handoff of the DSDS UE 1506 from the first network to the second network.

The core network 1510 is a HMNO core network operated by the second network operator as part of the second network. The core network 1510 includes network equipment, e.g., a plurality of network equipment devices and/or entities/functions, which provide core network services and functionality for the second wireless network. In some embodiments the core network 1510 is an Evolved Packet Core/System. In various embodiments, the second wireless base station 1508 is connected to the core network 1510 over a path that includes a landline, e.g., a wire or optical cable. In some such embodiments, the second wireless base station 1508 is coupled or connected to a cable modem which is coupled to a cable connecting the cable modem to a cable modem termination system. The cable modem termination system is coupled to and/or connected to the core network 1510 and/or included in the core network 1510. Communications from the second wireless base station 1508 to the core network 1510 traverse the following path: second wireless base station 1508, cable modem, cable, cable modem termination system, core network 1510; and communications from the core network 1510 to the second wireless base station 1508 traverse the following path: core network 1510, cable modem termination system, cable, cable modem, second wireless base station 1508. In various embodiments, the core network 1510 includes an entity, e.g., a network equipment device such as a mobility management entity/device, which determines the location of devices, e.g., user equipment devices and base stations, in the HMNO network based on device identification information, e.g., a CGI provided by a wireless base station.

Figure 4:
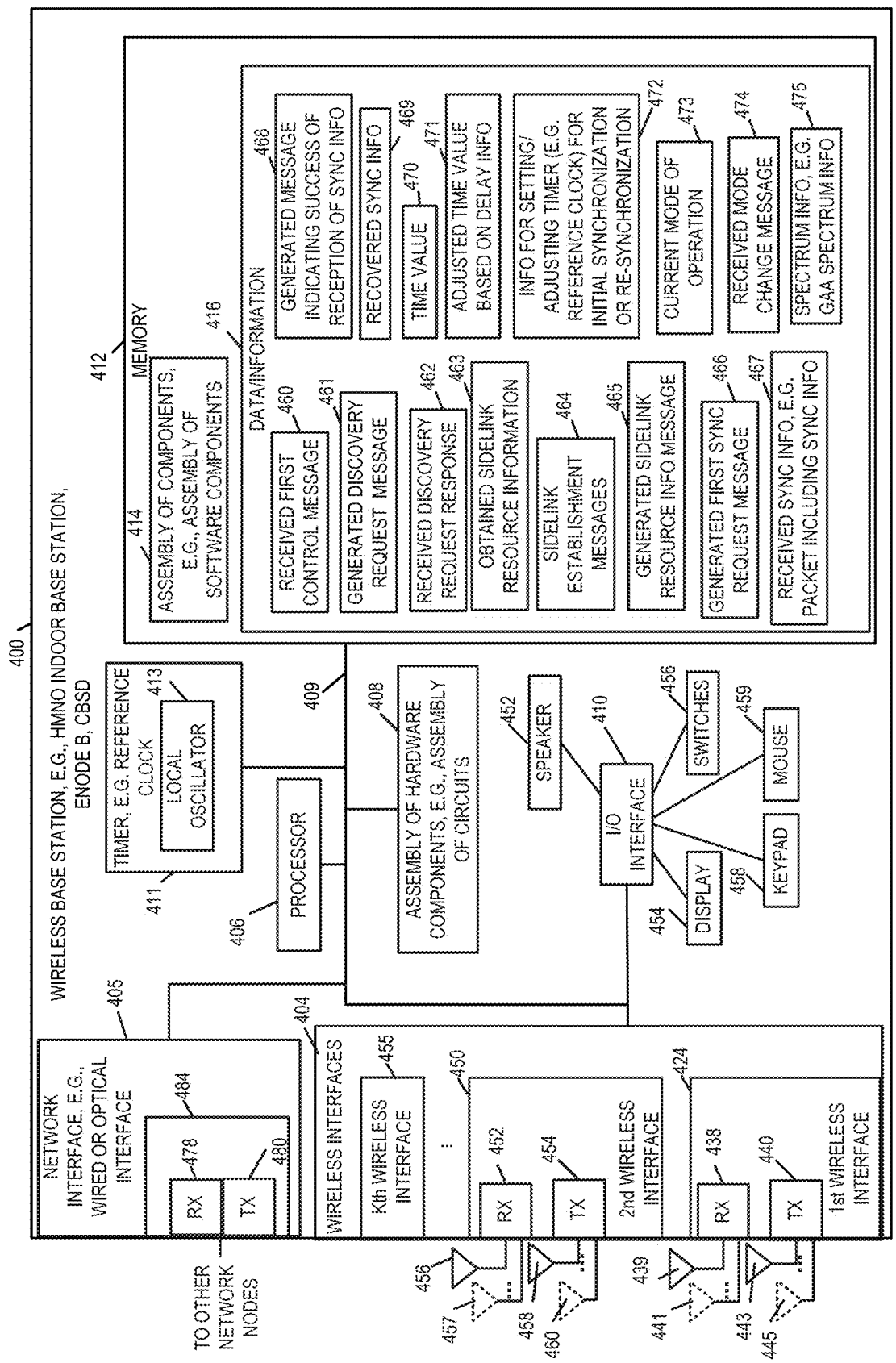
FIG. 4 illustrates details of an exemplary wireless base station, e.g., HMNO indoor base station, in accordance with one embodiment of the present invention.

In various embodiments, the second wireless base station 1508 is implemented in accordance with the wireless base station 400 shown in FIG. 4. In some embodiments, the DSDS UE 1 1506 is implemented in accordance with user equipment device 500 shown in FIG. 5. In some embodiments, the network equipment included in the core network 1510 is implemented in accordance with the network equipment device 600 shown in FIG. 6. In some embodiments, the first wireless base station 1504 is implemented as an eNodeB.

The signaling diagram/method 1500 may be, and in some embodiments is, implemented using exemplary system 300 of FIG. 3. In such embodiments, the first wireless base station 1504 is the first wireless base station 308 of system 300. The second wireless base station 1508 is second wireless base station 304 of system 300. The DSDS user equipment device 1506 is DSDS user equipment device 306 of system 300. The core network 1510 is HMNO core network 330 of system 300 However, it should be understood that the method 1500 is not limited to the exemplary system 300 and may be, and is used, on other systems and system configurations. The signaling diagram/method 1500 illustrates the exemplary signaling and steps for providing/distributing synchronization information (e.g., frequency, phase, time of day information) to devices, e.g., wireless base stations. The synchronization information or sync information being provided via a Dual SIM Dual Subscriber user equipment device from another network than the network to which the wireless base stations belongs.

The method 1500 starts in start step 1512 shown on FIG. 15A. Operation proceeds from start step 1512 and proceeds in parallel to steps 1514, 1516, 1524 and 1526.

In step 1514, the DSDS user equipment 1506 comes within the coverage area of the first wireless base station. The DSDS user equipment device 1506 utilizes a first set of information, e.g., first subscriber credentials, stored in its first SIM to connect to the first wireless base station.

In step 1516, the first wireless base station 1504 generates message 1520. The message 1520 contains sync information (e.g., synchronization timing information such as frequency, phase and time of day information). Operation proceeds from step 1516 to step 1518.

In step 1518, the first wireless base station 1504 transmits the message 1520 to DSDS user equipment device 1506. The message 1520 is transmitted over first spectrum allocated and/or belonging to the first mobile network operator. Operation proceeds from step 1518 to step 1522.

In step 1522, the DSDS user equipment device 1506 receives and processes the message 1520 extracting from the message 1520 the sync information contained in the message 1520. In various embodiments, the DSDS user equipment device 1506 stores the sync information in its memory.

In step 1524, the second wireless base station 1508 is out of sync or needs to re-sync its timing information, e.g., because it is about to go out of sync. For example, the second wireless base station 1508 may have just powered on and does not have synchronization information and so cannot operate as a wireless base station or the second wireless base station 1508 may be operating as a wireless base station but be about to lose timing synchronization needed to operate properly as a base station for example due to drift causing its timing information to lose accuracy.

In step 1526, the core network 1510, e.g., a network equipment device located in the core network 1510, determines that the second wireless base station is out of sync or needs to re-sync its timing information. Operation proceeds from step 1526 to step 1528.

In step 1528, the core network 1510, e.g., a network equipment device in the core network 1510, in response to determining that the second wireless base station 1508 is out of sync or needs to re-sync generates message 1532. Message 1532 includes information indicating that the receiving device, e.g., the second wireless base station is to enter a discovery mode of operation to acquire sync information. In some embodiments, the message 1532 includes information indicating that the second wireless base station 1508 is out of sync or needs to re-sync its timing synchronization information. In some embodiments, the message 1532 includes a command and/or an instruction for the second wireless base station 1508 to automatically enter a discovery mode of operation to obtain sync information. In some embodiments, the instruction to enter discovery mode of operation is an indication that the second wireless base station 1508 is out of sync. Operation proceeds from step 1528 to step 1530.

In step 1530, the core network 1510 transmits the message 1532 to the second wireless base station 1508. Operation proceeds from step 1530 to step 1534.

In step 1534, the second wireless base station 1508 receives the message 1532. Operation proceeds from step 1534 to step 1536.

In step 1536, the second wireless base station 1508 processes the received message 1532. Operation proceeds from step 1536 to step 1538.

In step 1538, the second wireless base station 1508 in response to the message 1532 enters a first mode of operation which is a discovery mode of operation. In some embodiments, the second wireless base station 1508 implements one or more commands and/or instructions included in the message 1532 which include entering a discovery mode of operation. In some embodiments, the second wireless base station 1508 determines from the information in the message 1532 that it is out of sync or needs to re-sync and automatically enters a discovery mode of operation. In some embodiments, the discovery mode of operation is a Proximity Service (ProSe) function discovery mode of operation. In some embodiments, the discovery mode of operation is a mode of operation in which the second wireless base station 1508 discovers synchronization information (e.g., time sync information such as for example frequency, phase and/or time of day information). Operation proceeds from step 1538 to step 1540.

Figure 12:
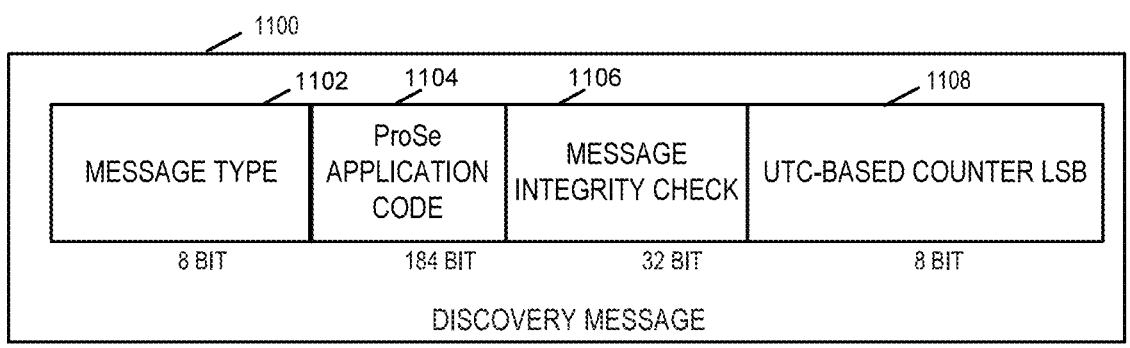
FIG. 12 illustrates the formats and fields of an exemplary ProSe function discovery message in accordance with an embodiment of the present invention.

In step 1540, while operating in said first mode of operation, e.g., the discovery mode of operation, the second wireless base station 1508 generates discovery request message 1544. In some embodiments, the discovery request message 1544 is a D2D discovery request message including information identifying the second wireless base station 1508 and requesting the establishment of a D2D communications link. In various embodiments the discovery request message 1544 is a D2D discovery request message seeking to identify or discover a device, e.g., a user equipment device, with which the second wireless base station 1508 can establish a device to device communications link. In some embodiments, the discovery request message 1544 is a ProSe function D2D discovery request beacon message. FIG. 12 illustrates the formats and fields of an exemplary ProSe function discovery message. Operation proceeds from step 1540 to step 1542.

In step 1542, the second wireless base station 1508 wirelessly transmits and/or broadcasts the discovery request message 1544 to other devices, e.g., user equipment devices such as smartphones. The other devices in this example include the DSDS user equipment device 1506 which is within the second wireless base station's broadcast or transmission range. Operation proceeds from 1542 to step 1546.

In step 1546, the DSDS user equipment device 1506 receives the discovery request message 1544. Operation proceeds from step 1546 to step 1548.

In step 1548, the DSDS user equipment device 1506 processes the received discovery request message 1544. In processing the discovery request message the DSDS user equipment device 1506 determines that the second wireless base station 1508 is requesting to establish a D2D communications link, e.g., a ProSe function D2D communications link. The DSDS user equipment device 1506 further determines that is capable of providing the requested D2D communications link. Operation proceeds from step 1548 to step 1550.

In step 1550, the DSDS user equipment device 1506 generates a discovery response message 1554 in response to the discovery request message 1544. In some embodiments, the discovery response message 1554 includes information identifying the DSDS user equipment device 1506. The discovery response message 1554 includes information indicating that DSDS user equipment device 1506 is available to establish a D2D communication link with the second wireless base station 1508. In some embodiments, the discovery response message 1554 is a ProSe function discovery response message.

When the discovery request message 1544 is a ProSe function discovery beacon message and the discovery response message 1554 is a ProSe function discovery response message, the second wireless base station 1508 is an announcing device and the DSDS user equipment device 1506 is a monitoring device.

Operation proceeds from step 1550 to step 1552. In step 1552, the DSDS user equipment device 1506 transmits over the air the generated discovery response message 1554 to the second wireless base station 1508 in response to the discovery request message 1544. Operation proceeds from step 1552 to step 1556.

In step 1556, the second wireless base station 1508 receives the discovery response message 1554. Operation proceeds from step 1556 to step 1558.

In step 1558, the second wireless base station processes the discovery response message 1554 and determines from information contained in the discovery response message 1554 that the DSDS user equipment device 1506 is available to establish a D2D communications link. Operation proceeds from step 1558 to step 1560.

In step 1560, the second wireless base station 1508 generates sidelink request message 1564 which includes information requesting resources, e.g., an allocation of spectrum, to establish a D2D communication link with the DSDS user equipment device 1506. In some embodiments, the sidelink request message 1564 includes identification information for the second wireless base station 1508, e.g., a Cell Global Identifier (CGI). In some embodiments, the sidelink request message 1564 includes identification information for the DSDS user equipment device 1506. Operation proceeds from step 1560 to step 1562.

In step 1562, the second wireless base station 1508 transmits the sidelink request message 1564 to the core network 1510. In some embodiments, the sidelink request message 1564 is transmitted to a MME (Mobility Management Entity) in the core network 1510. Operation proceeds from step 1562 to step 1566.

In step 1566, the core network 1510 receives the sidelink request message 1564. In some embodiments, a network equipment device, e.g., the MME in the core network 1510 receives the sidelink request message 1564. Operation proceeds from step 1566 to step 1568.

In step 1568, the core network 1510, e.g., the MME in the core network, processes the sidelink request message 1564 and determines to grant the request and provide the resources and information/instruction for establishing a sidelink communications channel between the second wireless base station 1508 and the DSDS user equipment device 1506. Operation proceeds from step 1568 to step 1570.

In step 1570, the core network 1510, e.g., the MME in the core network, generates sidelink response message 1574 in response to the sidelink request message 1564. The sidelink response message 1574 includes instructions for sidelink resources to establish the D2D sidelink connection between the second wireless base station 1508 and DSDS user equipment device 1506. The instructions for the sidelink resources include information identifying the spectrum allocated for the sidelink D2D communication channel. Operation proceeds from step 1570 to step 1572.

In step 1572, the core network 1510, e.g., the MME in the core network 1510, transmits the sidelink response message 1574 to the second wireless base station 1508 in response to the sidelink request message 1564. Operation proceeds from step 1572 to step 1576.

In step 1576, the second wireless base station 1508 receives the sidelink response message 1574 from the core network 1510, e.g., the MME in the core network 1510. Operation proceeds from step 1576 to step 1578.

In step 1578, the second wireless base station 1508 processes the received sidelink response message 1574 and determines based on the instructions and/or information contained in the sidelink response message that the sidelink request for resources to establish a sidelink communications channel with the DSDS user equipment device 1506 has been granted. Operation proceeds from step 1578 to step 1580.

In step 1580, the second wireless base station 1508 generates the sidelink information message 1584 which includes information to establish the sidelink communications channel between the second wireless base station 1508 and the DSDS user equipment device 1506. This information includes the spectrum allocated for the sidelink communications channel. In some embodiments, this information includes information from which a plurality of resource blocks defined by frequency and time are allocated for the sidelink communications channel. The sidelink information message 1584 is based on the sidelink response message 1574. The information included in the sidelink information message 1584 is based on the information and/or instructions for the sidelink resources included in the sidelink response message 1574. Operation proceeds from step 1580 to step 1582.

In step 1582, the second wireless base station 1508 transmits the sidelink information message 1584 to the DSDS user equipment device 1506. Operation proceeds from step 1582 to step 1586.

In step 1586, the DSDS user equipment device 1506 receives the sidelink information message 1584 from the second wireless base station 1508. Operation proceeds from step 1586 to step 1588

In step 1588, the DSDS user equipment device 1506 processes the sidelink information message 1584. In some embodiments, processing the sidelink information message 1584 includes extracting the sidelink information specifying the information/instructions needed to establish the D2D sidelink communications channel between the second wireless base station 1508 and the DSDS user equipment device 1506. Operation proceeds from step 1588 to steps 1590 and 1594.

In step 1590 and 1594, the DSDS user equipment device 1506 and second wireless base station 1508 establish a sidelink communications channel using the resources, e.g., spectrum, granted and/or specified by the core network 1510. Information about these resources, e.g., granted spectrum, being included in the sidelink resource information/instructions included in the sidelink response message 1574 and sidelink information message 1584. As part of establishing the sidelink communications channel between the DSDS user equipment device 1506 and the second wireless base station 1508, the DSDS user equipment device 1506 and second wireless base station 1508 generate and exchange sidelink channel establishment messages 1592. Operation proceeds from step 1590 and 1594 to step 1596 shown on Part B 1502 of signaling diagram 1500 illustrated on FIG. 15B.

In step 1596, the second wireless base station 1508 generates time sync request message 1600. The time sync request message 1600 includes information requesting time sync information, e.g., timing synchronization information such as frequency, phase, and time of day information. Operation proceeds from step 1596 to step 1598.

In step 1598, the second wireless base station 1508 transmits the time sync request message 1600 to the DSDS UE 1506 over the established sidelink channel. Operation proceeds from step 1598 to step 1602.

In step 1602, the DSDS user equipment device 1506 receives the time sync request message 1600. Operation proceeds from step 1602 to step 1604.

In step 1604, the DSDS user equipment device 1506 processes the time sync request message 1600. Operation proceeds from step 1604 to step 1608.

In step 1608, the DSDS user equipment device 1506 generates the requested time sync information based on the sync information received in message 1520 from the first wireless base station 1504. In various embodiments, the DSDS user equipment device 1506 includes a connection manager which generates the requested time sync information based on the synch information received in the message 1520 from the first wireless base station 1504. In generating the requested time sync information, the DSDS user equipment device 1506 also generates information to be included with the time sync information such as propagation offset and root delay so that the second wireless base station 1508 can compensate for propagation and/or processing delays in the time sync information. In some embodiments, the DSDS user equipment device 1506 generates System Information Block type 18 (SIB 18) which contains sidelink information in which the requested time sync information is included. In some embodiments, the sync information is included in the commSyncConfig-r12 parameters/information of the SIB 18. Operation proceeds from step 1608 to step 1610.

Figure 16:
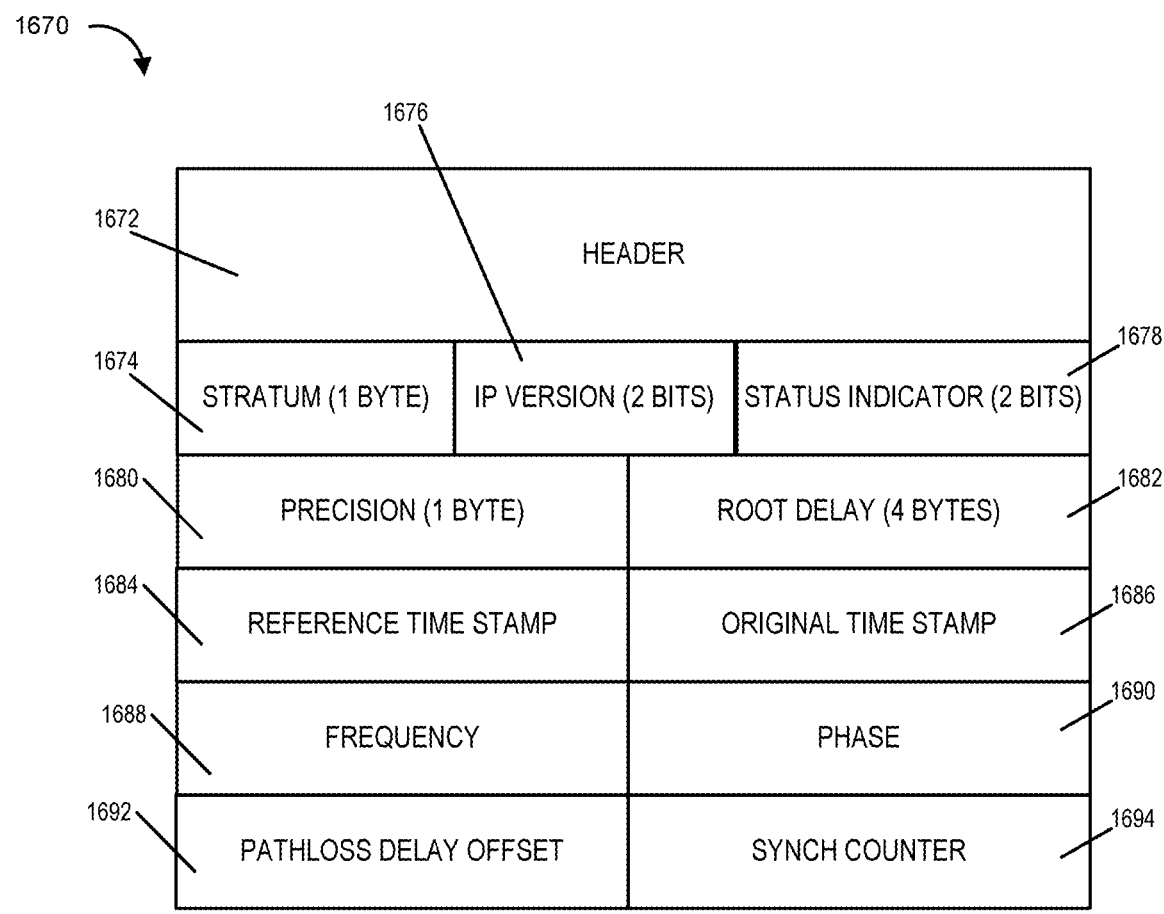
FIG. 16 illustrates exemplary fields and format of an exemplary time sync packet in accordance with an embodiment of the present invention.

In step 1610, the DSDS user equipment device 1506 generates time sync response message 1614 which includes the requested time sync/synchronization information (e.g., frequency, phase and time of day synchronization information). FIG. 16 illustrates the exemplary fields and format of an exemplary time sync packet 1670 in accordance with an embodiment of the present invention. The exemplary fields of time sync packet 1670 includes header field 1672, stratum field (length 1 byte) 1674, Internet Protocol (IP) version field (length 2 bits) 1676, status indicator field (length 2 bits) 1678, precision field (1 byte) 1680, root delay field (4 bytes) 1682, reference time stamp field 1684, original time stamp field 1686, frequency field 1688, phase field 1690, pathloss delay offset field 1692, and synch counter field 1694. The header field 1672 includes information to identify the right receiver, e.g., information similar to a MAC header. The stratum field 1674, which is 1 byte in length, indicates the level of stratum, e.g., primary, secondary, etc. of the time sync information. The IP version field 1676 indicates IPv4 or IPv6. The status indicator field 1678 indicates the clock synchronized or not synchronized. The precision field 1680 indicates the precision of the local clock in power of 2. The root delay field 1682 indicates the round trip delay to the primary source of the timing information. The reference time stamp field 1684 is the time when the system clock was last set or corrected. The reference time stamp field 1684 is 64 bits in length and is in NTP time stamp format. The original time stamp field 1686 is the time at which the request departed the client for the wireless base station. The original time stamp is 64 bits in length and is in NTP time stamp format. The pathloss delay offset field 1692 contains the pathloss delay offset, which is obtained from channel state information (CSI) and which is used in estimating pathloss and estimating the time delay for a message to reach a device. The synch counter field 1694 includes a sync counter value, which is decremented each time this synchronization information is received from another wireless base station. For example, a peer to peer establishment of connectivity to share synch information between the primary recipient of synch information, i.e., the first wireless base station 308 will decrement synch counter before forwarding it to the secondary recipient, i.e., the second wireless base station 304, so on and so forth. The purpose of doing this is to limit the number of hops as the time sensitive information may actually become inaccurate do to unexpected pathloss delays. In some embodiments, the time sync packet also includes fields for Receive Timestamp and Transmit Timestamp. The field for the Receive Timestamp is the time at the user equipment device when the request arrived from the client. Transmit Timestamp is the time at the user equipment device when the response left for the wireless base station. In some embodiments, the time sync packet is in NTP format and includes all NTP fields including the fields for stratum, precision, root delay, reference timestamp, origin timestamp, receive timestamp, and transmit timestamp. The delay for path from the DSDS user equipment device to the wireless base station being calculated based on the round trip delay measured by the either the wireless base station or DSDS user equipment device.

Operation proceeds from step 1610 to step 1612. In step 1612, the time sync response message 1614 is transmitted from the DSDS user equipment device 1506 to the second wireless base station 1508. Operation proceeds from step 1612 to step 1616.

In step 1616, the second wireless base station 1508 receives the time sync response message 1614. Operation proceeds from step 1616 to step 1618.

In step 1618, the second wireless base station 1508 processes the time sync response message 1614 and extracts the information, e.g., the time sync information, included in the message.

Operation proceeds from step 1618 to step 1620 when the second wireless base station 1508 is already on-line and operating as an active wireless base station. In step 1620, the second wireless base station 1508 uses the received timing sync information to re-synch itself, e.g., to re-synch its frequency, phase, and time of day information. The re-synched timing information at the second wireless base station 1508 being based on the sync time information provided in the time sync response message 1614. In some embodiments, re-syncing timing information including updating the frequency, phase and/or time of day information stored at the second wireless base station 1508. In some embodiments, re-syncing includes updating timing synchronization information stored at the second wireless base station 1508 to maintain its precision taking into account the timing synchronization information received in the time sync response and the delay information provided, e.g., root delay and pathloss delay offset information. In some embodiments, re-syncing timing information including setting and/or updating a timer or clock (e.g., reference clock) in the second wireless base station 1508.

Operation proceeds from step 1618 to step 1622 when the second wireless base station 1508 is off-line (i.e., not operating as a base station providing services to user equipment devices). In step 1622, the second wireless base station 1508 uses the sync information provided in the time sync response message 1614 to obtain synchronization with the HMNO. The second wireless base station 1508 stores the sync information in its memory and/or updates its currently stored synchronization information. The second wireless base station 1508 sets and/or updates a timer or clock (e.g., reference clock) in the second wireless base station 1508. Operation proceeds from step 1622 to step 1623.

In step 1623, the second wireless base station 1508 generates sync reception confirmation message 1626. Sync reception confirmation message 1626 includes information confirming that the second wireless base station 1508 has received sync information from a user equipment device, e.g., in this case DSDS user equipment device 1506. The sync reception confirmation message 1626 includes identification information, e.g., CGI, from which the second wireless base station 1508 can be identified. Operation proceeds from step 1623 to step 1624.

In step 1624, the second wireless base station 1508 transmits the sync reception confirmation message 1626 to the core network 1510, e.g., to wireless base station activation and/or provisioning network equipment devices in the core network 1510. Operation proceeds from step 1624 to step 1628.

In step 1628, the core network 1510, e.g., wireless base station activation and/or provisioning network equipment devices in the core network 1510, receive the sync reception confirmation message 1626. Operation proceeds from step 1628 to step 1630.

In step 1630, the core network 1510, e.g., network equipment devices in the core network 1510, processes the received sync reception confirmation message 1626. Processing the received sync reception confirmation message includes identifying the second wireless base station based on the identification information provided in the sync reception confirmation 1626 and making the determination to prepare the core network 1510 for provisioning and/or activation of the second wireless base station 1508. Operation proceeds from step 1630 to step 1632.

In step 1632, the core network 1510, e.g., a network equipment device (e.g., MME) generates message 1636 in response to sync reception confirmation message 1626. Message 1636 includes information, command(s), and/or instruction(s) for the second wireless base station 1508 to prepare for activation or to come back on-line. Operation proceeds from step 1632 to step 1634.

In step 1634, the core network 1510, e.g., a network equipment device (e.g., MME), transmits the message 1636 to the second wireless base station 1508. Operation proceeds from step 1634 to step 1638.

In step 1638, the second wireless base station receives and processes the message 1636. Processing the message 1636 includes preparing for activation and/or provisioning and/or going back on-line based on the information, command(s) and/or instruction(s) included in the message 1636. When the message 1638 indicates that the second wireless base station 1508 is to go back on-line (e.g., when it is already provisioned and activated in the core network), then operation proceeds from step 1638 to step 1646. Otherwise when the message 1638 indicates that the second wireless base station 1508 is to prepare for provisioning and/or activation, operation proceeds from step 1638 to steps 1640 and 1644.

In step 1640 and 1644, the second wireless base station 1508 and core network 1510 (e.g., network equipment devices in the core network 1510) complete activation and processing operations. As part of completing the activation and processing the second wireless base station 1508 and core network 1510 exchange messages 1642 which include information and/or instructions for completing the provisioning and activation of the second wireless base station 1508 as well as confirmations indicating that the provisioning and activation for the second wireless base station 1508 has been completed. Operation proceeds from steps 1640 and 1644 to step 1646.

In step 1646, the second wireless base station 1508 comes on-line and commences operation as a wireless base station, e.g., it begins provides services to user equipment devices. Once the second wireless base station 1508 has been re-synced in step 1620 or comes on-line in step 1646, the core network 1510 commences monitoring to determine when the second wireless base station 1508 will need to re-sync its synchronization information, e.g., by setting a timer for a period of time, e.g., 20 minutes. When the timer expires the core network 1510, will generate an out of sync alert and return to step 1528. The DSDS user equipment device 1506 will obtain updated sync information and the process will be repeated assuming that the DSDS user equipment device 1506 responds to the new discovery request message sent by the second wireless base station 1508. In various embodiments, a second different DSDS user equipment will receive and respond to the new discovery request message and the process will be repeated with this second DSDS user equipment device wherein the second DSDS user equipment device obtains and provides the timing synchronization information to the second wireless base station 1508 required for re-synchronization of the second user equipment device 1508.

While the method 1500 illustrated in FIG. 15, has been explained with respect to a single UE device and a first wireless base station and a second wireless base station the method may be, and typically is implemented for a plurality of DSDS user equipment devices, e.g., mobile devices, that can connect to different wireless base stations in different network with various DSDS user equipment devices being able to obtain timing synchronization information (e.g., frequency, phase and time of day synchronization information) from one wireless base station and provide the timing synchronization information to another requesting wireless base station.

It should be understood that the operation(s), step(s), and function(s) described in connection with network core 1510 may be implemented by network entities such as network equipment device(s), network service function(s) and/or other components or systems located in the core network 1510.

Details of features of various embodiments, will now be discussed. It should be appreciated that not necessarily all embodiments include the same features and some of the features described below are not necessary but can be desirable in some embodiments.

FIG. 4 is a drawing of an exemplary wireless base station 400 in accordance with an exemplary embodiment. The wireless base station 400 supports Proximity Service (ProSe) requirements and operations. FIG. 4 is a drawing of an exemplary wireless base station 400, e.g., a Citizens Broadband Radio Service Wireless Base Station (CBSD) 400, in accordance with an exemplary embodiment. Exemplary wireless base station 400 includes a wireless interface 404, a network interface 405, e.g., a wired or optical interface, a processor 406, e.g., a CPU, an assembly of hardware components 408, e.g., an assembly of circuits, and I/O interface 410, timer, e.g. reference clock 411 including a local oscillator 413, and memory 412 coupled together via a bus 409 over which the various elements may interchange data and information. Wireless base station 400 further includes a speaker 452, a display 454, switches 456, keypad 458 and mouse 459 coupled to I/O interface 410, via which the various I/O devices (452, 454, 456, 458, 459) may communicate with other elements (404, 405, 406, 408, 411, 412) of the wireless base station 400. Network interface 405 includes a receiver 478 and a transmitter 480. In some embodiments, receiver 478 and transmitter 480 are part of a transceiver 484. Wireless interfaces 404 include a plurality of wireless interfaces including first wireless interface 424, second wireless interface 450, . . . , Kth wireless interface 455. The wireless interfaces are used to communicate with the wireless devices, e.g., user equipment device, e.g., DSDS user equipment devices. The first wireless interface 424 is used for example to communicate with a first user equipment device using a first spectrum band. The second wireless interface can be used to communicate with a second user equipment device using a second spectrum band. The first wireless interface 424 includes wireless receiver 438 and a wireless transmitter 440. In some embodiments, receiver 438 and transmitter 440 are part of a transceiver. In various embodiments, the first wireless interface 424 includes a plurality of wireless receivers and a plurality of wireless transmitters. Wireless receiver 438 is coupled to a plurality of receive antennas (receive antenna 1 439, . . . , receive antenna M 441), via which wireless base station 400 can receive wireless signals from other wireless communications devices including a second wireless communications device, e.g., a user equipment device. Wireless transmitter 440 is coupled to a plurality of wireless transmit antennas (transmit antenna 1 443, . . . , transmit antenna N 445) via which the wireless base station 400 can transmit signals to other wireless communications devices including a second wireless communications device, e.g., a user equipment device.

The second wireless interface 450 includes wireless receiver 452 and a wireless transmitter 454. In some embodiments, receiver 452 and transmitter 454 are part of a transceiver. In various embodiments, the second wireless interface 450 includes a plurality of wireless receivers and a plurality of wireless transmitters. Wireless receiver 452 is coupled to one or more receive antennas (receive antenna 1 456, . . . , receive antenna M 457), via which wireless base station 400 can receive wireless signals from other wireless communications devices including a second wireless communications device, e.g., CBRS UE device, using the same or a different wireless protocol than the first wireless interface. Wireless transmitter 454 is coupled to one or more wireless transmit antennas (transmit antenna 1 458, . . . , transmit antenna N 460) via which the wireless base station 400 can transmit signals to other wireless communications devices including a second wireless communications device. The wireless base station network interface 405 may be coupled to a cable modem, a core network, other networks, e.g., internet, or other wireless base stations.

Memory 412 includes an assembly of components 414, e.g., an assembly of software components, and data/information 416. Data/information 416 includes a received first control message 460, e.g., a command message to enter a discovery mode of operation, e.g. due to an out of sync alert condition, a generated discovery request message 461, a received discovery response message 462, e.g., including information identifying a first UE device with which the base station 400 may establish a device to device connection over a sidelink channel via which sync information may be communicated to the base station, obtained sidelink resource information 463, generated and/or received sidelink establishment messages 463, a generated sidelink resource information message 465, a generated first sync request message 466, received sync information, e.g., a received packet including sync information 467, e.g., packet information 1670 of FIG. 16, a generated message indicating success of reception of the sync information 468, a set of recovered and/or determined sync information 469 to be used to synchronize or re-synchronize a timer 411, e.g. a reference clock, of the base station 400, a determined time value 470, an adjusted time value 471 based on received and/or determined delay information, generated control information 472 for setting/adjusting a timer 411, e.g. reference clock, for initial synchronization or for re-synchronization based on the received sync information, information indicating a current mode of operation 473 of the base station 400, e.g. a first mode of operation, e.g. a discovery mode of operation and/or a device to device mode of operation used to acquire synchronization information, or a second mode of operation, e.g., a base station mode of operation in which the base station is timing synchronized and services UE devices, a received mode change message 474, and spectrum information 475, e.g. indicating a GAA spectrum being used by the first base station. While the details of the first and second wireless interfaces are shown, the other wireless interfaces of the wireless base station, e.g., wireless interface K where K is an integer greater than 2 also include multiple receivers and transmitters so that the wireless base station 400 can provide wireless services to for example a plurality of wireless devices such as user equipment devices. In some embodiments, one or more of the wireless base stations discussed and/or shown in the Figures and/or in connection with the methods discussed herein are implemented in accordance with the wireless base station 400. For example, the CBSDs of system 200 shown in FIG. 2, the second wireless base station 304 of FIG. 3, the second wireless base station 1508 of FIG. 15, the CBSDs illustrated in FIG. 13 may be, and in some embodiments are, implemented in accordance with the wireless base station 400.

Figure 5:
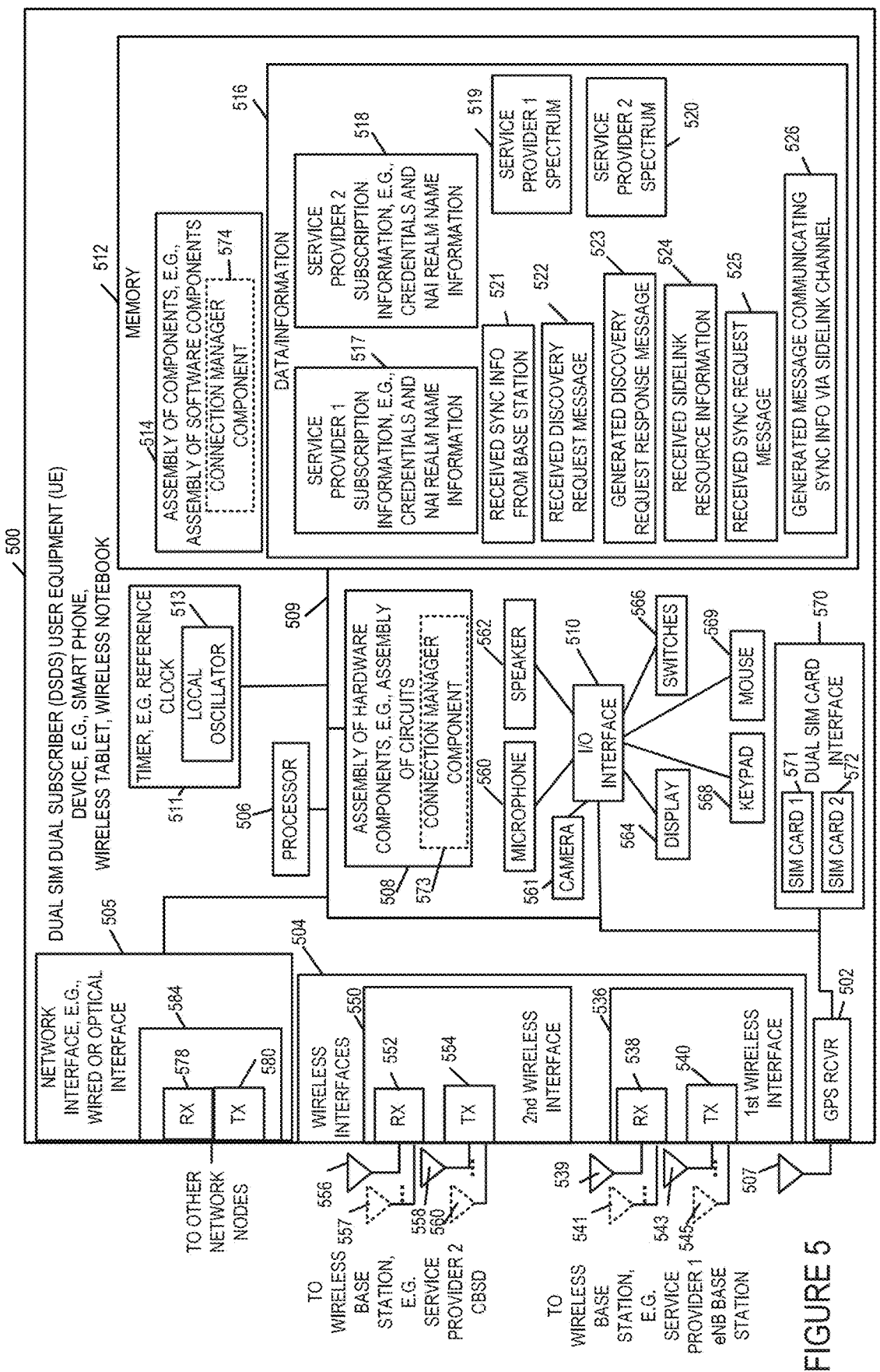
FIG. 5 illustrates details of an exemplary Dual Subscriber Identity Module Dual Subscriber (DSDE) User Equipment (UE) device, e.g., a mobile device, cell phone, smartphone, wireless tablet, laptop, wireless notebook, in accordance with one embodiment of the present invention.

FIG. 5 is a drawing of an exemplary user equipment (UE) device 500 in accordance with an exemplary embodiment. UE device 500 is, e.g., a wireless device, e.g., a mobile device such as a cell phone, a smart phone, wireless tablet or wireless notebook. UE device 500 is a dual SIM dual subscriber device that is enabled to communicate with different wireless base stations utilizing different wireless spectrum and/or wireless protocols, e.g., 5G wireless protocol, CBRS wireless protocol or cellular wireless protocol. In various embodiments, the dual SIM dual subscriber UE 500 servers as an intermediary device, providing synchronization information obtained from a first service provider to a device, e.g. an unsynchronzied or out-of-sync device, e.g. a CBSD of the second service provider's network. Exemplary UE device 500 includes wireless interfaces 504, a network interface 505, a processor 506, e.g., a CPU, an assembly of hardware components 508, e.g., an assembly of circuits, and I/O interface 510, a GPS receiver 502 coupled to GPS receive antenna 507, a timer 511, e.g., a reference clock including a local oscillator 513, a dual SIM card interface 570 including a first SIM card, SIM card 1 571, corresponding a first service provider, and a second SIM card, SIM card 2 572 corresponding to a second service provider, and memory 512 coupled together via a bus 509 over which the various elements may interchange data and information. UE device 500 further includes a microphone 560, camera 561, speaker 562, a display 564, e.g., a touch screen display, switches 566, keypad 568 and mouse 569 coupled to I/O interface 510, via which the various I/O devices (560, 561, 562, 564, 566, 568, 569) may communicate with other elements (502, 504, 505, 506, 508, 512, 570) of the UE device. Network interface 505 includes a receiver 578 and a transmitter 580. The network interface 505 can be coupled to routers within the home or customer premises or to wired (e.g., cable) or optical (e.g., fiber-optic) networks. In some embodiments, receiver 578 and transmitter 580 are part of a transceiver 584. In some embodiments, the assembly of hardware components 508 includes a connection manager component 573.

Wireless interfaces 504 include a plurality of wireless interfaces including first wireless interface 536 and a second wireless interface 550. The first wireless interface 536 is, e.g., used to communicate with wireless base stations in a first service provider's communications network, e.g., cellular, e.g., gNB tower base stations of the first service provider's communications network, e.g., using a first set of spectrum and a first communications protocol corresponding to the first service provider. The second wireless interface is, e.g., used to communicate with a device, e.g., a CBSD base station, of a second service provider's communications network. For example, the second wireless interface is used to communicate with a CBDS base station of the second ser vice provider via a device to device communications channel, e.g. using a second set of spectrum and a second communication protocol corresponding to the second service provider. The first wireless interface 536 includes wireless receiver 538 and a wireless transmitter 540. In some embodiments, receiver 538 and transmitter 540 are part of a transceiver. In various embodiments, the first wireless interface 536 includes a plurality of wireless receivers and a plurality of wireless transmitters. Wireless receiver 538 is coupled to a plurality of receive antennas (receive antenna 1 539, . . . , receive antenna M 541), via which user equipment device 500 can receive wireless signals from other wireless communications devices including a wireless base station, e.g., a cellular wireless base station of the first service provider. Wireless transmitter 540 is coupled to a plurality of wireless transmit antennas (transmit antenna 1 543, . . . , transmit antenna N 545) via which the user equipment device 500 can transmit signals to other wireless communications devices including a cellular wireless base station of the first service provider. The antennas 539, . . . , 541 and 543, . . . , 545 are typically mounted inside the housing of the wireless device but in some embodiments are located outside the user equipment device housing. In some embodiments the various antennas form an antenna array with the antennas pointing in different directions. In some embodiments, one or more of the antennas are included inside the housing of the user equipment device and the user equipment device includes one or more connections to which exterior antennas may be connected.

The second wireless interface 550 includes wireless receiver 552 and a wireless transmitter 554. In some embodiments, receiver 552 and transmitter 554 are part of a transceiver. In various embodiments, the second wireless interface 550 includes a plurality of wireless receivers and a plurality of wireless transmitters. Wireless receiver 552 is coupled to one or more receive antennas (receive antenna 1 556, . . . , receive antenna M 557), via which user device 500 can receive wireless signals from other wireless communications devices including, e.g. a CBSD base station of a second service provider. Wireless transmitter 554 is coupled to one or more wireless transmit antennas (transmit antenna 1 558, . . . , transmit antenna N 560) via which the user equipment device 500 can transmit signals to other wireless communications devices including, e.g. a CBSD of a second service provider. The user equipment device network interface 505 may be coupled to LAN or WAN networks or routers so that the user equipment device can also obtain services via a hardwired connection in addition to through the wireless interfaces, e.g. when the UE device 500 is at a location where such a connection is possible.

Memory 512 includes an assembly of components 514, e.g., an assembly of software components, and data/information 516. In some embodiments, the assembly of software components 514 includes a connection manager component 574. Data/information 516 includes service provider 1 subscription information 517, e.g. credentials and NAI realm information corresponding to service provide 1, service provider 2 subscription information 518, e.g. credentials and NAI realm information corresponding to service provider 2. Data/information 516 further includes received synchronization information 521 from a base station, e.g., from a cellular base station of the first service provider. The received synchronization information 521 is used by the UE device 500 to set and re-synch its timer 511, e.g. its reference clock being maintained by the UE device 500. Data/information 500 further includes a received discovery request message 522, e.g., from a CBSD base station of the second ser vice provider seeking to establish a device to device connection with UE 500 over wireless spectrum of the second service provider, a generated discovery response message 522, e.g. to be sent to the CBSD base station in response to the received discovery request message, and received sidelink resource information 524, e.g. resource information to be used to establish a sidelink communications channel for supporting device to device communications with the CBSD. Data/information 516 further includes a received sync request message 525, communicated over an established sidelink channel, said synch request, e.g., from the CBSD seeking synchronization information. The received synch request being communicated over the sidelink device to device communications channel established between the CBSD and the UE device 500. Data/information 516 further includes a generated message 526 communicating the requested sync information, e.g. a packet of sync information, e.g. via the sidelink channel to the CBSD, Data information 516 further includes information 519 identifying the spectrum used by service provider 1 and information 520 identifying the spectrum used by service provider 2.

In some embodiments, the user equipment devices discussed in the Figures and/or in connection with the embodiments of the present invention described are implemented in accordance with user equipment device 500. For example, DSDS UE A 284, ..., DSDS UE M 286 of system 200, DSDS user equipment device 306 of system 300, and DSDS user equipment device 1506 of FIG. 15 may be, and in some embodiments are, implemented in accordance with user equipment device 500.

Figure 6:
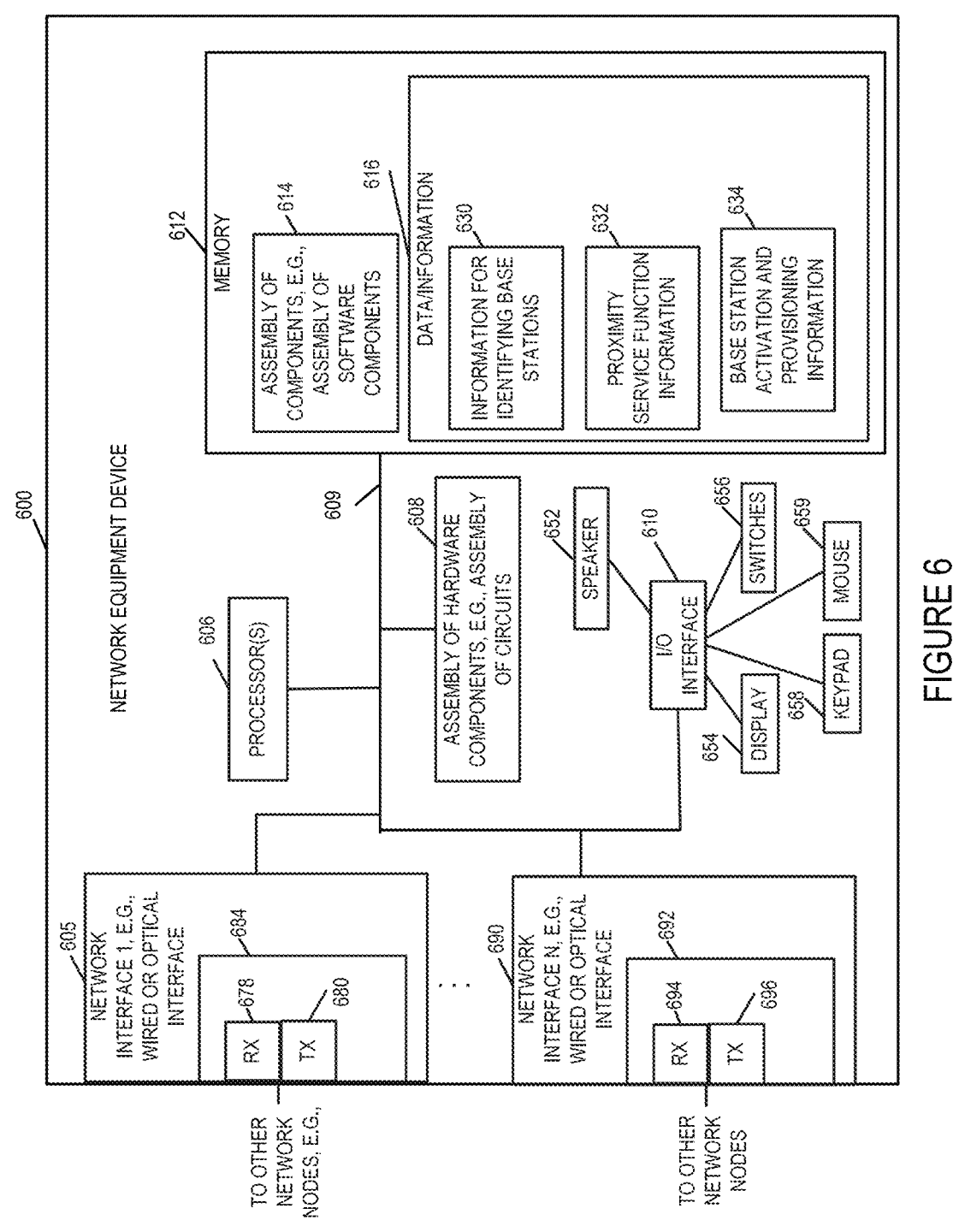

FIG. 6 is a drawing of an exemplary network equipment device, e.g., Mobility Management Entity, Proximity Service Function Element, Wireless Base Station Discovery Element, Cable Modem (CM), Cable Modem Termination System, MDF, IDF in accordance with an exemplary embodiment. The network equipment device 600 includes a plurality of network interfaces 605, ..., 690, e.g., a wired or optical interface, a processor(s) 606 (e.g., one or more processors), e.g., a CPU, an assembly of hardware components 608, e.g., an assembly of circuits, and I/O interface 610 and memory 612 coupled together via a bus 609 over which the various elements may interchange data and information. The network equipment device 600 further includes a speaker 652, a display 654, switches 656, keypad 658 and mouse 659 coupled to I/O interface 610, via which the various I/O devices (652, 654, 656, 658, 659) may communicate with other elements (605, ..., 690, 606, 608, 612) of the network equipment device 600. Network interface 605 includes a receiver 678 and a transmitter 680. The network interface 605 is typically used to communicate with other devices, e.g., a cable modem termination system, a wireless base station, etc. In some embodiments, receiver 678 and transmitter 680 are part of a transceiver 684. Network interface 690 includes a receiver 694 and a transmitter 696. The network interface 690 is typically used to communicate with other devices, e.g., other network nodes in a core, etc. In some embodiments, receiver 694 and transmitter 696 are part of a transceiver 692. Memory 612 includes an assembly of component 614, e.g., an assembly of software components, and data/information 616. Data/information 616 includes information for identifying base stations 630, proximity service function information 632 and base station activation and provisioning information 634.

In some embodiments, the network equipment devices discussed in the Figures and/or in connection with the embodiments of the present invention described are implemented in accordance with network equipment device 600. For example, network equipment devices in the core network 300, NTP server 312, IDFs and MDF shown in system 200, base station discovery element 1310, proximity service function element 1309 may be, and in some embodiments are, implemented in accordance with the network equipment device 600.

Figure 7:
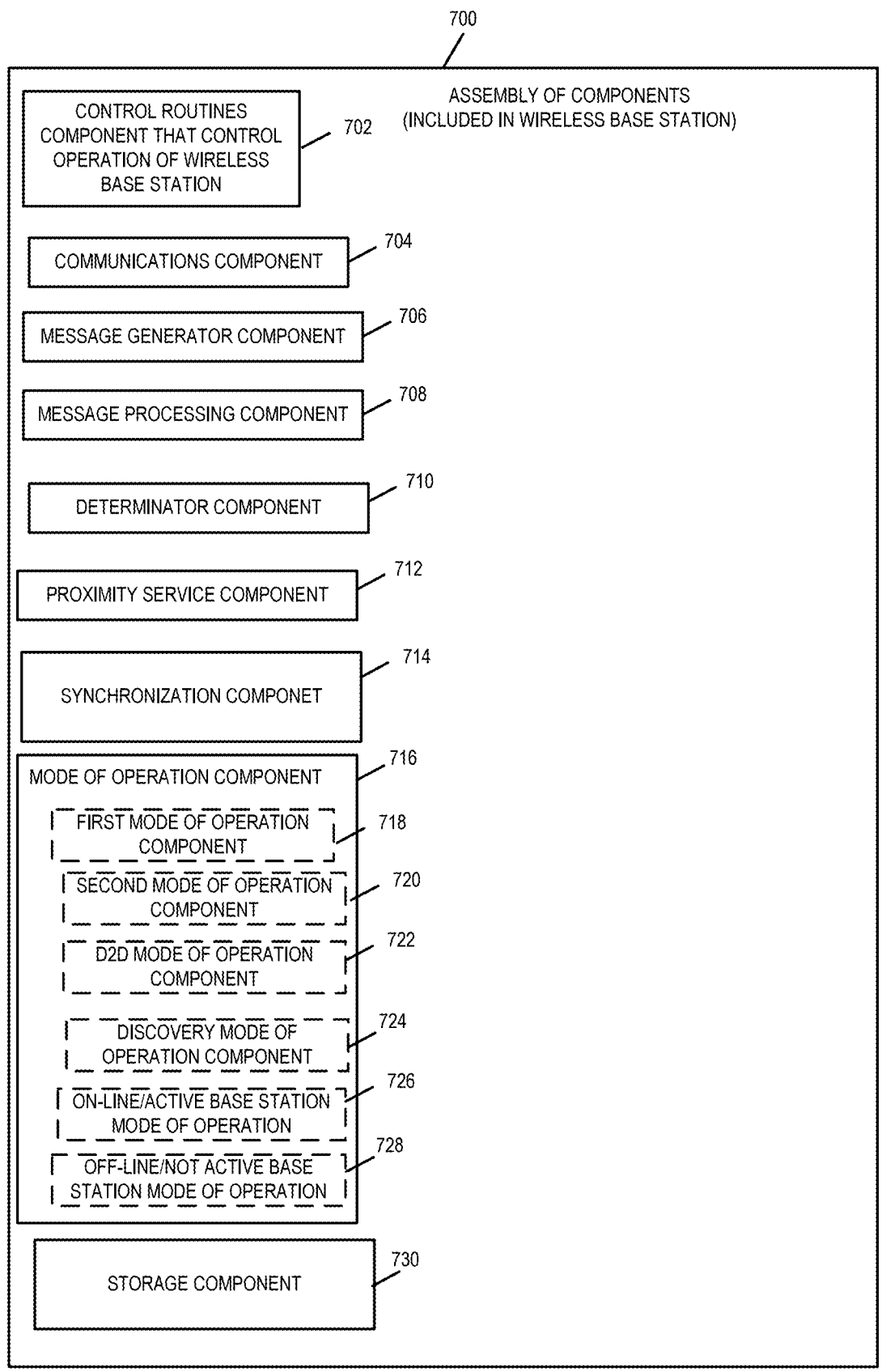
FIG. 7 illustrates an exemplary assembly of components for a wireless base station in accordance with an embodiment of the present invention.

FIG. 7 is a drawing of an exemplary assembly of components 700 which may be included in an exemplary wireless base station (e.g., exemplary wireless base station 400 of FIG. 4), in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the wireless base station 400, with the components controlling operation of wireless base station device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the wireless base station 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method.

Assembly of components 700 includes a control routines component 702, a communications component 704, a message generator component 706, a message processing component 708, a determinator component 710, a proximity service component 712, a synchronization component 714, a mode of operation component 716, and a storage component 730. In some embodiments, the mode of operation component 716 includes one or more sub-components including a first mode of operation component 718, a second mode of operation component 720, a D2D mode of operation component, 722, a discovery mode of operation component 724, an on-line/active base station mode of operation component 726 and an off-line/not active base station mode of operation component 728.

The control routines component 702 is configured to control operation of the wireless base station (e.g., CBSD).

The communication component 704 is configured to handle communications, e.g., transmission and reception of messages, and protocol signaling for the wireless base station (e.g., CBSD).

The message generator component 706 is configured to generate messages for transmission to other devices, e.g., request messages, response messages, discovery request messages, D2D communications messages, proximity service request and response messages, request for resource messages, notification messages that synchronization information has been received, messages requesting synchronization information, messages for sharing information, e.g., D2D resource information, communications messages with network equipment devices, communications messages with user equipment devices. In some embodiments, the message generator component 706 is a sub-component of the communications component 704.

The message processing component 708 is configured to process messages received from other devices and implement operations in response to instructions and/or information included in the processed message, e.g., processing and implementing operations in connection with messages from user equipment devices, messages from network equipment devices, messages from proximity service monitoring devices, messages from proximity service function elements, messages including synchronization information, and messages from base station discovery elements/nodes. In some embodiments, the message processing component 708 is a sub-component of the communications component 704.

The determinator component 710 is configured to make determinations and decisions for the wireless base station including for example: determining to enter a first mode of operation, determining when to exit the first mode of operation, determining when to enter a second mode of operation, determining when to exit the second mode of operation, determining whether the wireless base station needs to obtain synchronization to remain in service, determining whether and when to transmit/broadcast D2D discovery request messages, determining whether and when to request D2D resources from network equipment in the core network, determining when to request synchronization information from a DSDS user equipment device, determining clock or timer information to be used to update or synchronize a reference clock based on received synchronization information including for example reference timestamp, original timestamp and pathloss delay offsets, determining contents of request and response messages, determining phase, frequency, and time of day synchronization information for the wireless base station based on synchronization information from a user equipment device, determining information, e.g. resource information to transmit to a DSDS user equipment device for establishing a D2D communication channel with the DSDS user equipment device, determining when to send a notification message to a network equipment device in a core network to confirm receipt of synchronization information by the wireless base station, determine when to commence operating in active/on-line mode of operation, e.g., based on provisioning and activation messages received from a core network, determining when to update synchronization information stored at the wireless base station, determining when and the operations necessary to re-synch the wireless base station reference clock, determining content/information to be included in proximity request messages and proximity response message exchanged with user equipment devices and a proximity service function element.

A proximity service component 712 is configured to perform all operation relating to providing proximity services including receiving, processing, and responding to proximity service requests, generating proximity service requests, exchanging proximity service messages with a Proximity Service function element, performing operations to establish proximity service D2D connections with other devices, e.g., DSDS user equipment devices, and execute operations to perform proximity service applications such as requesting and obtaining synchronization information over a proximity service D2D wireless communications link.

A synchronization component 714, is configured to handle all operations relating to obtaining, generating, and distributing synchronization information (e.g., timing synchronization such as phase, frequency and time of day synchronization information). This includes requesting and obtaining synchronization information from a user equipment device, synchronizing a reference clock based on and/or using the synchronization information provided, establishing a D2D communications channel with a user equipment device over which the synchronization information can be transmitted, the transmission of the synchronization information to other devices, and entering into a discovery mode of operation wherein operations are performed to obtain synchronization from a user equipment device.

A mode of operation component 716 is configured to determine when the wireless base station is to enter and exit different wireless base station modes of operation including a first mode of operation, a second mode of operation, a discovery mode of operation, a proximity service mode of operation, a D2D mode of operation, an on-line/active base station mode of operation, and an off-line/not active base station mode of operation. The mode of operation component 716 is also configured to control the wireless base station to perform all of the operations and functions of the wireless base station with respect to each mode of operation. The first mode of operation sub-component 718 is configured to determine when the wireless base station is to enter and exit the first mode of operation and control the wireless base station to perform the operations associated with the first mode of operation. The second mode of operation sub-component 720 is configured to determine when the wireless base station is to enter and exit the second mode of operation and control the wireless base station to perform the operations associated with the second mode of operation. The D2D mode of operation sub-component 722 is configured to determine when the wireless base station is to enter and exit the D2D mode of operation and control the wireless base station to perform the operations associated with the D2D mode of operation. The discovery mode of operation sub-component 724 is configured to determine when the wireless base station is to enter and exit the discovery mode of operation and control the wireless base station to perform the operations associated with the discovery mode of operation. The on-line/active base station mode of operation sub-component 726 is configured to determine when the wireless base station is to enter and exit the on-line/active base station mode of operation and control the wireless base station to perform the operations associated with the on-line/active base station mode of operation. The off-line/not active base station mode of operation sub-component 728 is configured to determine when the wireless base station is to enter and exit the off-line/not active base station of operation and control the wireless base station to perform the operations associated with the off-line not active base station mode of operation.

The storage component 730 is configured to manage the storage, and retrieval of data and/or instructions to/and from memory, buffers in memory, hardware buffers and/or storage device coupled and/or connected to the wireless base station.

Figure 8:
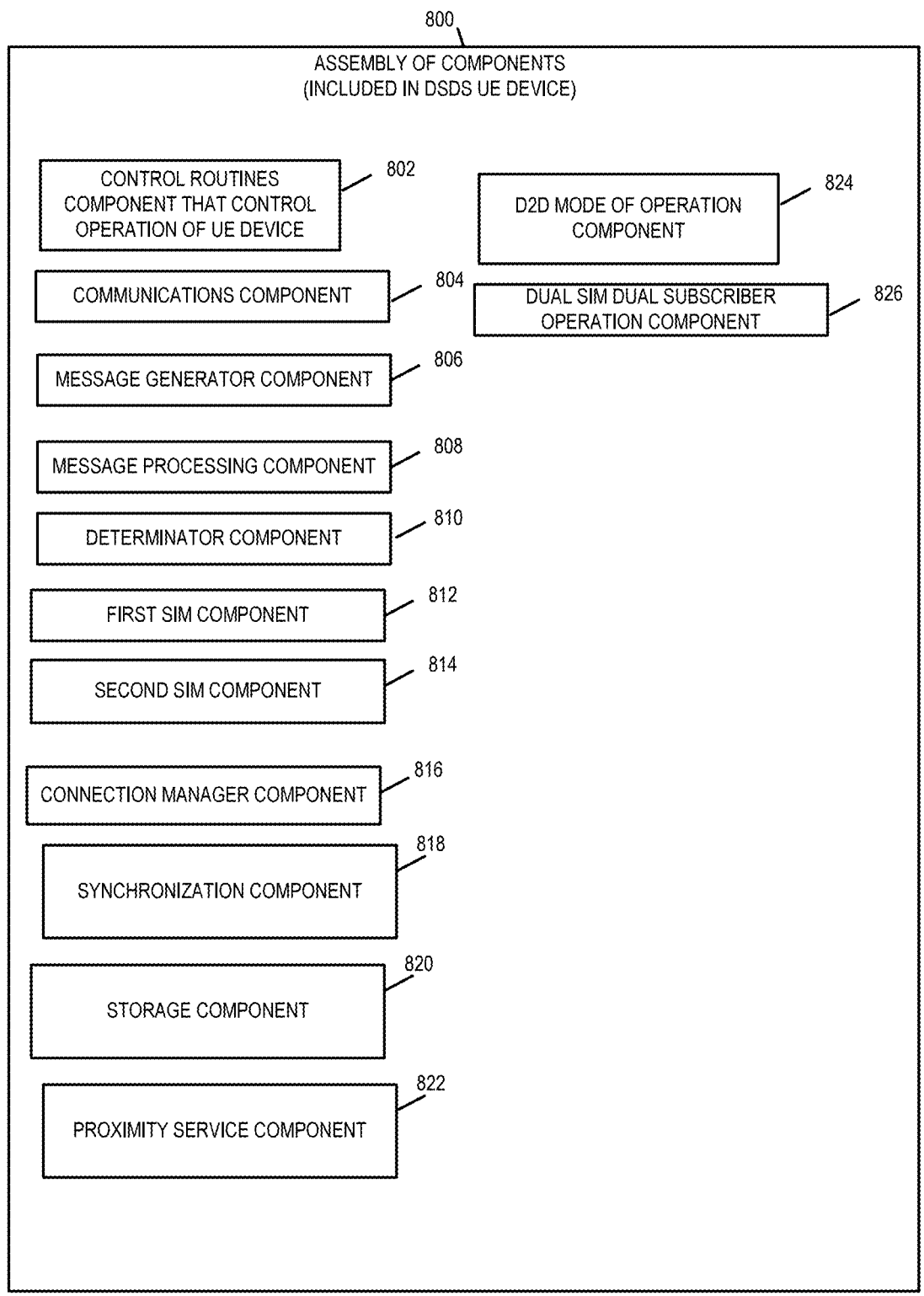
FIG. 8 illustrates an exemplary assembly of components for a user equipment device in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a communications component 804, a message generator component 806, a message processing component 808, a determinator component 810, a first SIM component 812, a second SIM component 814, a connection manager component 816, a synchronization component 818, a storage component 820, a proximity service component 822, a D2D mode of operation component 824, and a dual SIM dual subscriber mode of operation component 826.

The control routines component 802 is configured to control operation of the UE.

The communications component 804 is configured to handle communications, e.g., receipt and transmission of signals and provide protocol signal processing for one or protocols for the UE.

The message generator component 806 is configured to generate messages for transmission to wireless base stations (e.g., CBSD devices, eNodeBs) such as messages including request and response messages, etc. In some embodiments, the message generator component 806 is a sub-component of the communications component 804.

The message processing component 808 processes received messages, e.g., requests for information. In some embodiments, the message processing component 808 is a sub-component of the communications component 804.

The determinator component 810 makes determination for the user equipment devices such as for example, determining whether to respond to a D2D discovery request message received from a wireless base station, determining synchronization information to provide a wireless base station in response to a request for synchronization information, determining whether to obtain updated synchronization from a wireless base station before generating synchronization information to be provided to a different wireless base station, determining whether to request information related to a received Proximity Service request, determining propagation delays, e.g., round trip delay for communications with a wireless base station to include in synchronization information to be provided.

The first SIM component 812 is configured to store Subscriber Identity Information, e.g., a first set of credentials, for obtaining access to a first service provider/operator's wireless network.

The second SIM component 814 is configured to store Subscriber Identity Information, e.g., a second set of credentials, for obtaining access to a second service provider/operator's wireless network.

The connection manager component 816 is configured to manage the communications between the user equipment device and a first network and a second network including coordinating the off-load and/or handoff of calls from one network to the other network and the generation and sharing of synchronization information between wireless base stations of different networks.

The synchronization component 818 is configured to handle all operations relating to obtaining, generating, and distributing synchronization information (e.g., timing synchronization such as phase, frequency and time of day synchronization information). This includes requesting and obtaining synchronization information from a first wireless base, synchronizing a reference clock, generating synchronization information to be sent to a second wireless base station, and the transmission of the synchronization information to the second wireless base station.

The storage component 820 is configured to perform all operations in storing and retrieving information, e.g., synchronization information, from memory and/or storage devices (e.g., SIMs) located in the user equipment device.

The proximity service component 822 is configured to perform all operation relating to providing proximity services including receiving, processing, and responding to proximity service requests, generating proximity service requests, exchanging proximity service messages with a Proximity Service function element, performing operations to establish proximity service D2D connections with other devices, e.g., wireless base stations, and execute operations to perform proximity service applications such as obtaining and providing synchronization information over a proximity service D2D wireless communications link.

The D2D mode of operation component 824 is configured to operate the user equipment device in device to device mode of operation where it communicates directly with another subscriber device, e.g., a wireless base station requesting a sidelink D2D communications connection for obtaining timing synchronization information or another user equipment device.

The dual SIM dual subscriber mode of operation component 826 is configured to implement all operations for operating as a dual subscriber in which the user equipment device utilizes both SIM cards to communicate with two different wireless base stations using two different subscriptions, e.g., simultaneously or switching back forth between the two different wireless base stations. This component includes the management of the signaling between the two wireless base stations. In some embodiments, the dual SIM dual subscriber mode of operation component is a sub-component of the communications component 804.

Figure 9:
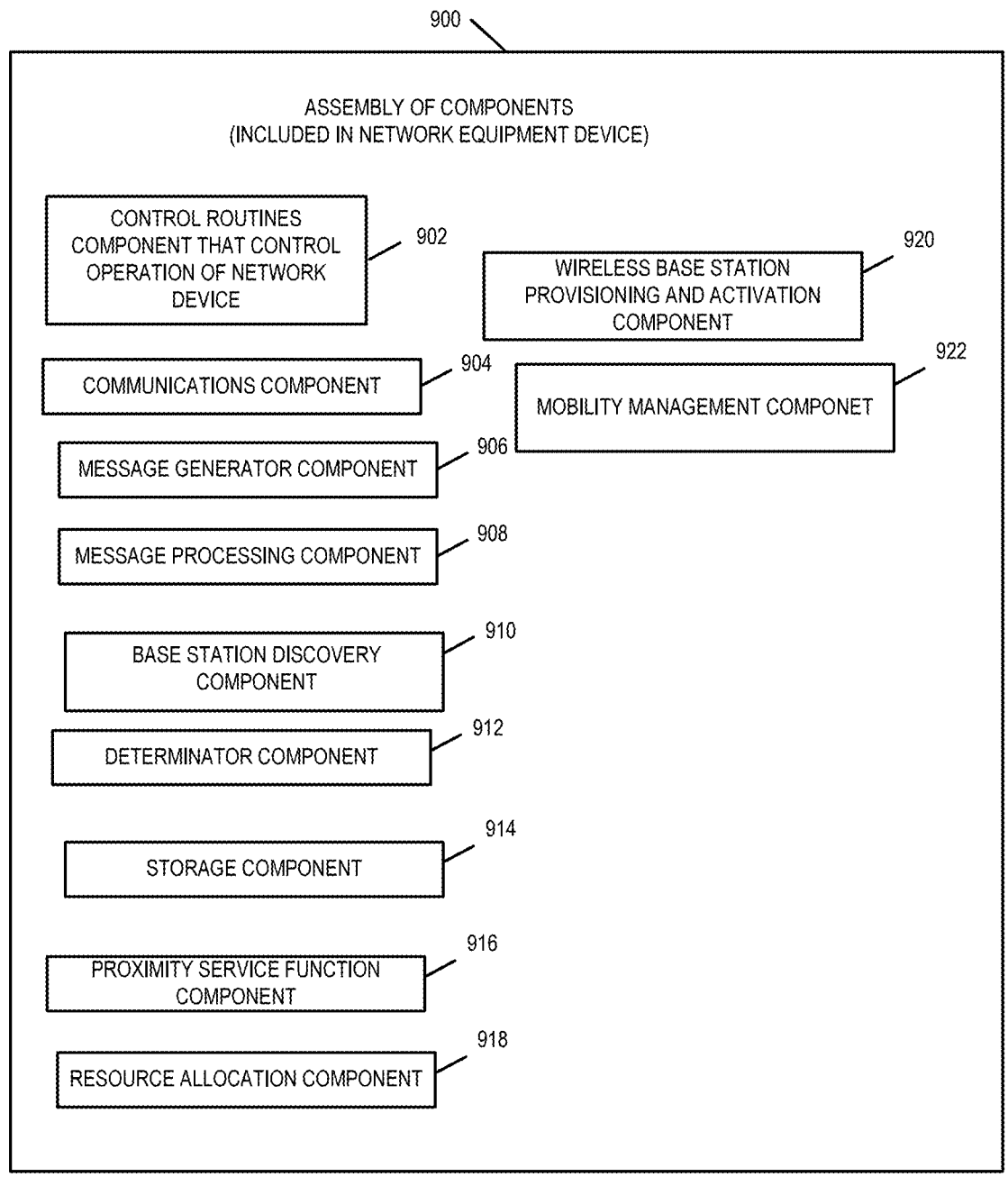
FIG. 9 illustrates an exemplary assembly of components for a network equipment device in accordance with an embodiment of the present invention.

FIG. 9 is a drawing of an exemplary assembly of components 900 which may be included in a network equipment device 600 of FIG. 6, in accordance with an exemplary embodiment. The components in the assembly of components 900 can, and in some embodiments are, implemented fully in hardware within a processor or one or more processors, e.g., processor(s) 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor(s) 606 with other components being implemented, e.g., as circuits within assembly of components 608, external to and coupled to the processor(s) 606. As should be appreciated the level of integration of components on the processor and/or with some components being external to the processor may be one of design choice. Alternatively, rather than being implemented as circuits, all or some of the components may be implemented in software and stored in the memory 612 of the network equipment device 600, with the components controlling operation of the network equipment device 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor or one or more processors, e.g., processor(s) 606, configure the processor(s) to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the network equipment device 600 or elements therein such as the processor(s) 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a communications component 904, a message generator component 906, a message processing component 908, a base station discovery component 910, determinator component 912, a storage component 914, a proximity service function component 916, a resource allocation component 918, a wireless base station provisioning and activation component 920, and a mobility management component 922.

The control routines component 902 is configured to control operation of the network equipment device.

The communication component 904 is configured to handle communications, e.g., transmission and reception of messages, and protocol signaling for the network equipment device.

The message generator component 906 is configured to generate messages for transmission to other devices. Exemplary messages which are generate include proximity service function messages, messages to base station discovery elements for determining whether a message originated from a base station, messages instructing and/or informing devices that a base station needs to be provisioned and/or activated, messages with resource information for implementing D2D wireless communications, messages to provision and active a wireless base station, messages to inform or instruct a wireless base station to enter a mode of operation or perform operations, messages with instructions for a wireless base station to enter a first mode of operation, messages with instructions for a wireless base station to enter a discovery mode of operation, messages with instructions for wireless base station to enter a D2D mode of operation, messages with instructions for a wireless base station to commence transmitting D2D discovery messages, messages for a wireless base station to enter a synchronization mode of operation wherein timing synchronization information is obtained from a user equipment device via a D2D sidelink communications channel, messages with instructions for a wireless base station to perform operations such as going on-line or becoming an active wireless base station that provides services to subscriber user equipment devices.

The message processing component 908 is configured to process messages and implement procedures/operations in response to messages or based on the contents of messages. This includes messages received from other devices, e.g., messages from wireless base stations, e.g., resource request messages for D2D communications, Proximity Service request message, base station discovery request messages, provisioning and/or activation messages, notification messages, messages with instructions.

The base station discovery component 910 is configured to determine whether a message request from a subscriber device, e.g., a message request seeking proximity service services/operations, resources for D2D communications, provisioning and/or activation services is from a wireless base station and/or whether the request is for purposes of obtaining synchronization purposes. The base station discovery component is further configured to discover whether the base station which sent a request is off-line or on-line and/or whether or not provisioning and/or activation of the base station will be required for a discovered base station. The base station discovery component 910 is also configured to notify other network devices that a base station needs to be provisioned and/or activated and/or to initiate or commence provisioning and activation procedures for a discovered base station. The base station discovery component 910 also in some embodiments makes a determination as to whether a base station has received synchronization message, e.g., based on a synchronization receipt confirmation message received from a wireless base station.

The determinator component 912 is configured to make determinations and decisions for the network equipment device including for example: determining if a received message is from a wireless base station, e.g., based on the content of the message, e.g., a CGI included in the message; determining whether to provide resources for a D2D communications channel, determining what resources, e.g., spectrum to be provided, for a D2D communications channel; determining whether a device is registered for a proximity service, e.g., D2D wireless communications proximity service; determining whether a wireless base station is on-line or off-line; determining whether or not a wireless base station needs networking provisioning and activation; determining whether to commence or initiate provisioning and activation procedures for a wireless base station for example in response to a D2D request to be used for synchronization purposes or in response to confirmation that a wireless base station has received synchronization information; determining whether a wireless base station needs to be re-synced to ensure that it does not go out of synchronization; determining whether to send a command or instruction to a wireless base station to place it in a mode of operation in which it will occur synchronization from a DSDS user equipment device; determining responses to messages from wireless base stations or user equipment devices in response to receiving proximity service messages, e.g., determining a proximity service application code in response to a proximity service discovery request message including an application ID or CGI.

The storage component 914 is configured to manage the storage, and retrieval of data and/or instructions to/and from memory, and/or storage devices coupled and/or connected to the network equipment device, e.g., storage of a list of proximity service application identifiers and proximity service application codes, on-line and off-line status of wireless base stations, allocation of resource spectrum, location of wireless base stations, propagation models and delays times.

The proximity service function component 914 is configured to perform proximity service operations such as responding to proximity service requests for application codes, requests for resources, determinations of whether a device is registered for Proximity Services and which Proximity Service applications, e.g., direct to direct communications between devices.

The resource allocation component 918 is configured to assign or allocate resources to wireless base stations and user equipment devices, e.g., during provisioning and activation procedures, in response to requests for resources for D2D communications, in response to proximity service requests.

The wireless base station provisioning and activation component 920 is configured to operate to provision a wireless base for the on-line operation such as for example allocating resources, e.g., spectrum for the wireless base station to utilize when activated. The wireless base station provisioning and activation component 920 is also configured to activate a wireless base station, e.g., instruct it to change its status from off-line to on-line was the wireless base station has been provisioned and sent operating instructions such as for example resources allocated to the wireless base station and transmission power levels to be used.

The mobility management component 922 is configured to perform mobility management operations for a core network, including tracking and managing user equipment devices and wireless base stations.

The specific components of the assembly of components 900 included in any particular network equipment device may, and typically does vary depending on the specific network equipment device and the functionality required for the device and/or the operations the network equipment device is responsible for performing.

Figure 10:
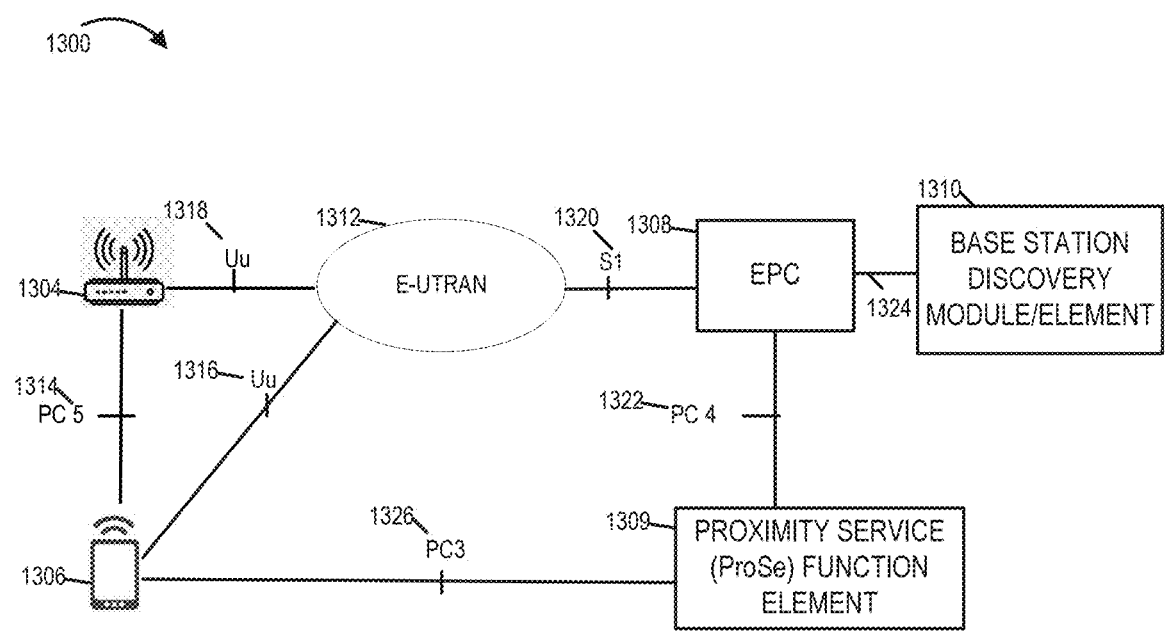
FIG. 10 illustrates a simplified architecture for a system 1300 for providing Proximity Service Function within an exemplary 4G core network to support D2D communications in accordance with an embodiment of the present invention.

FIG. 10 shows a simplified architecture for a system 1300 for providing Proximity Service Function within an exemplary 4G core network to support D2D communications in accordance with an embodiment of the present invention. System 1300 includes a wireless base station 1304, a user equipment device 1306, an Evolved Packet Core (EPC) 1308, a Proximity Service (ProSe) Function element 1309, and a base station discovery module/element 1310 which is coupled together via communications interfaces and communications links. The wireless base station 1304 is operating in a first mode of operation in which it is operating as a subscriber, e.g., by emulating a terminal or user equipment device, executing a Proximity Service application. The user equipment device 1306 is also executing a Proximity Service application. Wireless communications interface PC5 1314 couples and/or connects the wireless base station 1304 to the user equipment device 1306. E-UTRAN (Evolved-UMTS Terrestrial Radio Access Network) 1312 represents the air interface in this LTE cellular network. The S1 interface 1320 connects the E-UTRAN 1312 and the EPC 1308 for both the user and the control planes. Communications link 1324 connects the EPC to the base station discovery module/element 1310. In some embodiments, the base station discovery module/element 1310 is included in the EPC 1308. PC3 1326 represents the communications interface between the user equipment device 1306 and proximity service function element 1309. Uu interface 1316, Uu interface 1318, S1 interface 1320 illustrate the communication protocols used in connecting the wireless base station 1304, user equipment device 1306 and EPC 1308. Communications interface PC 3 1322 is the interface that connects the Proximity Service Function Element 1309 to the EPC core 1308. The Proximity Service Function element provides direct provisioning, direct discovery name management, and EPC level discovery. The direct provisioning functionality includes provisioning the devices (wireless base station 1304 and user equipment device 1306) with the required parameters for direct discovery and direct device to device communications. The direct discovery name management functionality includes allocating and processing ProSe Application ID's and ProSe Application Codes that are used for direct discovery. This is typically achieved by maintaining a table or other record which includes a listing of the mapping between the Application Identity (App ID) and Proximity Service (ProSe) Application Code that are used for direct discovery. The direct discovery name management functionality also includes the operation of contacting the Home Subscriber Server to check if the device is authorized to perform direct discovery operations and if so, authorizes the device by synchronizing a ProSe Policy. The ProSe Function element also provides the device with integrity parameters to protect discovery messages that are transmitted wirelessly. The wireless base station discovery module/element 1310 keeps a mapping of which devices registered and authorized for ProSe services, e.g., D2D communications services, are wireless base stations. Upon receiving a query or notification, e.g., from the ProSe function element, regarding a discovery request the wireless base station discovery module/element will determine whether the device is a wireless base station or not for example based on CGI information provided by the device. In response to determining the discovery request is for a wireless base station, the wireless base station discovery module/element will send instructions to other network equipment devices that the wireless base station is in discovery mode of operation and will also send a response to the entity that sent the query that the discovery request corresponds to a wireless base station In some embodiments, the wireless base station 1304 is second wireless base station 304 system 300 and the user equipment device 1306 is the user equipment device 306 of system 300. When the user equipment device 1306 discovers/receives an announcement beacon message, e.g., a D2D discovery request message from the wireless base station 1306 which is operating in discovery mode, the user equipment device 1306 will communicate with the wireless base station 1306 (e.g., by sending a discovery response message to the wireless base station 1304. The wireless base station 1304 will then assign resources or obtain resources to communicate with the wireless base station 1306. The resources are used to form a sidelink communications channel for D2D communications between the wireless base station 1304 and the user equipment device 1306. The resources, e.g., spectrum and/or resource blocks, are used for transmitting D2D communications signals between the wireless base station 1304 and user equipment device 1306.

Figure 11:
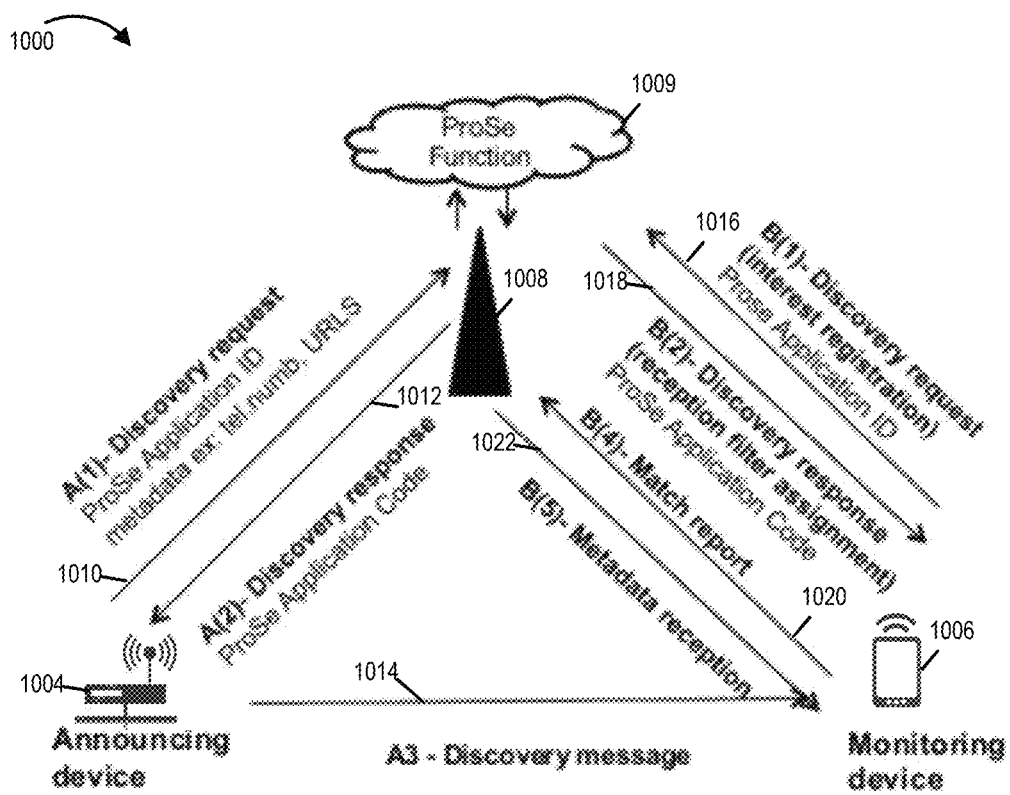
FIG. 11 illustrates a diagram with details of an exemplary exchange of messages and information involved in establishing a ProSe D2D communications channel between a wireless base station announcing device and a monitoring user equipment device.

FIG. 11 illustrates a diagram 1000 with details of an exemplary exchange of messages and information involved in establishing a ProSe D2D communications channel between a wireless base station announcing device 1004 and a monitoring user equipment device 1006. Referring to diagram 1300 of FIG. 10 is in some instances helpful in understanding the interfaces between the devices/elements in diagram 1000. The announcing device 1004 is the wireless base station 1304 of system 1300, the user equipment monitoring device 1006 is the user equipment device 1306 of system 1300, the ProSe Function element 1009 is the ProSe Function element 1309 of system 1300.

Returning to FIG. 11, the announcing device 1004 sends discovery request message 1010 to ProSe function element 1009 with a ProSe Application ID and meta data, e.g., identification information such as the CGI. The ProSe Application ID is a unique identifier the application that has trigger the transmission of the discovery request which in this example is an application to establish a D2D sidelink channel for acquiring timing synchronization information. The ProSe function element 1009 upon receiving the discovery request message 1010 contacts the Home Subscriber Server to verify that the application represented by the ProSe Application ID is authorized for direct discovery and D2D communications. The ProSe function element also contacts the base station discovery element to determine if the announcing device is a wireless base station and provide notification to the core network that the network may need to prepare for the provisioning and activation of this base station. The CGI provided by the announcing device may, and in some embodiments is, used to make the determination of whether or not the announcing device is a wireless base station. Upon receiving an acknowledgement that the announcing device and ProSe application and are authorized for direct discovery and creation of a D2D communications channel, the ProSe function element 1009 responds to the announcing device with discovery response message 1012 which include a ProSe Application code. The announcing device 1004 then transmits discovery message 1014 which is received by monitoring device 1006. The discovery message 1014 includes the ProSe Application Code included in the discovery response message 1012.

FIG. 12 illustrates the fields of an exemplary discovery message 1100 in accordance with embodiment of the present invention. In some embodiments, the discovery message 1014 shown in FIG. 11 includes the fields shown in discovery message 1100. In some embodiments, the discovery request message 1544 of method 1500 is implemented using the fields of discovery message 1100 illustrated in FIG. 12. Discovery message 1100 includes a message type field 1102 which is 8-bits in length, a ProSe Application code field 1104 which is 184 bits in length, a message integrity check field 1106 which 32 bits in length and a UTC-based counter LSB field which is 8 bits in length. The message type field indicates whether the it is open or restricted discovery or identifies a discovery model to be used. The ProSe Application code is the ProSe Application code received from the ProSe function element. The Message Integrity Check is a 32 bit check sum generated by the announcing device based on the Coordinated Universal Time (UTC) information derived from message(s) or information provided by the network.

The wireless base station announcing device 1004 transmits the discovery message 1014 over the PC5 interface (shown in FIG. 10) to the user equipment monitoring device 1006.

The user equipment monitoring device sends discovery request (interest registration) message 1016 to the ProSe Function element 1009. The discovery request message 1016 includes a ProSe Application ID which identifies the application executing on the user equipment monitoring device 1006. The ProSe Function element sends the discovery response message 1018 to the user equipment monitoring device 1006. The discovery response message 1018 includes reception filter assignment with a ProSe Application Code. When the user equipment monitoring device 1006 receives a discovery message with a ProSe Application Code that matches the ProSe Application Code in the received reception filter assignment included in discovery response message 1018 but which does has no corresponding ProSe Application ID, the user equipment monitoring device 1006 sends match report 1020 to the ProSe Function element with an indication that it wishes to receive meta data about the related ProSe Application ID. The ProSe function element 1009 uses the provided information for validation and verification and in the case this operation is successful sends acknowledgement message 1022 with meta data to the user equipment monitoring device 1006. The user equipment monitoring device 1006 in this example then accepts the request to establish a D2D communications channel with the wireless base station 1004. Communications resources, e.g., resources for establishing a sidelink communications channel are obtained from the core network and/or assigned by the wireless base station announcing device 1004 and the D2D communications channel is established between the wireless base station announcing device 1004 and user equipment monitoring device 1006.

Once a D2D sidelink channel between a wireless base station needing timing synchronization information (e.g., wireless base station 304 of system 300) and a DSDS user equipment device (e.g., DSDS user equipment device 306 of system 300) that is already synced with an MSO network, then the connection manager of the DSDS user equipment device can instruct the user equipment device to share the System Information Block Type 18 (packet containing sync information) with the wireless base station over the established D2D sidelink communications channel.

However, before the user equipment devices shares the sync information, the elements/devices in the core network must determine that a given device is actually a wireless base station that needs sync. Additionally, the core network will also need to determine if preparation of core network resources are required to activate the wireless base station and bring it on-line so that the wireless base station can commence operating as an active wireless base station that has been allocated resources, e.g., spectrum for servicing subscriber clients.

This is accomplished by the base station discovery module/element 1310 of system 1300 in FIG. 10 which in at least some embodiments including the system 300 embodiment is a module or element of a network equipment device. As soon as the base station discovery module/element 1310 receives information of a D2D device, the base station discovery module/element requests the identity of the device and with the assistance of ProSe function element 1309, the base station discovery module/element will distinguish devices that are wireless base stations seeking to be activated from other devices. Upon determining that a device is seeking to be activated, the base station discovery element 1310 will inform the provisioning part of the network (e.g., by sending notification messages to various provisioning network equipment devices) of the wireless base station which is to be activated. The provisioning part of the network (e.g., network equipment devices responsible for performing provisioning operations) will perform operations which activate the wireless base station.

Figure 14:
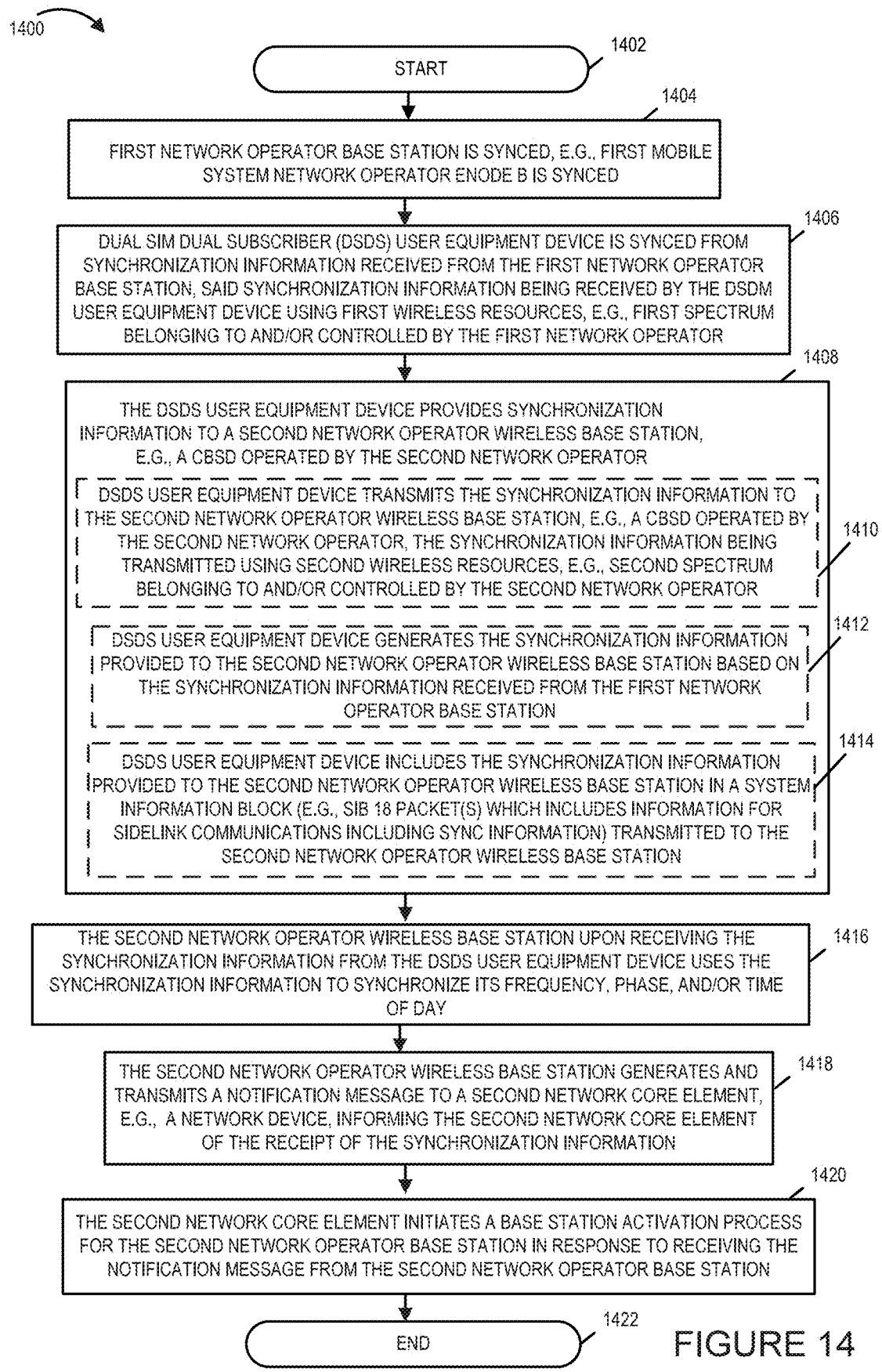
FIG. 14 illustrates a flowchart of an exemplary method in accordance with an embodiment of the present invention.

FIG. 14 illustrates a flowchart showing the exemplary steps of wireless base station synchronization/activation method 1400 in accordance with an embodiment of the present invention with emphasis on the sequence of steps to be taken for activation of a wireless base station at the core network. The method 1400 will be explained in connection of system 300 but the method is not limited to the system 300 and can be implemented in connection with other systems and system configurations.

The method 1400 starts in start step 1402. Operation proceeds from step 1402 to step 1404.

In step 1404, a first network operator base station (e.g., first network operator base station 308 of system 300) is synced, e.g., first MSO Network Operator EnodeB is synced, e.g., from timing information received from an atomic clock (e.g., atomic clock 314 of system 300) via an NTP server (e.g., NTP server 318). Operation proceeds from step 1404 step 1408.

In step 1408, a Dual SIM Dual Subscriber (DSDS) user equipment device (e.g., DSDS user equipment device 306 of system 300) is synced from synchronization information received from the first network operator base station, said synchronization information being received by the DSDS user equipment device using first wireless resources, e.g., first spectrum belonging to and/or controlled by the first network operator and allocated for use by the first network operator base station. Operation proceeds from step 1406 to step 1408.

In step 1408, the DSDS user equipment device provides synchronization information to a second network operator wireless base station (second wireless base station 304 of system 300), e.g., a CBSD operated by a second network operator, said second network operator being different than said first network operator which operates the first network operator base station. In some embodiments step 1408 includes or more sub-steps 1410, 1412, and 1414.

In sub-step 1410, the DSDS user equipment device transmits the synchronization information to the second network operator wireless base station, e.g., a CBSD operated by the second network operator, the synchronization information being transmitted using second wireless resources, e.g., second spectrum belonging to and/or controlled by the second network operator. In some embodiments, the second spectrum is spectrum generally available to the second network operator as opposed to be belonging to and/or being controlled by the second network operator.

In sub-step 1412, the DSDS user equipment device generates the synchronization information provided to the second network operator wireless base station based on the synchronization information received from the first network operator base station.

In sub-step 1414, the DSDS user equipment device includes the synchronization information provided to the second network operator wireless base station in a system information block (e.g., SIB 18 packet(s) which includes the resource information for synchronization signal and Sidelink Broadcast Control Channel (SBCCH) transmission) transmitted to the second network operator wireless base station. Operation proceeds from step 1408 to step 1416.

In step 1416, the second network operator wireless base station upon receiving the synchronization information from the DSDS user equipment device uses the synchronization information to synchronize its frequency, phase and/or time of day. Operation proceeds from step 1416 to step 1418.

In step 1418, the second network operator wireless base station generates and transmits a notification message to a second network core element, e.g., a network equipment device, informing the second network core element of the receipt of the synchronization information. Operation proceeds from step 1418 to step 1420.

In step 1420, the second network core element initiates a base station activation process for the second network operator base station in response to receiving the notification message from the second network operator base station. Operation proceeds from step 1420 to step 1422 which is the end of the method 1400.

It should also be understood that since the synchronization information is traveling from the DSDS user equipment device to the second network operator wireless base station there will be a propagation delay introduced that may, and typically does, need to be compensated for. This is propagation delay is compensated for by the second network operator wireless base station utilizing a propagation delay offset factor to sync the second wireless base station's reference clock based on the synchronization time received from the DSDS user equipment device. In some embodiments, the DSDS user equipment device includes a pathloss delay offset value in the synchronization information provided to the second network wireless base station which is used to compensate for the delay introduced into the synchronization time information as it travels from the DSDS user equipment device to the second network operator wireless base station. FIG. 16 illustrates the format of an exemplary synchronization information message packet 1670 which may be, and in some embodiments, is utilized to transmit synchronization information from a DSDS user equipment device to a second network operator wireless base station as described in connection with the method 1400. Details of the exemplary synchronization information message packet 1670 have been described above.

In various embodiments, wireless base stations, e.g., CBSDs, that are unsynchronized when powered on and do not operate as wireless base station but instead are placed in a first mode of operation in which they operate as subscriber device (e.g., by emulating a user equipment device). Only upon successfully obtaining time synchronization information from a user equipment device via a D2D communications exchange and synchronization its own reference clock using the obtained time synchronization information does the wireless base station commence operating as an active wireless base station. This occurs for example when the wireless base station has been provisioned and activated by network equipment in its core network.

Once the wireless base station has been activated, it will remain activated for a pre-defined time interval, e.g., 20 minutes. However, when the wireless base station is about to go out of sync it will request sync information from the DSDS user equipment device on the sidelink channel to re-establish/renew sync information which might become outdated with time, e.g., because of drift due to the inaccuracy of the wireless base station's reference clock. If the DSDS user equipment device that provided the original synchronization is not available, e.g., because it is no longer in the wireless base station cell coverage range, the wireless base station will repeat the process of transmitting a D2D discovery request for creating another D2D sidelink channel with another DSDS user equipment device, establishing another D2D sidelink channel with a DSDS user equipment device that responds to the D2D discovery request and obtaining synchronization information from this DSDS user equipment device. In various embodiments, the wireless base station obtains periodic sync with time over D2D sidelink channel(s) with help from the connection manager(s) of the DSDS user equipment device(s).

Figure 17A:
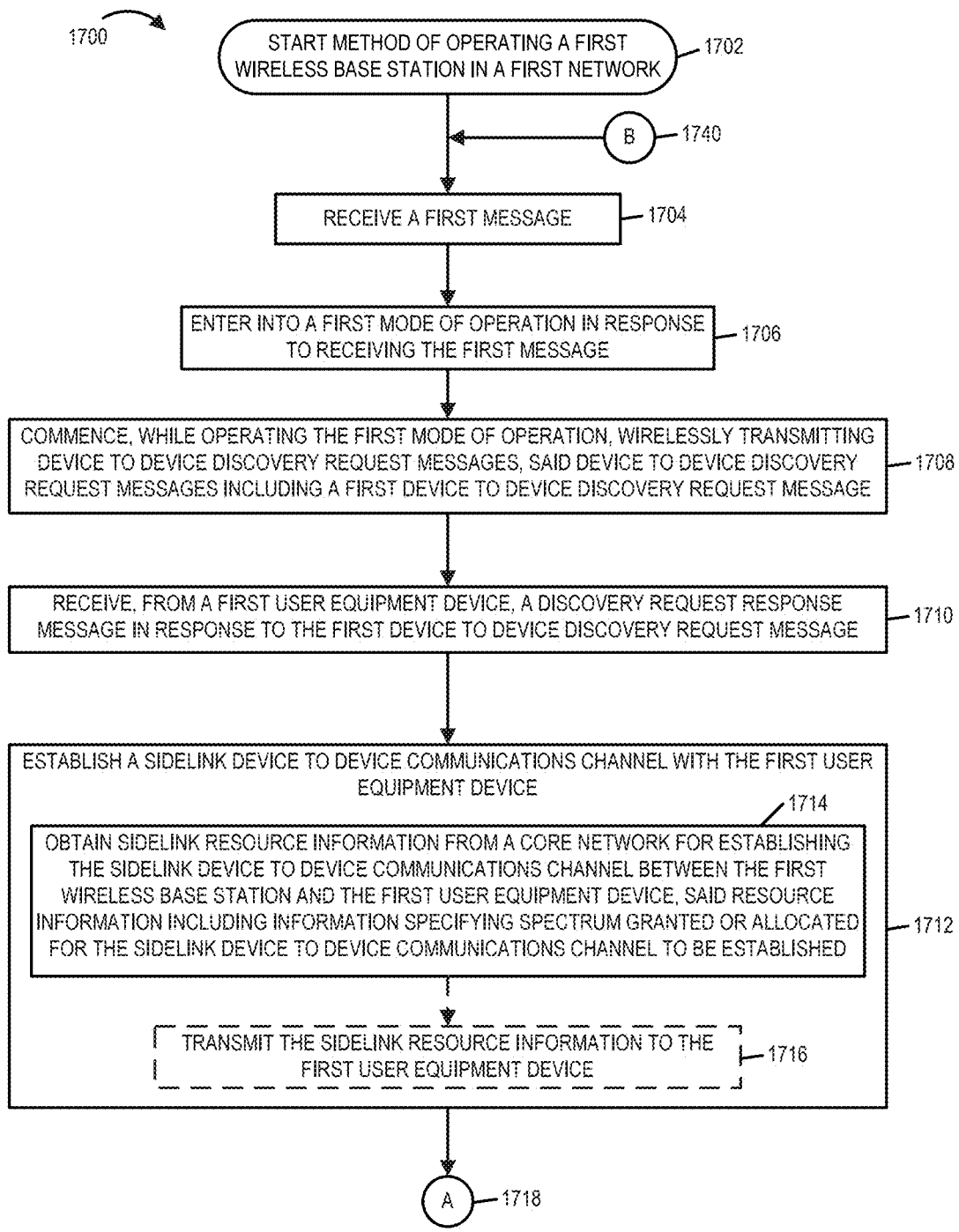
FIG. 17A is a first part of a flowchart of an exemplary method of operating a first wireless base station in accordance with an exemplary embodiment.

FIG. 17, comprising the combination of FIG. 17A and FIG. 17B, is a flowchart 1700 of an exemplary method of operating a first wireless base station in a first network, in accordance with an exemplary embodiment. Operation of the exemplary method starts in step 1702 and proceeds to step 1704.

In step 1704 the first wireless base station receives a first message. In some embodiments, the first network is a hybrid mobile network and the first message is a first control message from a first network equipment device, which is part of the hybrid mobile network, said first message being received by the first wireless base station over a landline. In some embodiments, the first message is a first control message, which includes an instruction for the first wireless base station to enter a first mode of operation. Operation proceeds from step 1704 to step 1706.

In step 1706 the first base station enters into the first mode of operation in response to receiving the first message. In some embodiments, the first message is a first control message and the first control message includes an instruction for the first wireless base station to enter a discovery mode of operation, said first mode of operation being a discovery mode of operation. In some embodiments, the first message is a first control message, and the first control message includes an instruction for the first wireless base station to enter a device to device mode of operation, said first mode of operation being a device to device mode of operation. Operate proceeds from step 1706 to step 1708.

In step 1708 the first wireless base station commences, while operating in the first mode of operation, wirelessly transmitting device to device discovery request messages, said device to device discovery request messages including a first device to device discovery request message. In some embodiments the device to device discovery request messages are device to device Proximity Service discovery request beacon messages announcing to monitoring Proximity Service devices that the first wireless base station is seeking to establish a device to device wireless connection. Operation proceeds from step 1708 to step 1710.

In step 1710 the first wireless base station receives, from a first user equipment device, a discovery request response message in response to the first device to device discovery request message. In some embodiments, the device to device discovery request messages are device to device Proximity Service discovery request beacon messages announcing to monitoring Proximity Service devices that the first wireless base station is seeking to establish a device to device wireless connection; and the discovery request response message is a Proximity Service discovery response request message.

In some embodiments, the hybrid mobile network includes a Citizens Broadband Radio Service Time Division—Long Term Evolution (CBRS TD-LTE) network with wireless communications devices utilizing CBRS TD-LTE New Radio radios; and said first wireless communications devices include the first wireless base station and the first user equipment device. In some such embodiments, the first wireless base station is an indoor Hybrid Mobile Network Operator (HMNO) small cell Citizens Broadband Radio Service Device (CBSD).

In some embodiments, the first user equipment device is a Dual Subscriber user equipment device having credentials for two different mobile subscription services (e.g., authentication credentials for a first service provider's mobile network and authentication for a second service provider's mobile network). In some embodiments, the first user equipment device is a Dual Subscriber Identity Module (SIM) Dual Subscriber user equipment device. In some embodiments, the first user equipment device is a Dual Subscriber Identity Module (SIM) Dual Standby user equipment device. In some embodiments, the first user equipment device is a Dual Subscriber Identity Module (SIM) Dual Active user equipment device.

In various embodiments, the first wireless base station is coupled to a HMNO core network via a cable modem; and the first wireless base station receives the first message from a network equipment device in the HMNO core network via the cable modem.

Operation proceeds from step 1710 to step 1712. In step 1712 the first wireless base station establishes a sidelink device to device communications channel with the first user equipment device. Step 1712 includes step 1714, and in some embodiments step 1716.

In step 1714 the first wireless base station obtains sidelink resource information from a core network for establishing the sidelink device to device communications channel between the first wireless base station and the first user equipment device, said resource information including information specifying spectrum granted or allocated for the sidelink device to device communications channel to be established. In some embodiments, the core network is part of the first network. In some other embodiments, the core network is not part of the first network but is a part of a second network, said first user equipment device obtaining the sidelink resource information via a second wireless base station and sharing the sidelink resource information with the first wireless base station.

In some embodiments, e.g., an embodiment in which the core network, which supplied the sidelink resource information is part of the first network, operation proceeds from step 1714 to step 1716, in which the first wireless base station transmits the sidelink resource information to the first user equipment device. In some embodiments, core network is part of the first network; and said sidelink resource information specifies spectrum authorized for use by subscribers of the first network or available for use by subscribers of the first network.

Operation proceeds from step 1712, via connecting node A 1718 to step 1720.

In step 1720 the first wireless base station obtains, while operating in the first mode of operation, synchronization information from a first user equipment device using over the air device to device communications, said synchronization information including time synchronization information. Step 1720 includes steps 1722 and 1724. In step 1722 the first wireless base station transmits a first sync request message to the first user equipment device over the established device to device sidelink communications channel. Operation proceeds from step 1722 to step 1724. In step 1724 the first wireless base station receives, over the device to device sidelink communications channel, from the first user equipment device said synchronization information. In some embodiments, the synchronization information received from the first user equipment device is based on synchronization information received by the first user equipment device from a second wireless base station, and said second wireless base station is not part of the first network. In some embodiments, the synchronization information includes a time value, e.g., a time stamp value, and delay information, e.g., a path transmission delay value.

In some embodiments, step 1724 includes step 1725. In step 1725 the first wireless base station receives the synchronization from the first user equipment device, said synchronization include a packet (e.g., a block type 18 (SIB 18) packet) with the sync information, said synchronization information being communicated over the sidelink device to device communications channel established between the first wireless base station and the first user equipment device, said synchronization information being based on information provided to the first user equipment device being from a second wireless base station.

In some embodiments, said synchronization information further includes frequency and phase information. In some such embodiments, said synchronization information is frequency, phase and time of day information required for operating as a wireless base station. In some embodiments, said synchronization information is a clock sync or time sync signal (e.g., clock signal such as IEEE 1588 for frequency, phase and time of day). In some embodiments, said synchronization information is a clock sync or time sync signal derived from information included a Network Time Protocol (NTP) message received from a NTP server via a second wireless base station, said first user equipment device receiving said synchronization information from said second wireless base station, said second wireless base station being operated by a different service provider than said first wireless base station, and said first wireless base station and said second wireless base station are operating using different spectrum bands.

In some embodiments, the first user equipment device is a Dual Subscriber Identity Module (SIM) Dual Standby or a Dual Subscriber Identity Module (SIM) Dual Active user equipment device, which includes a first SIM corresponding to the service provider of the first network and a second SIM corresponding to said different service provider. In some such embodiments, first SIM includes a first authentication key corresponding to a first subscription with the first service provider; and the second SIM includes a second authentication key corresponding to a second subscription with second service provider.

Operation proceeds from step 1720 to step 1726. In step 1726, the first wireless base station determines whether or not a timer, e.g. a reference clock, of the first wireless base station has been previously synchronized since power on. If the determination is that the timer, e.g. reference clock, of the first wireless base station has not been previously synchronized since power on, then operation proceeds from step 1726 to step 1728. However, if the determination is that the timer, e.g., reference clock, of the first wireless base station has been previously synchronized since power on, then operation proceeds from step 1726 to step 1730.

Retuning to step 1728, in step 1728 the first wireless base station utilizes the synchronization information obtained from the first user equipment device to a set the timer, e.g. the reference clock, in the first wireless base station. Step 1728 includes step 1732, in which the first wireless base station uses the delay information included the received synchronization information to adjust a time value.

Returning to step 1730, in step 1730 the first wireless base station utilizes the synchronization information obtained from the first user equipment device to re-synch a timer, e.g. a reference clock, in the first wireless base station. Step 1730 includes step 1734, in which the first wireless base station uses the delay information included the received synchronization information to adjust a time value.

Operation proceeds from step 1728 or step 1730 to step 1736. In step 1736 the first wireless base station transmits a message to a core network equipment device of the first network, said message indicating successful reception of time synchronization information. Operation proceeds from step 1736 to step 1738.

In step 1738 the first wireless base station receives from the core network equipment device a message instructing the first wireless base station to exit the first mode of operation and enter a second mode operation, said second mode of operation including changing state from off-line to on-on. In some embodiments, when the first wireless base station is in an off-line state of operation, the first wireless base station does not operate as a wireless base station and when the first wireless base station is in an on-line state of operation, the first wireless base station performs wireless base station operations and provides wireless base station services to user equipment devices. Operation proceeds from step 1738, via connecting node B 1740 to step 1704.

In some embodiments, said first user equipment device is a mobile device with Dual Subscriber Identity Module (SIM) Dual Subscriber (DSDS) functionality; and said synchronization information is based on synchronization information obtained by the first user equipment device from a second wireless base station, said second wireless base station not being part of the first network. In some such embodiments, said second wireless base station is part of a second wireless network, said first network and said second network being operated by different service providers, said first network being operated by a first service provider and said second network being operated by a second service provider; and said first wireless base station and said second wireless base station utilize different spectrum bands for communicating with subscriber devices; and the first user equipment device includes a first SIM card with subscriber credentials for the first network and a second SIM card with subscriber credentials for the second network. In some embodiments, said first user equipment device is a subscriber of the first service provider and a subscriber of the second service provider. In some embodiments, the first wireless base station operates in a first spectrum band; the second wireless base station operates in a second spectrum band; and said first and second spectrum bands are different. In some such embodiments, the first spectrum band is general authorized access (GAA) spectrum and the second spectrum band is priority access license (PAL) spectrum.

In some embodiments, the first wireless base station operates as a subscriber device in connection with the device to device communications with the first user equipment device. In some such embodiments, the first wireless base station is a subscriber with regard to a service which provides synchronization information via device to device sidelink communications with timing synchronized user equipment devices. In some embodiments, the first wireless base station emulates a user equipment device when obtaining synchronization from the first user equipment device over the air device to device communications.

In one exemplary embodiment, the first wireless base station implementing the method of flowchart 1700 of FIG. 17 is wireless base station 304 of FIG. 3; the second wireless based station described with respect to FIG. 17 is wireless base station 308 of FIG. 3; the first user equipment device described with respect to FIG. 17 is DSDS UE 306 of FIG. 3; and the core network described with respect to FIG. 17 is core network 330 of FIG. 3.

In another exemplary embodiment, the first wireless base station implementing the method of flowchart 1700 of FIG. 17 is wireless base station 1508 of FIG. 15; the second wireless based station described with respect to FIG. 17 is wireless base station 1504 of FIG. 15; the first user equipment device described with respect to FIG. 17 is DSDS UE 1506 of FIG. 15; and the core network described with respect to FIG. 17 is core network 1510 of FIG. 15.

Figure 18A:
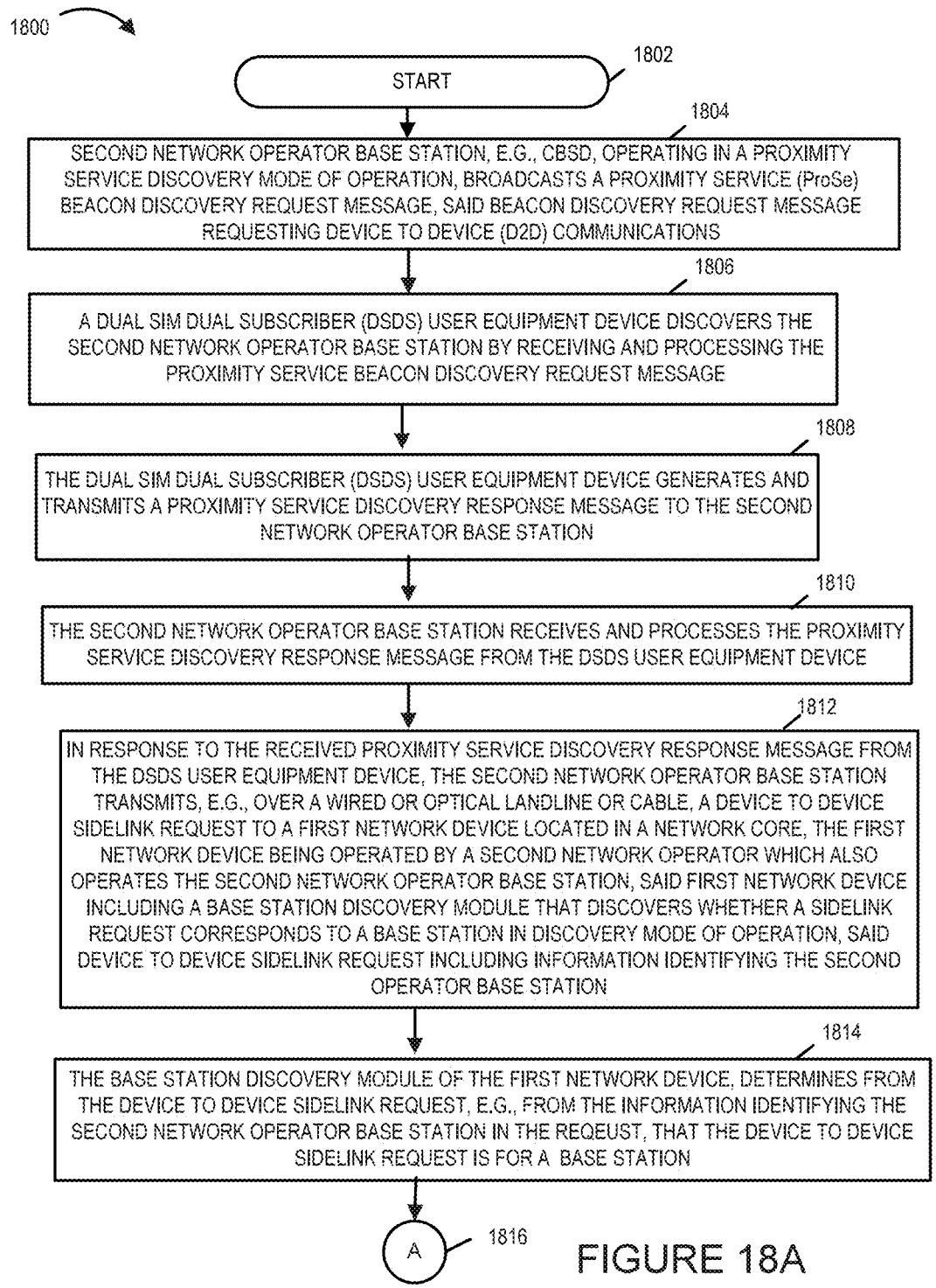
FIG. 18A illustrates the steps of the first part of an exemplary method in accordance with an embodiment of the present invention.
Figure 18B:
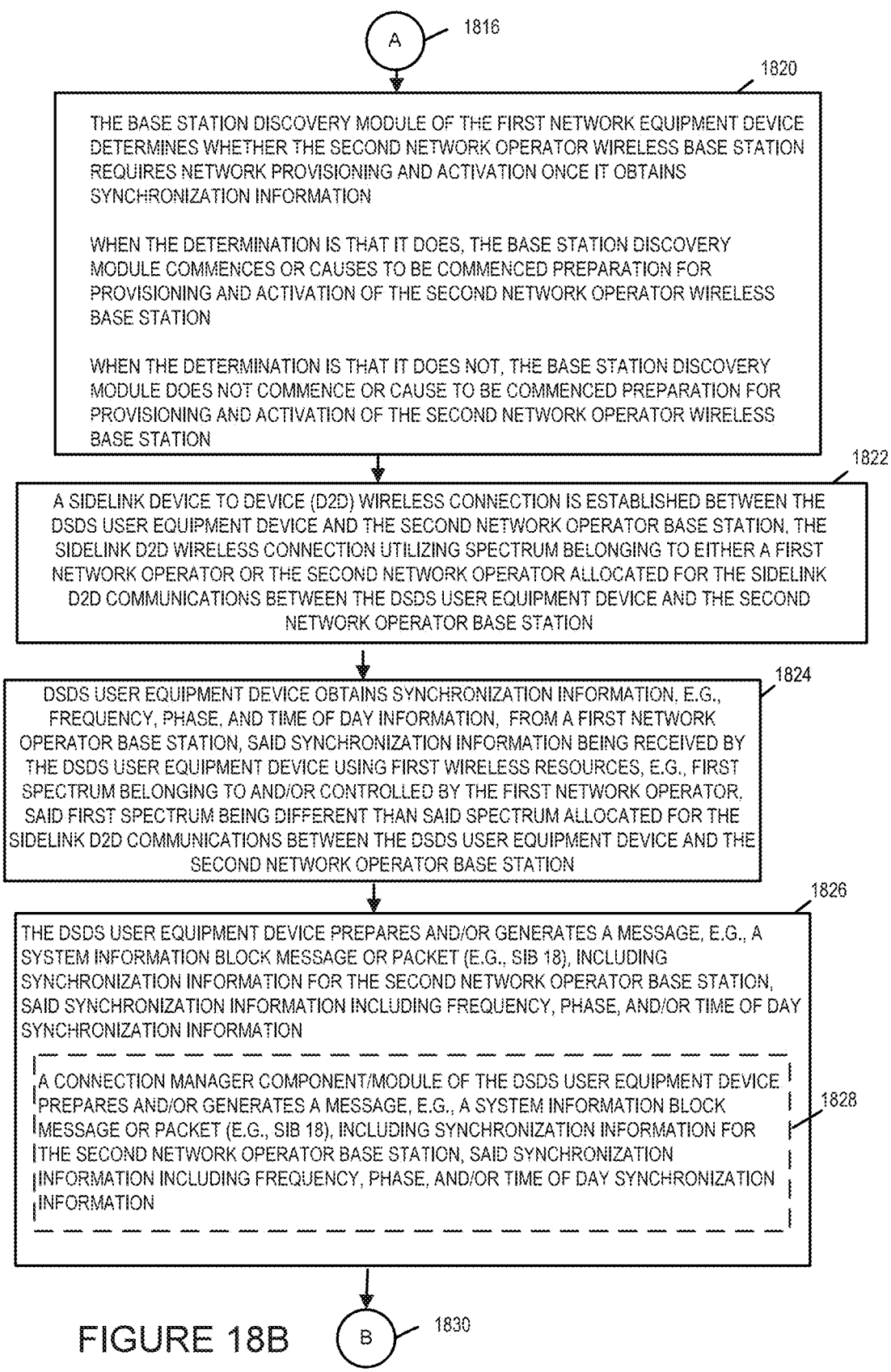
FIG. 18B illustrates the steps of the second part of an exemplary method in accordance with an embodiment of the present invention.

FIG. 18, comprising the combination of FIG. 18A, FIG. 18B and FIG. 18C, is a flowchart of an exemplary method 1800 in accordance an embodiment of the present invention. Operation of the exemplary method starts in step 1802 and proceeds to step 1804.

In step 1804, a second network operator base station, e.g., a CSBD, operating in a Proximity Service discovery mode of operation broadcasts and/or transmits over the air a Proximity Service (ProSe) beacon discovery request message, said beacon discovery request message requesting device to device (D2D) communications. Operation proceeds from step 1804 to step 1806.

In step 1806, a Dual SIM Dual Subscriber (DSDS) user equipment device (e.g., DSDS user equipment device 306 of system 300) discovers the second network operator base station by receiving and processing the proximity service beacon discovery request message. Operation proceeds from step 1806 to step 1808.

In step 1808, the DSDS user equipment device generates and transmits a proximity service discovery response message to the second network operator base station. Operation proceeds from step 1808 to step 1810.

In step 1810, the second network operator base station receives and processes the proximity service discovery response message from the DSDS user equipment device. Operation proceeds from step 1810 to step 1812.

In step 1812, in response to the received proximity service discovery response message from the DSDS user equipment device, the second network operator base station transmits, e.g., over a wired or optical landline or cable, a device to device sidelink request to a first network equipment device (e.g., network equipment 332 of system 300) located in a core network (e.g., core network 330 of system 300). The first network equipment device being operated by a second network operator which also operates the second network operator base station. The first network equipment device including a base station discovery module or element that discovers whether a D2D sidelink request corresponds to a base station in discovery mode of operation, said device to device sidelink request including information identifying the second operator base station, e.g., a Cell Global ID. Operation proceeds from step 1812 to step 1814.

In step 1814, the base station discovery module of the first network equipment device, determines from the device to device sidelink request, e.g., from the information identifying the second network operator base station in the request, that the device to device sidelink requet is for a base station. Operation proceeds from step 1814 via connection node A 1816 to step 1820 shown on FIG. 18B.

In step 1820, the base station discovery module of the first network equipment device determines whether the second network operator wireless base station requires network provisioning and activation once it obtains synchronization information (e.g., is the second network operator base station currently on-line and is trying to obtain re-sync information or is it off-line and trying to gain initial sync info so it can become an activated on-line wireless base station). When the determination is that the second wireless base station will require provisioning and activation the base station discovery module commences or causes to be commenced preparation for provisioning and activation of the second network operator wireless base station (e.g., preparing resources (e.g., spectrum for the second network operator base station to be allocated for use as a wireless base station to provide wireless services to subscriber devices). When the determination is that the second network operator wireless base station does not require provisioning and activation (e.g., it is already on-line and the synchronization information is for re-sync purposes to remain in synchronization), the base station discovery module does not commence or cause to be commenced preparation for provisioning and activation of the second network operator base station as it is already provisioned and activated. Operation proceeds from step 1820 to step 1822.

In step 1822, a sidelink device to device (D2D) wireless connection is established between the DSDS user equipment device and the second network operator base station, the sidelink D2D wireless connection utilizing spectrum belonging to the either a first network operator or the second network operator allocated for the sidelink D2D communications between the DSDS user equipment device and the second network operator base station. Operation proceeds from step 1822 to step 1824.

In step 1824, the DSDS user equipment device obtains synchronization information, e.g., frequency, phase and/or time of day information, from a first network operator base station, e.g., first network operator base station 308 of system 300). The first network operator base station being operated by a first network operator. The first network operator being different than the second network operator. The synchronization information being received by the DSDS user equipment device using first wireless resources, e.g., first spectrum belonging to and/or controlled by the first network operator. The first spectrum being different than said spectrum allocated for the sidelink D2D communications between the DSDS user equipment device and the second network operator base station. Operation proceeds from step 1824 to step 1826.

In step 1826, the DSDS user equipment device prepares and/or generates a message, e.g., a system information block message or packet (e.g., SIB 18 packet), including synchronization information for the second network operator base station, said synchronization information including frequency, phase, and/or time of day synchronization information based on the synchronization received from the first network operator wireless base station information. FIG. 16 illustrates an exemplary synchronization information packet format and exemplary information contained in such a packet. In some embodiments, step 1826, includes a sub-step 1828.

In sub-step 1828, a connection manager component/module of the DSDS user equipment device prepares and/or generates a message, e.g., a system information block message or packet (e.g., SIB 18), including synchronization information for the second network operator base station, said synchronization information including frequency, phase, and/or time of day synchronization information based on the synchronization received from the first network operator wireless base station information. Operation proceeds from step 1828 via connection node B 1830 to step 1832 shown on FIG. 18C.

In step 1832, the DSDS user equipment device transmits the prepared/generated message including synchronization information to the second network operator wireless base station over the sidelink D2D wireless connection. Operation proceeds from step 1832 to step 1834.

In step 1834, the second network operator wireless base station upon receiving the synchronization information from the DSDS user equipment device uses the synchronization information to synchronize its frequency, phase, and/or time of day, e.g., by synchronizing its reference clock. Operation proceeds from step 1834 to step 1836.

In step 1836, the second network operator wireless base station generates and transmits a notification message to a second network equipment device of the core network informing the second network equipment device of the receipt of the synchronization information from the DSDS user equipment device. In some embodiments, the second network equipment device is the same device as the first network equipment device. Operation proceeds from step 1836 to step 1838.

In step 1838, the second network equipment device initiates or causes to be initiated a base station activation process for the second network operator base station in response to receiving the notification message from the second network operator base station that it has received the synchronization information. Operation proceeds from step 1838 to step 1840.

In step 1840, the second network operator base station is provisioned (e.g., allocated spectrum for operations and provided operating instructions (maximum power transmission levels, etc.)) and activated by the core network (e.g., network equipment in the core network). Operation proceeds from step 1840 to step 1842.

In step 1842, upon becoming activated the second network operator base station goes from an off-line state of operation to an on-line state of operations wherein it commences base station operations providing wireless services to subscriber devices. Operation proceeds from step 1842 to step 1844.

In step 1844, the second network operator wireless base station periodically repeats the process to re-synch/re-new its timing information to remain in synchronization.

Various exemplary numbered embodiments illustrating different features of the present invention will now be discussed. The various features discussed may be used in variety of different combinations. The numbered embodiments are only exemplary and are not meant to be limiting to the scope of the invention. The various method embodiments may be, and in some embodiments are, implemented on system 300 of FIG. 3.

List of Exemplary Numbered Method Embodiments

Method Embodiment 1. A method of operating a first wireless base station in a first network comprising: receiving, at the first wireless base station, a first message; in response to receiving the first message entering, by the first wireless base station, into a first mode of operation; and while operating in said first mode of operation, obtaining, by the first wireless base station, synchronization information from a first user equipment device using over the air device to device communications, said synchronization information including time synchronization information.

Method Embodiment 1A. The method of Method Embodiment 1, wherein the first wireless base station operates as a subscriber device in connection with the device to device communications with the first user equipment device.

Method Embodiment 1AA. The method of Method Embodiment 1A, wherein the first wireless base station is a subscriber with regard to a service which provides synchronization information via device to device sidelink communications with timing synchronized user equipment devices.

Method Embodiment 1AAA. The method of Method Embodiment 1A, wherein the first wireless base station emulates a user equipment device when obtaining said synchronization information from the first user equipment device using over the air device to device communications.

Method Embodiment 1B. The method of Method Embodiment 1, wherein said obtaining, by the first wireless base station, synchronization information from a first user equipment device using over the air device to device communications includes: receiving, by the first wireless base station, the synchronization information from the first user equipment device, said synchronization information including a block type 18 (SIB 18) packet with sync information, said synchronization information being communicated over a sidelink device to device communications channel established between the first wireless base station and the first user equipment device, said synchronization information being based on information provided to the first user equipment from a second wireless base station.

Method Embodiment 2. The method of Method Embodiment 1, wherein the first network is a hybrid mobile network; and wherein the first message is a first control message from a first network equipment device which is part of the hybrid mobile network, said first message being received by the first wireless base station over a landline.

Method Embodiment 2A. The method of Method Embodiment 2, wherein the hybrid mobile network includes a Citizens Broadband Radio Service Time Division—Long Term Evolution (CBRS TD-LTE) network with wireless communications devices utilizing CBRS TD-LTE New Radio radios; wherein said first wireless communications devices include the first wireless base station and the first user equipment device; and wherein the first wireless base station is an indoor Hybrid Mobile Network Operator (HMNO) small cell Citizens Broadband Radio Service Device (CBSD).

Method Embodiment 2AA. The method of Method Embodiment 2A, wherein the first user equipment device is a Dual Subscriber user equipment device having credentials for two different mobile subscription services (e.g., authentication credentials for a first service provider's mobile network and authentication for a second service provider's mobile network).

Method Embodiment 2AAA. The method of Method Embodiment 2A, wherein the first user equipment device is a Dual Subscriber Identity Module (SIM) Dual Subscriber user equipment device.

Method Embodiment 2AAAA. The method of Method Embodiment 2A, 2AA, and 2AAA, wherein the first user equipment device is a Dual Subscriber Identity Module (SIM) Dual Standby user equipment device.

Method Embodiment 2AAAAA. The method of Method Embodiments 2A, 2AA, and 2AAA, wherein the first user equipment device is a Dual Subscriber Identity Module (SIM) Dual Active user equipment device.

Method Embodiment 2B. The method of Method Embodiment 2, wherein the first wireless base station is coupled to a HMNO core network via a cable modem; and wherein the first wireless base station receives the first message from a network equipment device in the HMNO core network via the cable modem.

Method Embodiment 2C. The method of Method Embodiment 2 wherein said synchronization information further includes frequency and phase information.

Method Embodiment 2D. The method of Method Embodiment 2C, wherein said synchronization information is frequency, phase and time of day information required for operating as a wireless base station.

Method Embodiment 2E. The method of Method Embodiment 2, wherein said synchronization information is a clock sync or time sync signal (e.g., clock signal such as IEEE 1588 for frequency, phase and time of day).

Method Embodiment 2F. The method of Method Embodiment 2, wherein said synchronization information is a clock sync or time sync signal derived from information included a Network Time Protocol (NTP) message received from a NTP server via a second wireless base station, said first user equipment device receiving said synchronization information from said second wireless base station, said second wireless base station being operated by a different service provider than said first wireless base station, and wherein said first wireless base station and said second wireless base station are operating using different spectrum bands.

Method Embodiment 2G. The method of Method Embodiment 2, wherein the first user equipment device is a Dual Subscriber Identity Module (SIM) Dual Standby or a Dual Subscriber Identity Module (SIM) Dual Active user equipment device, which includes a first SIM corresponding to the service provider of the first network and a second SIM corresponding to said different service provider.

Method Embodiment 2G1. The method of Method Embodiment 2G, wherein the first SIM includes a first authentication key corresponding to a first subscription with the first service provider; and wherein the second SIM includes a second authentication key corresponding to a second subscription with second service provider.

Method Embodiment 3. The method of Method Embodiment 1, wherein said first message is a first control message; wherein the first control message includes an instruction for the first wireless base station to enter the first mode of operation; and while operating in said first mode of operation the first wireless base station commences wirelessly transmitting device to device discovery request messages, said device to device discovery request messages including a first device to device discovery request message.

Method Embodiment 3A. The method of Method Embodiment 3, wherein the device to device discovery request messages are device to device Proximity Service discovery request beacon messages announcing to monitoring Proximity Service devices that the first wireless base station is seeking to establish a device to device wireless connection.

Method Embodiment 3B. The method of Method Embodiment 1, wherein said first message is a first control message; and wherein the first control message includes an instruction for the first wireless base station to enter a discovery mode of operation, said first mode of operation being a discovery mode of operation.

Method Embodiment 3C. The method of Method Embodiment 1, wherein said first message is a first control message; and wherein the first control message includes an instruction for the first wireless base station to enter a device to device mode of operation, said first mode of operation being a device to device mode of operation.

Method Embodiment 4. The method of Method Embodiment 1, wherein said first user equipment device is a mobile device with Dual Subscriber Identity Module (SIM) Dual Subscriber (DSDS) functionality; and wherein said synchronization information is based on synchronization information obtained by the first user equipment device from a second wireless base station, said second wireless base station not being part of the first network.

Method Embodiment 4A. The method of Method Embodiment 4, wherein said second wireless base station is part of a second wireless network, said first network and said second network being operated by different service providers, said first network being operated by a first service provider and said second network being operated by a second service provider; wherein said first wireless base station and said second wireless base station utilize different spectrum bands for communicating with subscriber devices; and wherein said first user equipment device includes a first SIM card with subscriber credentials for the first network and a second SIM card with subscriber credentials for the second network.

Method Embodiment 4B. The method of Method Embodiment 4A, wherein said first user equipment device is a subscriber of the first service provider and a subscriber of the second service provider.

Method Embodiment 4C. The method of Method Embodiment 4A, wherein the first wireless base station operates in a first spectrum band; wherein the second wireless base station operates in a second spectrum band; and wherein said first and second spectrum bands are different.

Method Embodiment 4D. The method of Method Embodiment 4C, wherein the first spectrum band is general authorized access (GAA) spectrum and the second spectrum band is priority access license (PAL) spectrum.

Method Embodiment 5. The method of Method Embodiment 3, further comprising: receiving, from the first user equipment device, a discovery request response message in response to the first device to device discovery request message; and establishing a sidelink device to device communications channel with the first user equipment device.

Method Embodiment 5A. The method of Method Embodiment 5, wherein said establishing a sidelink device to device communications channel with the first user equipment device includes obtaining sidelink resource information from a core network for establishing the sidelink device to device communications channel between the first wireless base station and the first user equipment device, said resource information including information specifying spectrum granted or allocated for the sidelink device to device communications channel to be established.

Method Embodiment 5B. The method of Method Embodiment 5A, wherein said sidelink resource information is obtained by the first wireless base station; and wherein said establishing a sidelink device to device communications channel with the first user equipment device includes transmitting the sidelink resource information to the first user equipment device.

Method Embodiment 5C. The method of Method Embodiment 5B, wherein said core network is part of the first network; and wherein said sidelink resource information specifies spectrum authorized for use by subscribers of the first network or available for use by subscribers of the first network.

Method Embodiment 5D. The method of Method Embodiment 5A, wherein said core network is not part of the first network but is a part of a second network, said first user equipment device obtaining the sidelink resource information via a second wireless base station and sharing the sidelink resource information with the first wireless base station.

Method Embodiment 5E. The method of Method Embodiment 5, wherein the device to device discovery request messages are device to device Proximity Service discovery request beacon messages announcing to monitoring Proximity Service devices that the first wireless base station is seeking to establish a device to device wireless connection; and wherein the discovery request response message is Proximity Service discovery response request message.

Method Embodiment 6. The method of Method Embodiment 5, wherein said obtaining, by the first wireless base station, synchronization information from a first user equipment device using over the air device to device communications, said synchronization information including time synchronization information includes: transmitting a first sync request message to the first user equipment device over the established device to device sidelink communications channel; and receiving over the device to device sidelink communications channel from the first user equipment device said synchronization information.

Method Embodiment 7. The method of Method Embodiment 6, wherein the synchronization information received from the first user equipment device is based on synchronization information received by the first user equipment device from a second wireless base station, said second wireless base station not being part of the first network.

Method Embodiment 8. The method of Method Embodiment 1, further comprising: utilizing, by the first wireless base station, the synchronization information obtained from the first user equipment device to set a timer at the first wireless base station.

Method Embodiment 9. The method of Method Embodiment 1, wherein said synchronization information includes a time value and delay information; and wherein utilizing, by the first wireless base station, the synchronization information obtained from the first user equipment device to set a timer at the first wireless base station includes using the delay information to adjust the time value.

Method Embodiment 9A. The method of Method Embodiment 9, wherein said time value is a time stamp value; and wherein said delay value is a path transmission delay value.

Method Embodiment 10. The method of Method Embodiment 9, further comprising: transmitting, by the first wireless base station, a message to a core network equipment device of the first network, said message indicating successful reception of time synchronization information; and receiving from the core network equipment device a message instructing the first wireless base station to exit the first mode of operation and enter a second mode of operation, said second mode of operation including changing state from off-line to on-line; and wherein when the first wireless base station is in an off-line state of operation it does not operate as a wireless base station and when the first wireless base station is in an on-line state of operation it performs wireless base station operations and provides wireless base station services to user equipment devices.

Method Embodiment 11. The method of Method Embodiment 1, further comprising: re-synching, by the first wireless base station, a timer at the first wireless base station using the synchronization information obtained from the first user equipment device.

Method Embodiment 12. A method of operating a dual Subscriber Identity Module (SIM) user equipment device comprising: receiving, at the dual SIM user equipment device from a first wireless base station, a request message requesting synchronization information, said synchronization information including timing synchronization information; in response to receiving the request for synchronization information from the first wireless base station, generating by the dual SIM user equipment device a synchronization message including the requested synchronization information based on synchronization information obtained by the dual SIM user equipment device from a second wireless base station; and transmitting the synchronization message to the first wireless base station.

Method Embodiment 13. The method of Method Embodiment 12, further comprising: prior to receiving the request message requesting synchronization information from the first wireless base station, receiving, by the dual SIM user equipment device a device to device (D2D) discovery request message from the first wireless base station; and in response to receiving the D2D discovery request message, establishing a device to device (D2D) sidelink communication channel with first wireless base station; and wherein the synchronization message is transmitted to the first wireless base station over the established D2D sidelink communications channel.

Method Embodiment 14. The method of Method Embodiment 13, further comprising: prior to generating the synchronization message, requesting synchronization information from a second wireless base station, said first wireless base station and said second wireless base station belonging to different wireless networks, said dual SIM user equipment device including a first SIM card and a second SIM card, said dual SIM user equipment device being able to communicate with the first wireless base station using information contained on the first SIM card, said dual SIM user equipment device being able to communicate with the second wireless base station using information contained on the second SIM card.

Method Embodiment 15. The method of Method Embodiment 12, wherein the D2D discovery request message is a Proximity Service discovery request message; and wherein the D2D sidelink communications channel is established using Proximity Services.

Method Embodiment 16. The method of Method Embodiment 12, wherein the first wireless base station utilizes a time division duplex wireless protocol to communicate with user equipment devices.

Method Embodiment 17. The method of Method Embodiment 13, wherein said establishing a device to device (D2D) sidelink communication channel with first wireless base station includes receiving information from the first wireless base station indicating the resources (e.g., spectrum) to be used for the D2D sidelink communications channel.

Method Embodiment 18. The method of Method Embodiment 12, wherein the first wireless base station is an indoor wireless base station (e.g., small cell CBSD); wherein the second wireless base station is an eNodeB.

List of Exemplary Numbered Apparatus Embodiments:

Apparatus Embodiment 1. A first wireless base station comprising: first receiver (network interface receiver); and a processor configured to operate the first wireless base station to: receive, via the first receiver, a first message; enter into a first mode of operation in response to the received first message; and obtain, while operating in the first mode of operation, synchronization information from a first user equipment device using over the air device to device communications, said synchronization information including time synchronization information.

Apparatus Embodiment 1A. The first wireless base station of Apparatus Embodiment 1, wherein the first wireless base station operates as a subscriber device in connection with the device to device communications with the first user equipment device.

Apparatus Embodiment 1AA. The first wireless base station of Apparatus Embodiment 1A, wherein the first wireless base station is a subscriber with regard to a service which provides synchronization information via device to device sidelink communications with timing synchronized user equipment devices.

Apparatus Embodiment 1AAA. The first wireless base station of Apparatus Embodiment 1A, wherein the first wireless base station emulates a user equipment device when obtaining said synchronization information from the first user equipment device using over the air device to device communications.

Apparatus Embodiment 1B. The first wireless base station of Apparatus Embodiment 1, further comprising: a first wireless receiver; and wherein said processor is further configured to: operate the first base station to receive, via the first wireless receiver, the synchronization information from the first user equipment device, said synchronization information including a block type 18 (SIB 18) packet with sync information, said synchronization information being communicated over a sidelink device to device communications channel established between the first wireless base station and the first user equipment device, said synchronization information being based on information provided to the first user equipment from a second wireless base station, as part of being configured to operate the first wireless base station to obtain synchronization information from a first user equipment device using over the air device to device communications.

Apparatus Embodiment 2. The first wireless base station of Apparatus Embodiment 1, wherein the first network is a hybrid mobile network; and wherein the first message is a first control message from a first network equipment device which is part of the hybrid mobile network, said first message being received by the first wireless base station over a landline.

Apparatus Embodiment 2A. The first wireless base station of Apparatus Embodiment 2, wherein the hybrid mobile network includes a Citizens Broadband Radio Service Time Division—Long Term Evolution (CBRS TD-LTE) network with wireless communications devices utilizing CBRS TD-LTE New Radio radios; wherein said first wireless communications devices include the first wireless base station and the first user equipment device; and wherein the first wireless base station is an indoor Hybrid Mobile Network Operator (HMNO) small cell Citizens Broadband Radio Service Device (CBSD).

Apparatus Embodiment 2AA. The first wireless base station of Apparatus Embodiment 2A, wherein the first user equipment device is a Dual Subscriber user equipment device having credentials for two different mobile subscription services (e.g., authentication credentials for a first service provider's mobile network and authentication for a second service provider's mobile network).

Apparatus Embodiment 2AAA. The first wireless base station of Apparatus Embodiment 2A, wherein the first user equipment device is a Dual Subscriber Identity Module (SIM) Dual Subscriber user equipment device.

Apparatus Embodiment 2AAAA. The first wireless base station of Apparatus Embodiments 2A, 2AA, and 2AAA, wherein the first user equipment device is a Dual Subscriber Identity Module (SIM) Dual Standby user equipment device.

Apparatus Embodiment 2AAAAA. The first wireless base station of Apparatus Embodiments 2A, 2AA, and 2AAA, wherein the first user equipment device is a Dual Subscriber Identity Module (SIM) Dual Active user equipment device.

Apparatus Embodiment 2B. The first wireless base station of Apparatus Embodiment 2, wherein the first wireless base station is coupled to a HMNO core network via a cable modem; and wherein the first wireless base station receives the first message from a network equipment device in the HMNO core network via the cable modem.

Apparatus Embodiment 2C. The first wireless base station of Apparatus Embodiment 2 wherein said synchronization information further includes frequency and phase information.

Apparatus Embodiment 2D. The first wireless base station of Apparatus Embodiment 2C, wherein said synchronization information is frequency, phase and time of day information required for operating as a wireless base station.

Apparatus Embodiment 2E. The first wireless base station of Apparatus Embodiment 2, wherein said synchronization information is a clock sync or time sync signal (e.g., clock signal such as IEEE 1588 for frequency, phase and time of day).

Apparatus Embodiment 2F. The first wireless base station of Apparatus Embodiment 2, wherein said synchronization information is a clock sync or time sync signal derived from information included a Network Time Protocol (NTP) message received from a NTP server via a second wireless base station, said first user equipment device receiving said synchronization information from said second wireless base station, said second wireless base station being operated by a different service provider than said first wireless base station, and wherein said first wireless base station and said second wireless base station are operating using different spectrum bands.

Apparatus Embodiment 2G. The first wireless base station of Apparatus Embodiment 2, wherein the first user equipment device is a Dual Subscriber Identity Module (SIM) Dual Standby or a Dual Subscriber Identity Module (SIM) Dual Active user equipment device, which includes a first SIM corresponding to the service provider of the first network and a second SIM corresponding to said different service provider.

Apparatus Embodiment 2G1. The first wireless base station of Apparatus Embodiment 2G, wherein the first SIM includes a first authentication key corresponding to a first subscription with the first service provider; and wherein the second SIM includes a second authentication key corresponding to a second subscription with second service provider.

Apparatus Embodiment 3. The first wireless base station of Apparatus Embodiment 1, further comprising: a wireless transmitter; and wherein said first message is a first control message; wherein the first control message includes an instruction for the first wireless base station to enter the first mode of operation; and wherein said processor is further configured to: operate the first wireless base station to, while operating in said first mode of operation the first wireless base station, commence wirelessly transmitting, via the wireless transmitter, device to device discovery request messages, said device to device discovery request messages including a first device to device discovery request message.

Apparatus Embodiment 3A. The first wireless base station of Apparatus Embodiment 3, wherein the device to device discovery request messages are device to device Proximity Service discovery request beacon messages announcing to monitoring Proximity Service devices that the first wireless base station is seeking to establish a device to device wireless connection.

Apparatus Embodiment 3B. The first wireless base station of Apparatus Embodiment 1, wherein said first message is a first control message; and wherein the first control message includes an instruction for the first wireless base station to enter a discovery mode of operation, said first mode of operation being a discovery mode of operation.

Apparatus Embodiment 3C. The first wireless base station of Apparatus Embodiment 1, wherein said first message is a first control message; and wherein the first control message includes an instruction for the first wireless base station to enter a device to device mode of operation, said first mode of operation being a device to device mode of operation.

Apparatus Embodiment 4. The first wireless base station of Apparatus Embodiment 1, wherein said first user equipment device is a mobile device with Dual Subscriber Identity Module (SIM) Dual Subscriber (DSDS) functionality; and wherein said synchronization information is based on synchronization information obtained by the first user equipment device from a second wireless base station, said second wireless base station not being part of the first network.

Apparatus Embodiment 4A. The first wireless base station of Apparatus Embodiment 4, wherein said second wireless base station is part of a second wireless network, said first network and said second network being operated by different service providers, said first network being operated by a first service provider and said second network being operated by a second service provider; wherein said first wireless base station and said second wireless base station utilize different spectrum bands for communicating with subscriber devices; and wherein said first user equipment device includes a first SIM card with subscriber credentials for the first network and a second SIM card with subscriber credentials for the second network.

Apparatus Embodiment 4B. The first wireless base station of Apparatus Embodiment 4A, wherein said first user equipment device is a subscriber of the first service provider and a subscriber of the second service provider.

Apparatus Embodiment 4C. The first wireless base station of Apparatus Embodiment 4A, wherein the first wireless base station operates in a first spectrum band; wherein the second wireless base station operates in a second spectrum band; and wherein said first and second spectrum bands are different.

Apparatus Embodiment 4D. The first wireless base station of Apparatus Embodiment 4C, wherein the first spectrum band is general authorized access (GAA) spectrum and the second spectrum band is priority access license (PAL) spectrum.

Apparatus Embodiment 5. The first wireless base station of Apparatus Embodiment 3, further comprising: a wireless receiver; and wherein said processor is further configured to operate the first wireless base station to: receive via the wireless receiver, from the first user equipment device, a discovery request response message in response to the first device to device discovery request message; and establish a sidelink device to device communications channel with the first user equipment device.

Apparatus Embodiment 5A. The first wireless base station of Apparatus Embodiment 5, wherein said processor is further configured to operate the first wireless base station to: obtain sidelink resource information from a core network for establishing the sidelink device to device communications channel between the first wireless base station and the first user equipment device, said resource information including information specifying spectrum granted or allocated for the sidelink device to device communications channel to be established, as part of being configured to operate the first wireless base station to establish a sidelink device to device communications channel with the first user equipment device.

Apparatus Embodiment 5B. The first wireless base station of Apparatus Embodiment 5A, wherein said sidelink resource information is obtained by the first wireless base station; and wherein said processor is further configured to operate the first wireless base station to: transmit via the wireless transmitter the sidelink resource information to the first user equipment device, as part of being configured to operate the first wireless base station to establish a sidelink device to device communications channel with the first user equipment device.

Apparatus Embodiment 5C. The first wireless base station of Apparatus Embodiment 5B, wherein said core network is part of the first network; and wherein said sidelink resource information specifies spectrum authorized for use by subscribers of the first network or available for use by subscribers of the first network.

Apparatus Embodiment 5D. The first wireless base station of Apparatus Embodiment 5A, wherein said core network is not part of the first network but is a part of a second network, said first user equipment device obtaining the sidelink resource information via a second wireless base station and sharing the sidelink resource information with the first wireless base station.

Apparatus Embodiment 5E. The first wireless base station of Apparatus Embodiment 5, wherein the device to device discovery request messages are device to device Proximity Service discovery request beacon messages announcing to monitoring Proximity Service devices that the first wireless base station is seeking to establish a device to device wireless connection; and wherein the discovery request response message is Proximity Service discovery response request message.

Apparatus Embodiment 6. The first wireless base station of Apparatus Embodiment 5, wherein said processor is further configured to operate the first wireless base station to: transmit, via the wireless transmitter, a first sync request message to the first user equipment device over the established device to device sidelink communications channel; and receive, via the wireless receiver, over the device to device sidelink communications channel from the first user equipment device said synchronization information, as part of being configured to operate the first wireless base station to obtain synchronization information from a first user equipment device using over the air device to device communications, said synchronization information including time synchronization information.

Apparatus Embodiment 7. The first wireless base station of Apparatus Embodiment 6, wherein the synchronization information received from the first user equipment device is based on synchronization information received by the first user equipment device from a second wireless base station, said second wireless base station not being part of the first network.

Apparatus Embodiment 8. The first wireless base station of Apparatus Embodiment 1, wherein said processor is further configured to: utilize the synchronization information obtained from the first user equipment device to set a timer at the first wireless base station.

Apparatus Embodiment 9. The first wireless base station of Apparatus Embodiment 1, wherein said synchronization information includes a time value and delay information; and wherein said processor is further configured to use the delay information to adjust the time value, as part of being configured to utilize the synchronization information obtained from the first user equipment device to set a timer at the first wireless base station.

Apparatus Embodiment 9A. The first wireless base station of Apparatus Embodiment 9, wherein said time value is a time stamp value; and wherein said delay value is a path transmission delay value.

Apparatus Embodiment 10. The first wireless base station of Apparatus Embodiment 9, further comprising: a first transmitter (network transmitter); and wherein said processor is further configured to operate the first wireless base station to: transmit, via the first transmitter, a message to a core network equipment device of the first network, said message indicating successful reception of time synchronization information; and receive, via the first receiver, from the core network equipment device a message instructing the first wireless base station to exit the first mode of operation and enter a second mode of operation, said second mode of operation including changing state from off-line to on-line; and wherein when the first wireless base station is in an off-line state of operation it does not operate as a wireless base station and when the first wireless base station is in an on-line state of operation it performs wireless base station operations and provides wireless base station services to user equipment devices.

Apparatus Embodiment 11. The first wireless base station of Apparatus Embodiment 1, wherein said processor is further configured to operate the first wireless base station to: re-synching, by the first wireless base station, a timer at the first wireless base station using the synchronization information obtained from the first user equipment device.

Apparatus Embodiment 12. A dual Subscriber Identity Module (SIM) user equipment device comprising: a memory, and a first processor, said processor controlling the dual SIM user equipment device to perform the following operations: receive, at the dual SIM user equipment device from a first wireless base station, a request message requesting synchronization information, said synchronization information including timing synchronization information; in response to receiving the request for synchronization information from the first wireless base station, generate by the dual SIM user equipment device a synchronization message including the requested synchronization information based on synchronization information obtained by the dual SIM user equipment device from a second wireless base station; and transmit the synchronization message to the first wireless base station.

Apparatus Embodiment 13. The dual Subscriber Identity Module (SIM) user equipment device of Apparatus Embodiment 12, wherein said processor further controls the dual SIM user equipment device to perform the following operation: prior to receiving the request message requesting synchronization information from the first wireless base station, receiving, by the dual SIM user equipment device a device to device (D2D) discovery request message from the first wireless base station; and in response to receiving the D2D discovery request message, establishing a device to device (D2D) sidelink communication channel with first wireless base station; and wherein the synchronization message is transmitted to the first wireless base station over the established D2D sidelink communications channel.

Apparatus Embodiment 14. The dual Subscriber Identity Module (SIM) user equipment device of Apparatus Embodiment 13, wherein said processor further controls the dual SIM user equipment device to perform the following operation: prior to generating the synchronization message, requesting synchronization information from a second wireless base station, said first wireless base station and said second wireless base station belonging to different wireless networks, said dual SIM user equipment device including a first SIM card and a second SIM card, said dual SIM user equipment device being able to communicate with the first wireless base station using information contained on the first SIM card, said dual SIM user equipment device being able to communicate with the second wireless base station using information contained on the second SIM card.

Apparatus Embodiment 15. The dual Subscriber Identity Module (SIM) user equipment device of Apparatus Embodiment 12, wherein the D2D discovery request message is a Proximity Service discovery request message; and wherein the D2D sidelink communications channel is established using Proximity Services.

Apparatus Embodiment 16. The dual Subscriber Identity Module (SIM) user equipment device of Apparatus Embodiment 12, wherein the first wireless base station utilizes a time division duplex wireless protocol to communicate with user equipment devices.

Apparatus Embodiment 17. The dual Subscriber Identity Module (SIM) user equipment device of Apparatus Embodiment 13, wherein said operation of establishing a device to device (D2D) sidelink communication channel with first wireless base station includes receiving information from the first wireless base station indicating the resources (e.g., spectrum) to be used for the D2D sidelink communications channel.

Apparatus Embodiment 18. The dual Subscriber Identity Module (SIM) user equipment device of Apparatus Embodiment 12, wherein the first wireless base station is an indoor wireless base station (e.g., small cell CBSD); wherein the second wireless base station is an eNodeB.

List of Exemplary Numbered Non-Transitory
Computer Readable Medium Embodiments

Non-transitory Computer Readable Medium Embodiment 1. A non-transitory computer readable medium including a first set of computer executable instructions which when executed by a processor of a first wireless base station cause the first wireless base station to perform the steps of: receiving, at the first wireless base station, a first message; in response to receiving the first message entering, by the first wireless base station, into a first mode of operation; while operating in said first mode of operation, obtaining, by the first wireless base station, synchronization information from a first user equipment device using over the air device to device communications, said synchronization information including time synchronization information.

Non-transitory Computer Readable Medium Embodiment 2. The non-transitory computer readable medium of Non-transitory Computer Readable Medium Embodiment 1, wherein the first set of computer executable instructions which when executed by the processor of the first wireless base station further cause the first wireless base station to perform the step of: re-synching, by the first wireless base station, a timer at the first wireless base station using the synchronization information obtained from the first user equipment device.

Non-transitory Computer Readable Medium Embodiment 3. A non-transitory computer readable medium including a first set of computer executable instructions which when executed by a processor of a dual Subscriber Identity Module (SIM) user equipment device cause the dual Subscriber Identity Module user equipment device to perform the steps of: receiving, at the dual SIM user equipment device from a first wireless base station, a request message requesting synchronization information, said synchronization information including timing synchronization information; in response to receiving the request for synchronization information from the first wireless base station, generating by the dual SIM user equipment device a synchronization message including the requested synchronization information based on synchronization information obtained by the dual SIM user equipment device from a second wireless base station; and transmitting the synchronization message to the first wireless base station.

The techniques of various embodiments may be implemented using software, hardware and/or a combination of software and hardware. Various embodiments are directed to apparatus, e.g., wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, ProSe entities, cable modems, cable modem termination systems, servers, nodes, and/or elements. Various embodiments are also directed to methods, e.g., method of controlling and/or operating wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, ProSe entities, cable modems, cable modem termination systems, servers, nodes, and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, e.g., wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, ProSe entities, cable modems, cable modem termination systems, servers, nodes, and/or elements described herein are implemented using one or more components to perform the steps corresponding to one or more methods, for example, generating or creating messages, implementing and/or updating timers or clocks, e.g., reference clock, connections, message reception, message transmission, switching modes, synchronizing time of day, phase and frequency, updating synchronization or clock system, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, ProSe entities, cable modems, cable modem termination systems, servers, nodes, and/or elements are configured to perform the steps of the methods described as being performed by the wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, ProSe entities, cable modems, cable modem termination systems, servers, nodes, and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, ProSe entities, cable modems, cable modem termination systems, servers, nodes, and/or elements, with a processor which includes a component corresponding to each of the steps of the various described methods performed by the device in which the processor is included. In some but not all embodiments a device, e.g., wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, ProSe entities, cable modems, cable modem termination systems, servers, nodes, and/or elements, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a device, e.g., wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, ProSe entities, cable modems, cable modem termination systems, servers, nodes, and/or elements. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a wireless base stations, wireless devices, mobile terminals, network equipment, eNBs, gNBs, CBSDs, CBRS tower base stations, mobility management entities, smart devices, user equipment devices, user devices, computers, smartphones, subscriber devices, core network systems, EPCs, ProSe entities, cable modems, cable modem termination systems, servers, nodes, and/or elements or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a first wireless base station in a first network comprising:
    receiving, at the first wireless base station, a first message;
    in response to receiving the first message, entering, by the first wireless base station, into a first mode of operation;
    while operating in said first mode of operation, obtaining, by the first wireless base station, synchronization information from a first user equipment device using over the air device to device communications, said synchronization information including time synchronization information;
    transmitting, by the first wireless base station, a message to a core network equipment device of the first network, said message indicating successful reception of time synchronization information;
    receiving from the core network equipment device a message instructing the first wireless base station to exit the first mode of operation and enter a second mode of operation, said second mode of operation including changing state from off-line to on-line; and
    wherein when the first wireless base station is in an off-line state of operation the first wireless base station does not operate as a wireless base station and when the first wireless base station is in an on-line state of operation the first wireless base station performs wireless base station operations and provides wireless base station services to user equipment devices.

2. The method of claim 1,
    wherein the first network is a hybrid mobile network; and
    wherein the first message is a first control message from the core network equipment device which is part of the hybrid mobile network, said first message being received by the first wireless base station over a landline.

3. The method of claim 1,
    wherein said first message is a first control message;
    wherein the first control message includes an instruction for the first wireless base station to enter the first mode of operation; and
    while operating in said first mode of operation the first wireless base station commences wirelessly transmitting device to device discovery request messages, said device to device discovery request messages including a first device to device discovery request message.

4. The method of claim 3, further comprising:
    receiving, from the first user equipment device, a discovery request response message in response to the first device to device discovery request message; and
    establishing a sidelink device to device communications channel with the first user equipment device.

5. The method of claim 4,
wherein said obtaining, by the first wireless base station, synchronization information from a first user equipment device using over the air device to device communications includes:
transmitting a first sync request message to the first user equipment device over the established device to device sidelink communications channel; and
receiving over the device to device sidelink communications channel from the first user equipment device said synchronization information.

6. The method of claim 5,
wherein the synchronization information received from the first user equipment device is based on synchronization information received by the first user equipment device from a second wireless base station, said second wireless base station not being part of the first network.

7. The method of claim 1,
wherein said first user equipment device is a mobile device with Dual Subscriber Identity Module (SIM) Dual Subscriber (DSDS) functionality; and
wherein said synchronization information is based on synchronization information obtained by the first user equipment device from a second wireless base station, said second wireless base station not being part of the first network.

8. The method of claim 1, further comprising:
utilizing, by the first wireless base station, the synchronization information obtained from the first user equipment device to set a timer at the first wireless base station.

9. The method of claim 8,
wherein said synchronization information includes a time value and delay information; and
wherein utilizing, by the first wireless base station, the synchronization information obtained from the first user equipment device to set a timer at the first wireless base station includes using the delay information to adjust the time value.

10. The method of claim 1, further comprising:
re-synching, by the first wireless base station, a timer at the first wireless base station using the synchronization information obtained from the first user equipment device.

11. The method of claim 1, further comprising:
determining, by the first wireless base station while operating in the second mode of operation, that updated synchronization information is required by the first wireless base station to continue to operate properly;
in response to determining that updated synchronization information is required by the first wireless base station to continue to operate properly, entering by the first wireless base station into a device to device discovery mode of operation;
while operating in said device to device discovery mode of operation, obtaining, by the first wireless base station, the updated synchronization information from a user equipment device using an over the air sidelink device to device communications channel; and
wherein while operating in said device to device discovery mode of operation, said first wireless base station operates as a subscriber device using spectrum allocated for subscriber device to device communications as opposed to spectrum allocated for base station to user equipment device communications.

12. A first wireless base station comprising:
a first receiver; and
a processor configured to operate the first wireless base station to:
receive, via the first receiver, a first message;
enter into a first mode of operation in response to the received first message;
obtain, while operating in the first mode of operation, synchronization information from a first user equipment device using over the air device to device communications, said synchronization information including time synchronization information;
transmit a message to a core network equipment device of the first network, said message indicating successful reception of time synchronization information;
receive from the core network equipment device a message instructing the first wireless base station to exit the first mode of operation and enter a second mode of operation, said second mode of operation including changing state from off-line to on-line; and
wherein when the first wireless base station is in an off-line state of operation the first wireless base station does not operate as a wireless base station and when the first wireless base station is in an on-line state of operation the first wireless base station performs wireless base station operations and provides wireless base station services to user equipment devices.

13. The first wireless base station of claim 12,
wherein the first network is a hybrid mobile network; and
wherein the first message is a first control message from a first the core network equipment device which is part of the hybrid mobile network, said first message being received by the first wireless base station over a landline.

14. The first wireless base station of claim 12, further comprising:
a wireless transmitter; and
wherein said first message is a first control message;
wherein the first control message includes an instruction for the first wireless base station to enter the first mode of operation; and
wherein said processor is further configured to operate the first wireless base station to:
commence, while operating in said first mode of operation, wirelessly transmitting, via the wireless transmitter, device to device discovery request messages, said device to device discovery request messages including a first device to device discovery request message.

15. The first wireless base station of claim 14, further comprising:
a wireless receiver; and
wherein said processor is further configured to operate the first wireless base station to:
receive via the wireless receiver, from the first user equipment device, a discovery request response message in response to the first device to device discovery request message; and
establish a sidelink device to device communications channel with the first user equipment device.

16. The first wireless base station of claim 15, wherein as part of being configured to operate the first wireless base station to obtain synchronization information from a first user equipment device using over the air device to device communications said processor is configured to operate the first wireless base station to:

transmit, via the wireless transmitter, a first sync request message to the first user equipment device over the established device to device sidelink communications channel; and receive, via the wireless receiver, over the device to device sidelink communications channel from the first user equipment device said synchronization information.

17. The first wireless base station of claim 16, wherein the synchronization information received from the first user equipment device is based on synchronization information received by the first user equipment device from a second wireless base station, said second wireless base station not being part of the first network.

18. The first wireless base station of claim 12, wherein said first user equipment device is a mobile device with Dual Subscriber Identity Module (SIM) Dual Subscriber (DSDS) functionality; and wherein said synchronization information is based on synchronization information obtained by the first user equipment device from a second wireless base station, said second wireless base station not being part of the first network.

19. The first wireless base station of claim 12, wherein said processor is further configured to:

utilize the synchronization information obtained from the first user equipment device to set a timer at the first wireless base station.

20. A non-transitory computer readable medium including a first set of computer executable instructions which when executed by a processor of a first wireless base station cause the first wireless base station to perform the steps of:

receiving, at the first wireless base station, a first message;

in response to receiving the first message, entering, by the first wireless base station, into a first mode of operation;

while operating in said first mode of operation, obtaining, by the first wireless base station, synchronization information from a first user equipment device using over the air device to device communications, said synchronization information including time synchronization information;

transmitting, by the first wireless base station, a message to a core network equipment device of a first network, said message indicating successful reception of time synchronization information;

receiving from the core network equipment device a message instructing the first wireless base station to exit the first mode of operation and enter a second mode of operation, said second mode of operation including changing state from off-line to on-line; and wherein when the first wireless base station is in an off-line state of operation the first wireless base station does not operate as a wireless base station and when the first wireless base station is in an on-line state of operation the first wireless base station performs wireless base station operations and provides wireless base station services to user equipment devices.

\* \* \* \* \*